US005943775A

United States Patent [19]

Lanahan et al.

[11] Patent Number: 5,943,775

[45] Date of Patent: Aug. 31, 1999

[54] SYNTHETIC PANEL AND METHOD

[75] Inventors: Kenneth P. Lanahan, Troy, Ill.; Thomas G. Durham, Ava, Mo.; Stephen C. Foreman, Las Vegas, Nev.

[73] Assignee: QB Technology, Ava, Mo.

[21] Appl. No.: 09/003,747

[22] Filed: Jan. 7, 1998

Related U.S. Application Data

[63] Continuation-in-part of application No. 08/556,265, Nov. 13, 1995, Pat. No. 5,842,276.

[51] Int. Cl.[6] .......... B23P 15/00

[52] U.S. Cl. .......... 29/897.32; 52/309.16; 52/220.2; 52/592.1; 264/142; 264/158; 83/171; 83/16; 83/39

[58] Field of Search .......... 29/897.3, 897.32, 29/897.34, 897.1, 402.11, 402.12; 52/309.16, 220.2, 220.3, 592.3, 592.1; 264/142, 158; 83/171, 16, 39, 56

[56] References Cited

U.S. PATENT DOCUMENTS

| | | | |
|---|---|---|---|
| 3,487,598 | 1/1970 | Lopina | 52/220 |
| 3,928,691 | 12/1975 | Knudson | 52/309 |
| 4,037,377 | 7/1977 | Howell et al. | 52/592.1 |
| 4,154,030 | 5/1979 | Huguet | 52/98 |
| 4,163,349 | 8/1979 | Smith | 52/241 |
| 4,224,774 | 9/1980 | Peterson | 52/309 |
| 4,284,447 | 8/1981 | Dickens et al. | 156/78 |
| 4,330,921 | 5/1982 | White, Jr. et al. | 29/897.3 |
| 4,341,831 | 7/1982 | Kleiss | 52/309 |
| 4,363,684 | 12/1982 | Hay, II | 52/309.16 |
| 4,602,466 | 7/1986 | Larson | 52/309.11 |
| 4,608,893 | 9/1986 | Huhue | 83/171 |
| 4,641,468 | 2/1987 | Salter | 52/309 |
| 4,683,792 | 8/1987 | Demont | 83/16 |
| 4,754,678 | 7/1988 | Nichols et al. | 83/16 |
| 4,774,794 | 10/1988 | Grieb | 52/309.7 |
| 4,813,193 | 3/1989 | Altier | 52/210 |
| 4,856,244 | 8/1989 | Clapp | 52/309.7 |
| 4,862,660 | 9/1989 | Raymond | 52/221 |
| 4,981,003 | 1/1991 | McCarthy | 52/309.7 |
| 5,021,108 | 6/1991 | Bergqvist | 156/79 |
| 5,067,296 | 11/1991 | Brown et al. | 52/309.7 |
| 5,072,569 | 12/1991 | VanTassel | 52/309.4 |
| 5,245,809 | 9/1993 | Harrington | 52/309.11 |
| 5,265,389 | 11/1993 | Mazzone et al. | 52/309.7 |
| 5,269,109 | 12/1993 | Gulur | 52/309.9 |
| 5,279,089 | 1/1994 | Gulur | 52/309.11 |
| 5,285,607 | 2/1994 | Sommerville | 52/309.16 |
| 5,353,560 | 10/1994 | Heydon | 52/241 |
| 5,381,638 | 1/1995 | Anderson | 52/592.1 |
| 5,465,541 | 11/1995 | Lin et al. | 52/220 |
| 5,497,589 | 3/1996 | Porter | 52/592 |
| 5,497,595 | 3/1996 | Kalinin | 52/309 |
| 5,519,971 | 5/1996 | Ramierez | 52/220.2 |
| 5,660,907 | 8/1997 | Skalka | 52/309.7 |

OTHER PUBLICATIONS

Aug. 1990 Publication from Building Systems Builder (Franklin PA) and entitled "Great Walls".

1997 Catalog entitled "Demand Products" by Demand Products, Inc., pp. 14–19.

*Primary Examiner*—Larry I. Schwartz

*Assistant Examiner*—Marc W. Butler

*Attorney, Agent, or Firm*—Townsend and Townsend and Crew LLP

[57] ABSTRACT

A method for producing a polymeric foamed material panel including the steps of providing a polymeric foamed material; and cutting (e.g. hot wire cutting) the polymeric foamed material until reaching a preconfiguration cut point. The method further includes cutting subsequently from the preconfiguration cut point a brace-receiving configuration in the polymeric foamed material; and sliding a brace member into the brace-receiving configuration to produce a polymeric foamed material panel. A method for forming a structure comprising engaging together a pair of polymeric foamed material panels produced in accordance with the method for producing a polymeric foamed material panel. A polymeric foamed material panel comprising a panel consisting of a polymeric foamed material, and a brace-receiving-configured slot disposed in the polymeric foamed material of the panel. A brace member is disposed in the brace-receiving-configured slot in the polymeric foamed material of the panel. The brace-receiving-configured slot includes at least one seared wall.

79 Claims, 31 Drawing Sheets

SYNTHETIC PANEL AND METHOD

This is a continuation-in-part patent application of patent application having Ser. No. 08/556,265, filed on Nov. 13, 1995, now U.S. Pat. No. 5,842,276 and entitled "A SYNTHETIC PANEL AND METHOD."

BACKGROUND OF THE INVENTION

1. Field of the Invention

This invention relates to a synthetic panel. More specifically, this invention provides a polymeric foamed panel (e.g. a low density synthetic panel) and method for producing the polymeric foamed panel. This invention further provides a method for forming a structure with two or more polymeric foamed panels.

2. Description of the Prior Art

A patentability investigation was conducted and the following U.S. Patents were discovered:

U.S. Pat. No. 4,163,349 to Smith; U.S. Pat. No. 4,284,447 to Dickens et al.; U.S. Pat. No. 4,602,466 to Larson; U.S. Pat. No. 4,774,794 to Grieb; U.S. Pat. No. 4,813,193 to Altizer; U.S. Pat. No. 4,856,244 to Clapp; U.S. Pat. No. 4,862,660 to Raymond; U.S. Pat. No. 4,981,003 to McCarthy; U.S. Pat. No. 5,021,108 to Bergqvist; U.S. Pat. No. 5,245,809 to Harrington; U.S. Pat. No. 5,265,389 to Mazzone et al.; U.S. Pat. No. 5,269,109 to Gulur; and U.S. Pat. No. 5,279,089 to Gulur.

U.S. Pat. No. 4,163,349 to Smith teaches an insulated building panel having a core and overlapping skins which include an interior skin and an exterior skin. The interior skin at the panel's bottom covers a panel foot plate and the exterior skin at the panel's bottom also covers the panel foot plate and extends beyond to form an erection stop. End panels have relieved core areas for receiving bearing members associated with a wall splice bearing post, and double parallel spaced header beams have an offset splice area within a several panel wall section.

U.S. Pat. No. 4,284,447 to Dickens et al. teaches a method of forming a panel structure useful in building construction and the like including the steps of heating a heat expandable plastic in a separable mold having a cavity with the configuration of the resultant panel to form a panel core and adhering thin reinforcing strips to the front and back surfaces of the core. Control over the dimensions and configuration of the panel to Dickens et al. is obtained by adhering the strips to the core in the mold while applying heat thereto whereby core shrinkage is minimized.

U.S. Pat. No. 4,602,466 to Larson teaches a method and apparatus for making building panels, including a means for positioning upper and lower rigid sheets of material, such as paper pulp, in spaced relation so that foamable material disposed between the sheets can move into gripping engagement with both sheets as it expands and solidifies.

U.S. Pat. No. 4,774,794 to Grieb teaches a foam-cement building having the walls, roof and/or floor formed from a plurality of self supporting foam building blocks of varying density with a strong thin continuous structural and architectural coating on the surface of the blocks. The coating is formed from cement, reinforced with a fiberglass mesh and fiberglass roving strands. The blocks are interconnected by a mechanical key system or splines to form a monolithic structure.

U.S. Pat. No. 4,813,193 to Altizer teaches an improved modular building comprising sidewall modules and ceiling modules. The sidewall modules comprise a primary frame to which a secondary frame of furring strips is attached. The sidewall modules further comprise foam insulation molded around the primary and secondary frame to define exterior and interior planar surfaces. The ceiling modules include frame means supporting a plurality of ceiling joists, and foam insulation dispersed within the frame means and between the ceiling joist so as to define upper and lower ceiling surfaces.

U.S. Pat. No. 4,856,244 to Clapp teaches tilt-wall concrete panels adapted for constructing small buildings with "finished" interiors, especially single-family residences, etc. A peripheral frame of wooden members is laid on top of a barrier film of plastic (e.g. 4 mil polyethylene) on a horizontal surface. Wood-like studs are then placed within the frame and nailed thereto. Any desired utility cables and service pipes are positioned within the frame. Clapp further teaches that an insulating foam cover, preferably high-density polyurethane, is then generated within and over the frame, to a depth that at least covers the wood-like studs and any utility or service lines. Foam having a thickness of about 1.5 inches covers these elements and bonds them securely together as a stable, easily movable "plate" after the foam plastic has hardened. A plurality of such plates, each sized to form a part of a building's wall, are positioned at a construction site where a foundation has been prepared. Clapp discloses that a concrete form is then temporarily completed around each plate, and concrete is poured on top thereof, to an average depth of about 4 to 6 inches. After the concrete hardens, the temporary form is removed and the composite panel is tilted to a vertical position. A plurality of such panels by Clapp are positioned edge-to-edge and joined to form a continuous outer wall for the building. The plastic barrier film is removed from the face of each panel, and interior wallboards or the like may be nailed to the exposed wood-like studs.

U.S. Pat. No. 4,862,660 to Raymond teaches an integral energy efficient load-bearing exterior wall fabricated of lightweight foam surrounding plastic load-bearing columns. Raymond discloses prefabricated modular wall panels as individual building elements and as part of an integrated building system. The prefabricated modular wall panels are made from a foamed material that is molded around a plurality of vertically disposed hollow support columns. Each of the columns in U.S. Pat. No. 4,862,660 to Raymond is taught as containing a pair of opposed and vertically disposed T-shaped fastening supports which are arranged to form part of the interior and exterior surfaces of the foamed wall. The hollow columns are set onto locking base plates which are mounted on a wood or concrete deck system. Locking top plates are also mounted on wood and are then placed on top of the columns. The tubular columns are made of a plastic material and are shaped in cross-section in the form of a rectangle, square, diamond, oval or circle.

U.S. Pat. No. 4,981,003 to McCarthy teaches a wall panel constructed from expanded polystyrene beads in an expanded polystyrene mold with structural members embedded in it during the molding process. The structural members are in the form of two by four studs placed at sixteen inch centers. Adjacent panels have interlocking grooves and ridges which fit together. McCarthy teaches that an advantage of his invention is that a total insulated wall is created with no cracks or spaces in the insulation.

U.S. Pat. No. 5,021,108 to Bergqvist teaches an apparatus for manufacture of laminated panels having a foamed plastic core material including an inclined press having a fixed platen surface and a movable platen surface hinged adjacent to its lower edge. Panel thickness is adjustable by a mechanism which moves the hinge pivot relative to fixed platen surfaces. The platen surfaces in U.S. Pat. No. 5,021,108 to Bergqvist are clamped at their upper edges by spaced clamps operable by lever and crank assemblies. A retractable seal spacer has liquid plastic injection nozzles and gas venting tubes in fluid communication with a hollow cavity in the press.

U.S. Pat. No. 5,245,809 to Harrington teaches a panel for providing walls, roofs and floors with thermal insulation and fire retardance. The panel is taught to comprise at least two essentially parallel face members separated to form a space between the face members and urethane within the space to provide the thermal insulation and fire retardance. The panel may additionally include frame members extending between the face members for providing support and for enclosing the urethane. At least one of the frame members has at least one port through which urethane foam can enter between the face members. U.S. Pat. No. 5,245,809 to Harrington further teaches a method for creating a panel for providing insulated and fire retardant walls, floors and roofs. The method is taught by Harrington to include the steps of joining frame members together to form a panel frame of the desired dimensions, attaching face members to either side of the panel frame so that at least one enclosed space is formed within the face members and frame members, creating at least one port leading into the at least one enclosed space, and injecting urethane foam through the at least one port into the at least one enclosed space.

U.S. Pat. No. 5,265,389 to Mazzone et al. teaches a composite building panel including a core of a foamed polymeric insulating material, such as expanded polystyrene, having a plurality of uniformly spaced open box tubes retained in vertical grooves formed in the rear surface of the core by a two-part epoxy adhesive. The tubes are mechanically connected at their ends to one leg of continuous horizontal channels having their other leg adhesively secured to the core at horizontal slots. The front surface of the core is continuous without seams and may be coated with a variety of exterior insulation finishing system coatings.

U.S. Pat. Nos. 5,269,109 and 5,279,089 to Gulur teach an insulated load bearing wall comprising panels of extruded polymer foam into which tubular, load carrying frame members have been incorporated. A tongue is formed at one vertical edge of each panel and a groove is formed at the opposite vertical edge. The tubular frame members are bonded to the extruded polymer foam.

None of the foregoing U.S. Patents teach the particular methods of the present inventions for producing panels having a core of a foamed polymeric material, such as expanded polystyrene. StressSkin and Structural Panels have been in use for several decades. Alden Dow constructed his first StressSkin panel house in the late forties. Both technologies have relied on an inner and outer skin of wood either being plywood or more recently OSB (oriented strand board). The plywood or OSB skin is attached to the foam core with an adhesive and then pressed together. The laminated panels are thereafter processed into engineered parts. The plywood or OSB skin does not provide for both a structure and a substrate for the interior and exterior finishes. Thus, what is needed and what has been invented by us is a foamed wall system and method that provides for a foamed polymeric material that becomes both a structure and a substrate for the interior and exterior finishes.

SUMMARY OF THE INVENTION

The present invention accomplishes its desired objects by providing a method for producing a polymeric foamed material panel (e.g. a low density synthetic panel) comprising the steps of:

(a) providing a polymeric foamed material;

(b) cutting the polymeric foamed material of step (a) until reaching a preconfiguration cut point;

(c) cutting subsequently from the preconfiguration cut point a brace-receiving configuration in the polymeric foamed material; and (d) sliding a brace member into the brace-receiving configuration to produce a polymeric foamed material panel.

The cutting in step (b) and the cutting in step (c) comprises cutting the polymeric foamed material of step (a) with a hot wire cutter which is preferably operated by a computer. The brace-receiving configuration in the polymeric foamed material comprises a slot for receiving the brace member. The slot includes a seared wall for facilitating the sliding of the brace member. The brace member includes an opening with an opening perimeter. The method additionally comprises forming a polymeric foamed material opening in the polymeric foamed material. The polymeric foamed material opening has a polymeric foamed material opening perimeter. The sliding in step (d) comprises sliding the brace member into the brace-receiving configuration until the opening of the brace member is generally aligned with the polymeric foamed material opening. The opening perimeter of the opening in the brace member has a dimension that is greater than a dimension of the polymeric foamed material opening perimeter of the polymeric foamed material opening in the polymeric foamed material.

The method preferably additionally comprises passing a conduit through the polymeric foamed material opening of the polymeric foamed material and through the opening of the brace member; preferably such that the conduit is essentially supported by the polymeric foamed material and essentially does not contact any of the opening perimeter of the opening in the brace member. The cutting in step (b) further comprises cutting a generally straight thread-like slot from a defined surface of the polymeric foamed material to the preconfiguration cut point. The brace-receiving configuration is essentially a generally C-shaped slot. The method further preferably includes that the cutting in step (b) and the cutting in step (c) is with a hot wire cutter wherein the hot wire cutter is at a temperature (e.g. 230° F. to 580° F.) such as to sear at least one wall of the C-shaped slot to smooth and harden the wall of the C-shaped slot for facilitating the sliding in step (d) of the brace member. The polymeric foamed material may be any suitable material (i.e. either low density and/or high density including engineered resins) that is capable of producing the panel or structure of the present invention, such as expanded polystyrene (EPS).

The present invention further accomplishes its desired objects by providing a method for forming a structure comprising the steps of:

(a) providing a first polymeric foamed material having a first defined edge;

(b) cutting the first polymeric foamed material until receiving a first preconfiguration cut point and cutting subsequently from the first preconfiguration cut points a first brace-receiving-configured slot in the first polymeric foamed material;

(c) cutting the first defined edge of the first polymeric foamed material to form a tongue on the first defined edge;

(d) sliding a first brace member into the first brace-receiving-configured slot;

(e) providing a second polymeric foamed material having a second defined edge;

(f) cutting the second polymeric foamed material until reaching a second preconfiguration cut point and cutting subsequently from the second preconfiguration cut point a second brace-receiving-configured slot in the second polymeric foamed material;

(g) cutting the second defined edge of the second polymeric foamed material to form a channel in the second defined edge;

(h) sliding a second brace member into the second brace-receiving-configured slot; and (i) sliding the tongue on the first defined edge of the first polymeric foamed material into the channel in the second defined edge of the second polymeric foamed material to form a structure.

The cutting in steps (b), (c), (f) and (g) comprises cutting with a hot wire cutter; preferably a computer operated hot wire cutter. The first brace-receiving-configured slot in the first polymeric foamed material and the second brace-receiving-configured slot in the second polymeric foamed material respectively comprise a first slot with a first wall for receiving the first brace member and a second slot with a second wall for receiving the second brace member. The first wall of the first slot includes a first seared wall for facilitating the sliding of the first brace member and the second wall of the second slot includes a second seared wall for facilitating the sliding of the second brace member. The first brace member includes a first opening with a first opening perimeter and the second brace member includes a second opening with a second opening perimeter.

The method additionally includes forming a first polymeric foamed material opening in the first polymeric foamed material and forming a second polymeric foamed material opening in the second polymeric foamed material. The first polymeric foamed material opening includes a first polymeric foamed material opening perimeter and the second polymeric foamed material opening includes a second polymeric foamed material opening perimeter. The sliding step (d) comprises sliding the first brace member into the first brace-receiving-configured slot until the first opening of the first brace member is generally aligned with the first polymeric foamed materials opening; and the sliding step (h) comprises sliding the second brace member into the second brace-receiving-configured slot until the second opening of the second brace member is generally aligned with the second polymeric foamed material opening. The first and second openings of the first and second brace members and the first and second polymeric foamed material openings of the first and second polymeric foamed materials are all aligned for receiving a conduit. The first opening perimeter of the first opening in the first brace member has a first dimension that is greater than a first dimension of the first polymeric foamed material opening perimeter of the first polymeric foamed material opening in the first polymeric foamed material; and the second opening perimeter of the second opening in the second-brace member has a second dimension that is greater than a second dimension of the second polymeric foamed material opening perimeter of the second polymeric foamed material opening in the second polymeric foamed material.

The method preferably additionally comprises passing a conduit through the first polymeric foamed material opening in the first polymeric foamed material and through the first opening of the first brace member and further passing the conduit through the second polymeric foamed material opening in the second polymeric material and through the second opening of the second brace member; preferably such that the conduit is essentially supported by the first polymeric foamed material and by the second polymeric material and essentially does not contact any of the first opening perimeter of the first opening in the first brace member and any of the second opening perimeter of the second opening in the second brace member.

The method also preferably additionally comprises cutting, prior to the cutting in step (b), a first generally straight thread-like slot in the first polymeric foamed material up to a first preconfiguration cut point wherein the step (b) cutting commences; and further also preferably additionally comprises cutting, prior to the cutting in step (f), a second generally straight thread-like slot in the second polymeric foamed material up to a second preconfiguration cut point wherein the step (f) cutting commences. The first brace-receiving-configured slot is essentially a first generally C-shaped slot and the second brace-receiving-configured slot is essentially a second generally C-shaped slot. The cutting in step (b), step (c), step (f), and step (g) comprises cutting with a hot wire cutter which is at a temperature (e.g. 230° F. to 580° F.) such as to sear at least one wall of the first C-shaped slot and to sear at least one wall of the second C-shaped slot to smooth and harden the wall of the first C-shaped slot and to smooth and harden the wall of the second C-shaped slot for facilitating the sliding in step (d) of the first brace member and for facilitating the sliding in step (h) of the second brace member. The first polymeric foamed material and the second polymeric foamed material both may consist of any suitable material (e.g. any suitable polymeric foamed material) such as that comprising expanded polystyrene (EPS).

The present invention therefore provides a method for producing a polymeric foamed material panel comprising the steps of:

(a) providing a polymeric foamed material in a generally stationary position;

(b) cutting the generally stationary polymeric foamed material of step (a) until reaching a preconfiguration cut point;

(c) cutting subsequently from the preconfiguration cut point a brace-receiving configuration in the generally stationary polymeric foamed material; and (d) sliding a brace member into the brace-receiving configuration to produce a polymeric foamed material panel.

The present invention further therefore provides a method for producing a polymeric foamed material panel comprising the steps of:

(a) providing a polymeric foamed material;

(b) providing a brace member with brace sides;

(c) cutting a brace-receiving configuration in the polymeric foamed material; and (d) sliding the brace member of step (b) into the brace-receiving configuration such that the brace sides are essentially surrounded by the polymeric foamed material to produce a polymeric foamed material panel.

The present invention also further therefore provides a method for producing a polymeric foamed material panel comprising the steps of:

(a) providing a polymeric foamed material with a planar side surface;

(b) cutting with a cutter from the planar side surface a path in the polymeric foamed material of step (a);

(c) retracing the path of step (b) with the cutter to produce a brace-receiving configuration in the polymeric foamed material; and (d) sliding a brace member into the brace-receiving configuration to produce a polymeric foamed material panel.

The present invention yet also further therefore provides a method for producing a polymeric foamed material panel comprising the steps of:

(a) providing a polymeric foamed material with a planar side surface;

(b) contacting the planar side surface with a cutter;

(c) cutting with the cutter the polymeric foamed material from the planar side surface thereof until reaching a preconfiguration cut point within the polymeric foamed material;

(d) cutting with the cutter from the preconfiguration cut point of step (c) a slot in the polymeric foamed material of step (c);

(e) cleaning the slot of step (d) with the cutter to produce a brace-receiving configuration in the polymeric foamed material; and (f) sliding a brace member into the brace-receiving configuration to produce a polymeric foamed material panel.

In addition to the foregoing methods, the present invention provides at least one polymeric foamed material panel. The polymeric foamed material panel of the present invention comprises a panel consisting of a polymeric foamed material. A brace-receiving-configured slot is disposed in the polymeric foamed material of the panel and a brace member is disposed in the brace-receiving-configured slot in the polymeric foamed material of the panel. The brace-receiving-configured slot preferably includes at least one seared wall; and the polymeric foamed material panel additionally comprises a generally straight thread-like slot extending from a defined surface of the polymeric foamed material to the brace-receiving-configured slot; and a second generally straight thread-like slot extending from the defined surface of the polymeric foamed material to a generally cylindrical opening in the polymeric foamed material. The brace member has a brace opening which is generally aligned with the cylindrical opening in polymeric foamed material.

In another embodiment of the present invention there is provided a method for forming a structure comprising the steps of:

(a) providing a first polymeric foamed material having a first defined edge;

(b) cutting (e.g. with a hot wire cutter or a laser cutter) a first slot in the first polymeric foamed material;

(c) providing a first internal reinforcing member having a male member;

(d) sliding the first internal reinforcing member of step (c) into the first slot of step (b) such that the male member protrudes from the first defined edge;

(e) providing a second polymeric foamed material having a second defined edge;

(f) cutting (e.g. with a hot wire cutter or a laser cutter) a second slot in the second polymeric foamed material;

(g) providing a second internal reinforcing member having a female member;

(h) sliding the second internal reinforcing member of step (g) into the second slot of step (f) such that the female member is exposed along the second defined edge; and (i) sliding the male member, which projects from the first defined edge of the first polymeric foamed material, into the female member, which is exposed along the second defined edge of the second polymeric foamed material, to form a structure.

In yet another embodiment of the present invention, there is provided a method for producing a plurality of polymeric foamed material structures having brace-receiving configurations comprising the steps of:

(a) providing a block, preferably a generally stationary block, of polymeric foamed material having a defined surface and a pair of opposed ends, such as expanded polystyrene (EPS);

(b) cutting the polymeric foamed material of step (a) with a plurality of cutters (e.g., hot wire cutters, laser cutters, etc.) in a generally perpendicular direction from the defined surface until each cutter reaches a respective preconfiguration cut point;

(c) cutting subsequently with each cutter from the respective preconfiguration cut point of each cutter a respective brace-receiving configuration in the polymeric foamed material such that said brace-receiving configuration terminates in said opposed ends; and (d) cutting, after the cutting step (c), the polymeric foamed material of step (c) with the plurality of cutters to produce a plurality of polymeric foamed material structures, each of the polymeric foamed material structures having a brace-receiving configuration, which may be linear or nonlinear.

The immediate foregoing method additionally comprises cutting with each cutter, prior to the cutting step (d), a respective polymeric foamed material opening in the polymeric foamed material such that each polymeric foamed material structure has a polymeric foamed material opening to define a chase. The cutters are preferably computer operated to provide desired cut accuracy.

In yet another embodiment of the present invention, there is also provided a method for producing a plurality of polymeric foamed material panels comprising the steps of:

(a) providing a block (e.g., a generally stationary block) of polymeric foamed material (e.g., expanded polystyrene (EPS));

(b) cutting the polymeric foamed material of step (a) with a plurality of cutters (e.g., hot wire cutters, laser cutter, etc.) until each cutter reaches a respective preconfiguration cut point;

(c) cutting subsequently with each cutter from the respective preconfiguration cut point of each cutter a respective brace-receiving slot in the polymeric foamed material;

(d) cutting, after the cutting step (c), the polymeric foamed material of step (c) with said plurality of cutters to produce a plurality of polymeric foamed material structures having a plurality of brace-receiving slots, which may be linear or nonlinear slots; and (e) sliding a plurality of brace members into the brace-receiving slots of the polymeric foamed material structures of step (d) to produce a plurality of polymeric foamed material panels, each of the polymeric foamed material panels having at least one of the brace members.

In the immediate foregoing method of the present invention, the brace members include sides. More particularly, each of the brace members preferably comprises a web, a first flange integrally bound to the web, a first flange return integrally bound to the first flange, a second flange also integrally bound to the web, and a second flange return integrally bound to the second flange. The web, the first and second flanges, and the first and second flange returns are surrounded by the polymeric foamed materials. Alternatively and as another embodiment of the present invention, a portion of at least one brace member protrudes from each of the polymeric foamed material panels. Therefore, the sliding step (e) in the immediate foregoing method more specifically comprises sliding the first flange and the first flange return and a portion of the web of respective brace members into respective brace-receiving slots of the polymeric foamed material structures to produce the plurality of polymeric foamed material panels, with each of the polymeric foamed material panels having the second flange and the second flange return and a portion of the web of at least one of the brace members disposed outside thereof.

An alternative embodiment of the present invention further also provides a method for producing a plurality of polymeric foamed material structures having slots for receiving stud members comprising the steps of:

(a) cutting a polymeric foamed material (e.g., a generally stationary block of expanded polystyrene (EPS)) with a plurality of cutters, such as hot wire cutters or laser cutters, in a generally perpendicular direction from a defined surface of the polymeric foamed material;

(b) cutting subsequently in at least a second direction the polymeric foamed material of step (a) with the plurality of cutters until each cutter forms a first respective slot in the polymeric foamed material, said first respective slot terminating in opposed ends of the polymeric foamed material;

(c) cutting, after the cutting step (b), in the generally perpendicular direction the polymeric foamed material of step (b) with the plurality of cutters to produce a plurality of polymeric foamed material structures having a plurality of first slots, which may be linear or nonlinear slots.

The immediately foregoing method broadly additionally comprises cutting, prior to the cutting step (c), the polymeric foamed material of step (b) with the plurality of cutters until each cutter forms a second respective slot in the polymeric foamed material. The immediate foregoing method more particularly additionally comprises cutting, prior to the cutting step (c), the polymeric foamed material of step (b) with the plurality of cutters until each cutter forms a respective recess in the polymeric foamed material; and subsequently cutting, prior to the cutting step (c), the polymeric foamed material with the plurality of cutters until each cutter forms a second respective slot in the polymeric foamed material such that after the cutting step (c), a plurality of polymeric foamed material structures are produced having a plurality of first slots and a plurality of second slots and a plurality of recesses. A plurality of stud members is provided wherein each of the stud members comprises a web, a first flange integrally bound to the web, a first flange return integrally bound to the first flange, a second flange also integrally bound to the web, and a second flange return integrally bound to the second flange. The stud members are slid into the first and second slots and into the recesses of the polymeric foamed material structures, such that after the sliding step, the first flange return and the first flange of each of the stud members occupies respectively one of the first slots and one of the recesses of the polymeric foamed material structures, and the web, the second flange and the second flange return of each of the stud members occupies one of the second slots of the polymeric foamed material structures. The cutters are preferably computer operated to provide the desired cut accuracy during the cutting steps.

The alternative embodiment of the present invention more specifically includes a method for producing a plurality of polymeric foamed material structures having slots for receiving stud members comprising the steps of:

(a) cutting a polymeric foamed material with a plurality of cutters in a first direction until each of the cutters has moved a respective first distance in the polymeric foamed material;

(b) cutting subsequently with the plurality of cutters in a second direction the polymeric foamed material of step (a) until each of the cutters has moved a respective second distance in the polymeric foamed material of step (a);

(c) cutting subsequently with the plurality of cutters in the first direction the polymeric foamed material of step (b) until each of the cutters has moved a respective third distance in the polymeric foamed material of step (b);

(d) cutting subsequently with the plurality of cutters in a third direction the polymeric foamed material of step (c) until each of the cutters has moved a respective fourth distance in the polymeric foamed material of step (c);

(e) cutting subsequently with the plurality of cutters in the first direction the polymeric foamed material of step (d) until each of the cutters has moved a respective fifth distance in the polymeric foamed material of step (d);

(f) cutting subsequently with the plurality of cutters in the second direction the polymeric foamed material of step (e) until each of the cutters has moved a respective sixth distance in the polymeric foamed material of step (e);

(g) cutting subsequently with the plurality of cutters in a fourth direction the polymeric foamed material of step (f) until each of the cutters has moved a respective seventh distance in the polymeric foamed material of step (f);

(h) cutting subsequently with the plurality of cutters in the third direction the polymeric foamed material of step (g) until each of the cutters has moved a respective eighth distance in the polymeric foamed material of step (g);

(i) cutting subsequently with the plurality of cutters in the fourth direction the polymeric foamed material of step (h) until each of the cutters has moved a respective ninth distance in the polymeric foamed material of step (h);

(j) cutting subsequently with the plurality of cutters in the second direction the polymeric foamed material of step (i) until each of the cutters has moved a respective tenth distance in the polymeric foamed material of step (i);

(k) cutting subsequently with the plurality of cutters in the first direction the polymeric foamed material of step (j) until each of the cutters has moved a respective eleventh distance in the polymeric foamed material of step (j);

(l) cutting subsequently with the plurality of cutters in the third direction the polymeric foamed material of step (k) until each of the cutters has moved a respective twelfth distance in the polymeric foamed material of step (k); and (m) cutting, after the cutting step (l), in the first direction the polymeric foamed material of step (l) with the plurality of cutters to produce a plurality of polymeric foamed material structures having a plurality of slots.

In the immediate foregoing method, the respective third distance and the respective eighth distance are approximately equal. Similarly, the respective fifth distance and the respective seventh distance are approximately equal. The respective fourth distance is generally less than the respective second distance, and the respective eighth distance is generally less than the respective tenth distance. The third direction is generally opposite to the second direction, and the fourth direction is generally opposite to the first direction. The cutters are preferably computer operated hot wire cutters which generally move in unison. Each of the hot wire cutters includes a wire diameter with a generally known diameter measurement which generally equals the respective third distance and the respective eighth distance.

One of the alternative embodiments of the present invention also more specifically includes a method for producing a plurality of polymeric foamed material structures comprising the steps of:

(a) cutting a polymeric foamed material (e.g., a generally stationary block of expanded polystyrene (EPS)) with a plurality of cutters (e.g., computer-operated hot wire cutters or laser cutters) until each cutter reaches a respective first cut point;

(b) cutting subsequently with each cutter from the respective first cut point a respective path in the polymeric foamed material of step (a) until each cutter reaches a respective second cut point;

(c) moving each of the plurality of cutters from the respective second cut point to a respective off-set position in the polymeric foamed material of step (b);

(d) retracing generally with each cutter the respective path of each cutter, while each cutter remains in the respective off-set position of step (c) such that a respective slot is formed by each cutter in the polymeric foamed material of step (c); and (e) cutting the polymeric foamed material of step (d) with the plurality of cutters until the cutters have cut through the polymeric foamed material of step (d), producing a plurality of polymeric foamed material structures having slots, which may be either linear or non-linear slots. The method additionally comprises cutting with the plurality of cutters track chases in the polymeric foamed material structures of step (e) such that each of the plurality of polymeric foamed material structures additionally includes a track chase.

Other features of the alternative embodiments of the present invention include interrupting the movement of a plurality of cutters in a first direction of travel to move the cutters in at least one direction of travel which differs from the first direction of travel in order to form one or more brace-receiving slots. These features are embodied in a method for producing a plurality of polymeric foamed material structures having brace-receiving slots comprising the steps of: (a) providing a block of polymeric foamed material; and (b) moving a plurality of cutters through the block of polymeric foamed material in a first direction of travel, while interrupting at least one time the moving of the plurality of cutters in the first direction of travel to move the cutters through the block of polymeric foamed material in at least one direction of travel which differs from the first direction of travel, such that each cutter produces a respective brace-receiving slot in the polymeric foamed material, until the plurality of cutters have moved completely through the block of polymeric foamed material to produce a plurality of polymeric foamed material structures with each structure having at least one brace-receiving slot. These features are also embodied in a method for producing a plurality of polymeric foamed material structures having brace-receiving slots comprising the steps of: (a) providing a block of polymeric foamed material in a generally stationary position; (b) moving a plurality of cutters through the generally stationary block of polymeric foamed material of step (a) in a first direction of travel; (c) interrupting the movement of the plurality of cutters from the first direction of travel through the generally stationary block of polymeric foamed material to move the cutters in at least one direction of travel which differs from the first direction of travel such that each cutter produces a respective brace-receiving slot in the polymeric foamed material, and (d) continuing the moving step (b) of the plurality of cutters in the first direction of travel, while intermittently interrupting the movement of the plurality of cutters from the first direction of travel to move the cutters in at least one direction of travel which differs from the first direction of travel such that each cutter produces at least one additional respective brace-receiving slot in the polymeric foamed material, until the plurality of cutters have moved completely through the generally stationary block of polymeric foamed material after which a plurality of polymeric foamed material structures are produced with each polymeric foamed material structure having a plurality of brace-receiving slots.

An alternative embodiment of the present invention therefore accomplishes its desired objects by broadly providing a method for producing a plurality of polymeric foamed material panels comprising the steps of:

(a) cutting a polymeric foamed material in a first direction with a plurality of cutters generally moving in unison;

(b) cutting subsequently the polymeric foamed material of step (a) in a second direction with the plurality of cutters generally moving in unison;

(c) cutting, after the cutting step (b), the polymeric foamed material of step (b) in the first direction with the plurality of cutters generally moving in unison;

(d) cutting, after the cutting step (c), the polymeric foamed material of step (c) in a third direction with the plurality of cutters generally moving in unison wherein the third direction is generally opposite to the second direction;

(e) cutting, after the cutting step (d), the polymeric foamed material of step (d) in the first direction with the plurality of cutters generally moving in unison until the cutters have cut through the polymeric foamed material of step (d) to produce a plurality of polymeric foamed material structures having brace-receiving configurations; and (f) sliding brace members into the brace-receiving configurations of the polymeric foamed material structures of step (e) to produce a plurality of polymeric foamed material panels with each polymeric foamed material panel having one of the brace members.

An alternative embodiment of the present invention also accomplishes its desired objects by broadly providing a method for producing a polymeric foamed material structure having a slot comprising the steps of:

(a) providing a polymeric foamed material having a defined surface and a pair of opposed ends (b) cutting with a cutter the polymeric foamed material in a generally perpendicular direction from the defined surface until reaching a preslot cut point;

(c) cutting subsequently a first path in the polymeric foamed material with the cutter from the preslot cut point until reaching a first cut point;

(d) moving the cutter in the polymeric foamed material of step (c) a predetermined distance from the first cut point to a second cut point; and (e) cutting subsequently from the second cut point a second path in the polymeric foamed material of step (d) with the cutter until the cutter reaches a postslot cut point to produce a polymeric foamed material structure having a slot terminating in said opposed end.

In the immediate foregoing method of the present invention, the cutter is preferably a computer-operated hot wire cutter having a wire diameter with a generally known diameter measurement, and the slot of step (e) has a width equal to about twice the generally known diameter measurement of the wire diameter, and a width equal to about twice the predetermined distance of step (d). A stud member may be slid into the slot of step (e).

An alternative embodiment of the present invention further also accomplishes its desired objects by broadly providing a method for producing at least one polymeric foamed material structure having at least one slot comprising the steps of:

(a) providing at least one cutter;

(b) cutting with the cutter of step (a) a polymeric foamed material until the cutter reaches at least one respective preslot cut point;

(c) cutting subsequently with cutter from the respective preslot cut point of step (b) at least one respective path in the polymeric foamed material of step (b) until the cutter reaches at least one first cut point;

(d) forming with the cutter in the polymeric foamed material of step (c) at least one respective off-set path communicating with the respective path of step (c) to form at least one slot within the polymeric foamed material of step (c); and (e) cutting subsequently the polymeric foamed material of step (d) with the cutter until the cutter has cut through the polymeric foamed material of step (d), producing at least one polymeric foamed structure having at least one slot.

In the immediate foregoing method for an improved embodiment of the present invention, the at least one respective path has at least one respective path length, and the at least one respective off-set path communicates with the at least one respective path along the at least one respective path length of the at least one respective path, such that the at least one respective path and the least one respective off-set path together form the at least one slot within the polymeric foamed material of step (c). Preferably, the at least one cutter comprises a plurality of computer-operated hot wire cutters cutting a plurality of respective paths in the polymeric foamed material of step (b) and forming a plurality of respective off-set paths in the polymeric foamed material of step (c), such that the plurality of respective paths and the plurality of respective off-set paths together form a plurality of respective slots in the polymeric foamed material of step (c), and such that, after the cutting step (e) with the plurality of hot wire cutters, a plurality of polymeric foamed structures are produced having a plurality of slots. A plurality of stud members are slid into the plurality of slots.

It is therefore an object of the present invention to provide a method for producing a polymeric foamed material panel.

It is another object of the present invention to provide a method for forming a polymeric foamed material structure.

It is yet further an object of the present invention to provide a polymeric foamed material panel.

These, together with the various ancillary objects and features which will become apparent to those skilled in the art as the following description proceeds, are attained by these novel methods and polymeric foamed material panels, a preferred embodiment being shown with reference to the accompanying drawings, by way of example only, wherein:

BRIEF DESCRIPTION OF THE DRAWINGS

FIG. 4 is a partial perspective view of two panel members disposed contiguous to each other and encapsulated in sheetrock or the like;

FIG. 5 is a top plan view of the pair of contiguous panel members of FIG. 4 encapsulated in sheetrock or the like;

DESCRIPTION OF THE PREFERRED EMBODIMENT

Figure 1:
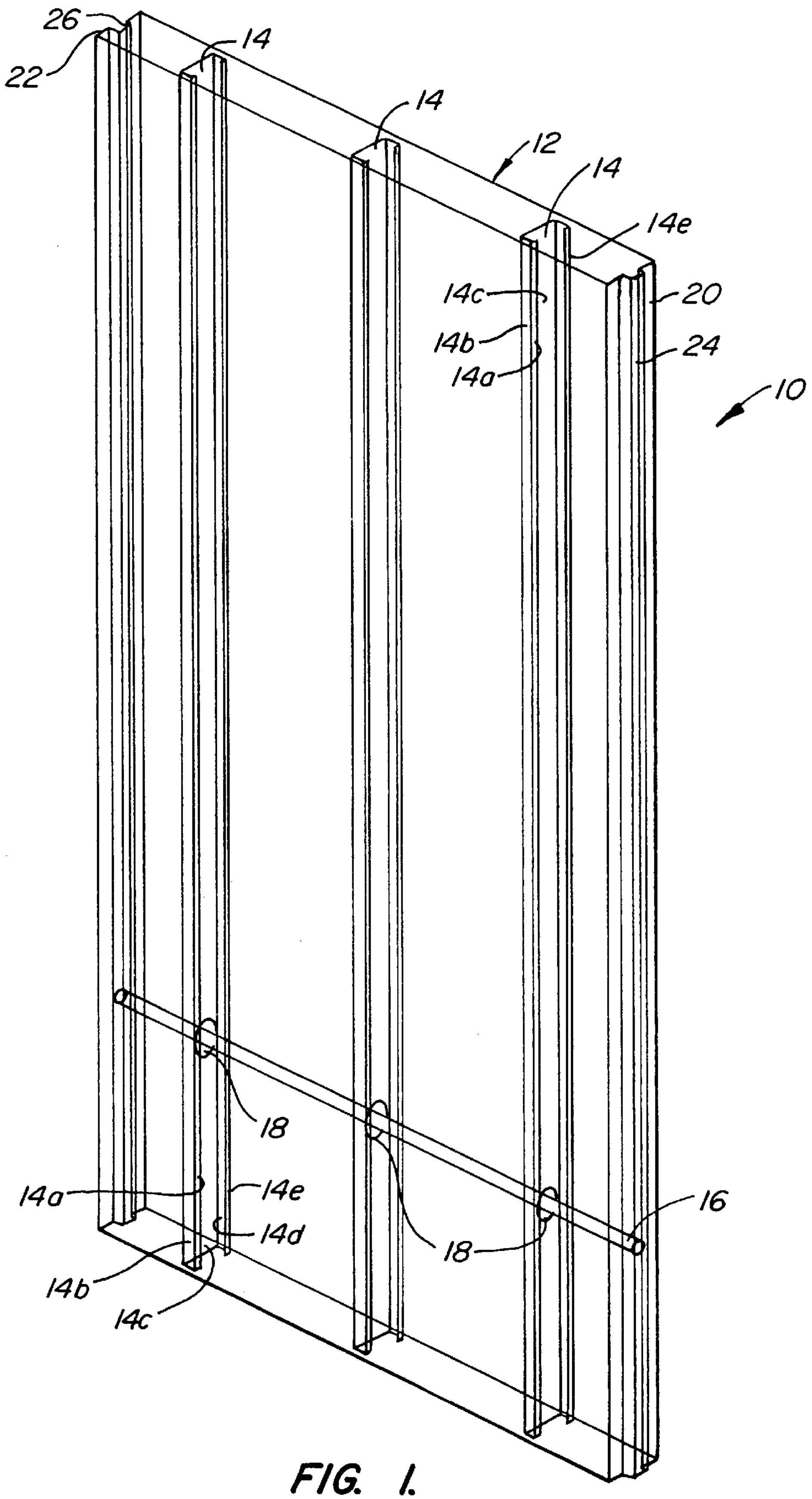
FIG. 1 is a perspective view of a polymeric foamed material panel produced in accordance with the method of the present invention.
Figure 6:
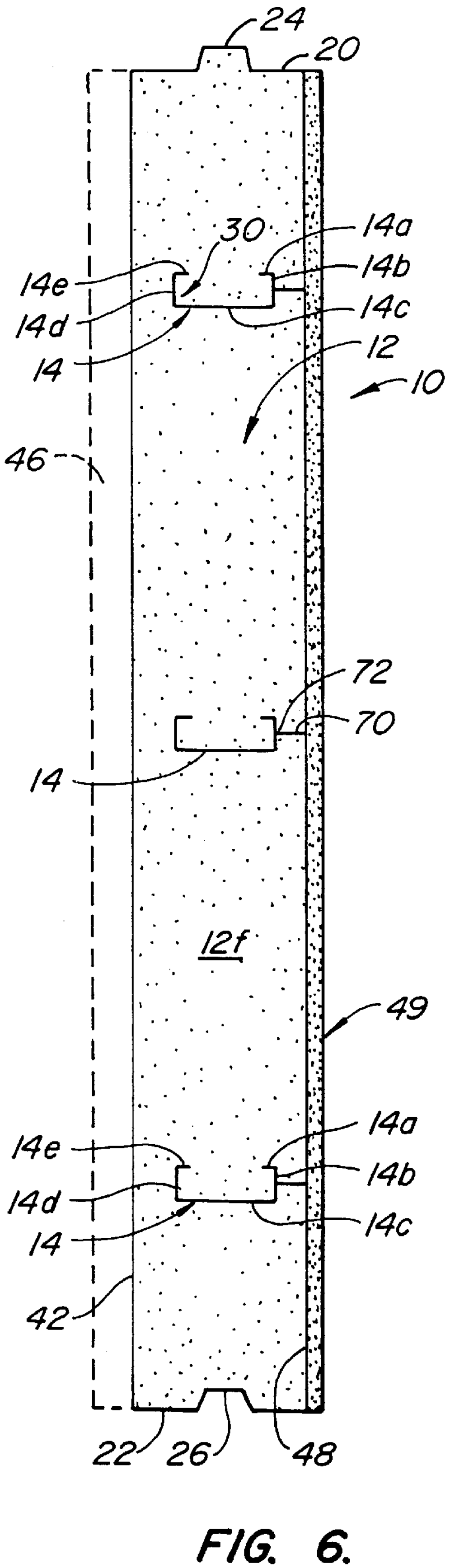
FIG. 6 is a top plan view of a panel member having a plurality of steel studs or brace members disposed therein with the inside wall thereof covered with sheetrock and further having a tongue member at one end and a channel member at another end.
Figure 8:
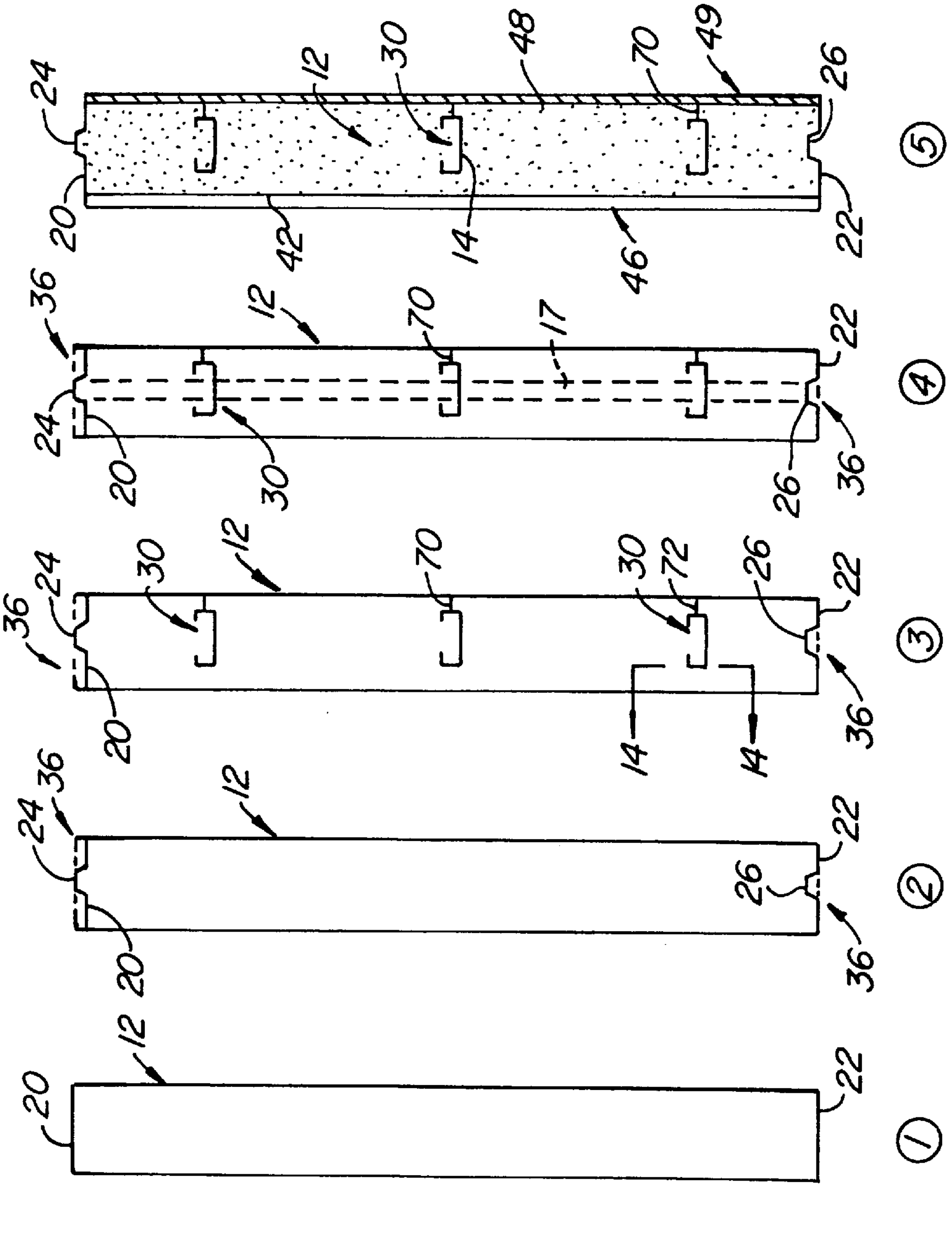
FIG. 8 is a schematic diagram of the various process steps in producing the panel member of the present invention.
Figure 29:
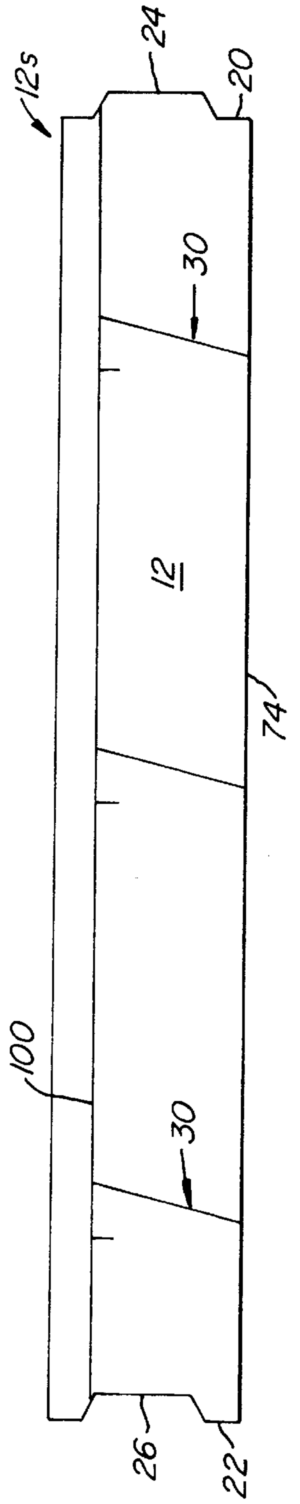
FIG. 29 is an end elevational view of a polymeric foamed material structure produced from the block of polymeric foamed material and after a hot wire cutter has cut a plurality of slots or chases and a track chase in the polymeric foamed material structure.
Figure 33:
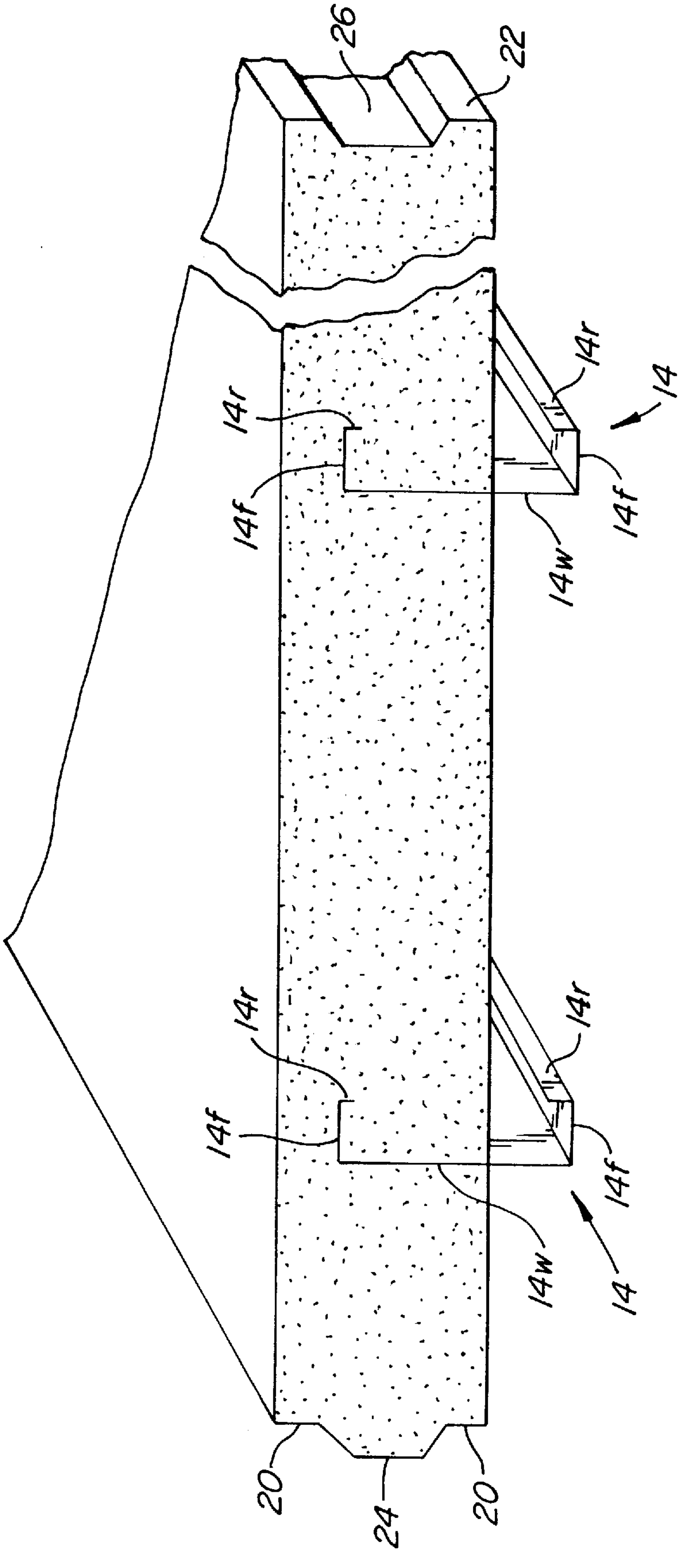
FIG. 33 is a partial perspective view of an end of a polymeric foamed material panel having a plurality of C-shaped studs or brace members inserted within slots in a polymeric foamed material structure with a portion of the studs or brace members protruding therefrom.
Figure 34:
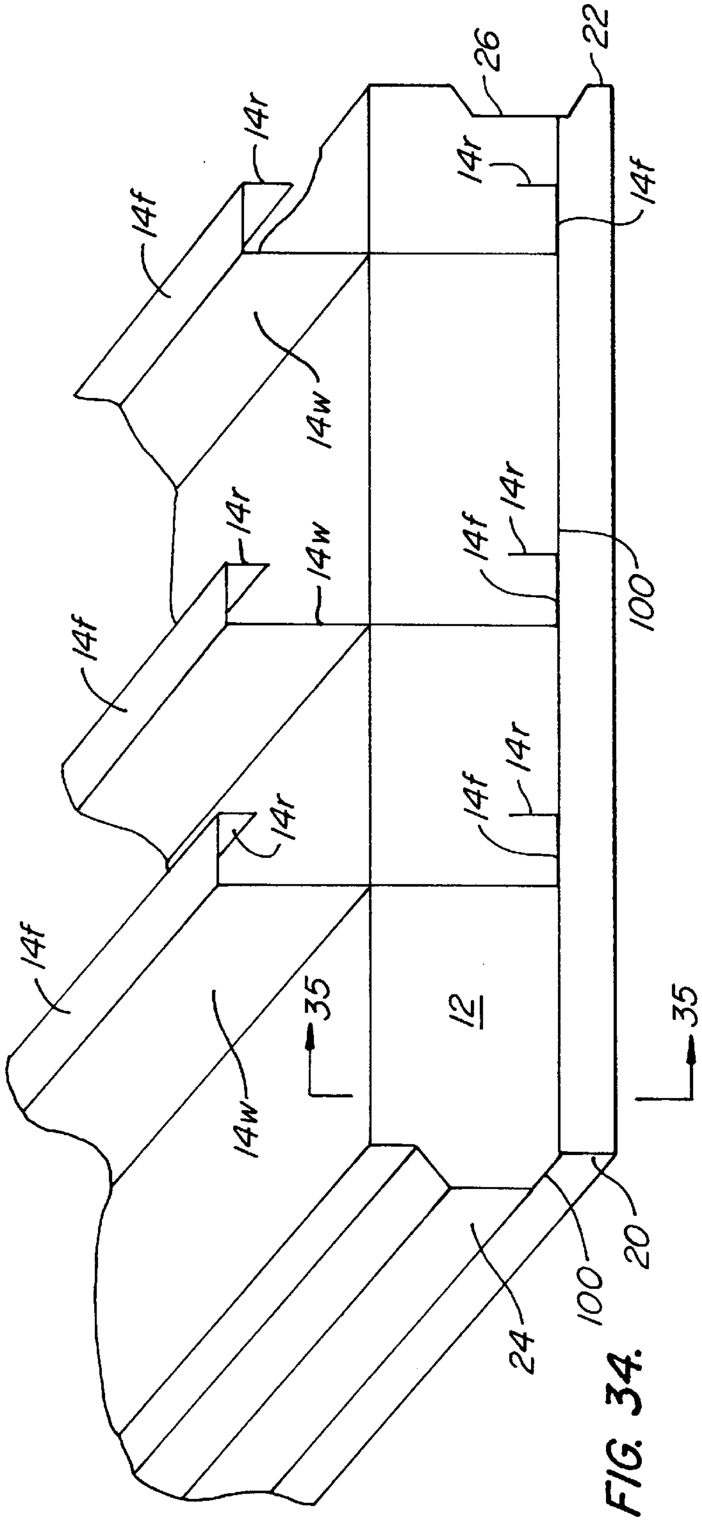
FIG. 34 is a partial perspective view of an end of a polymeric foamed material panel having a plurality of studs or brace members lodged in slots produced by a hot wire cutter with a portion of each of the studs or brace members protruding from the polymeric foamed material panel.

Referring in detail now to the drawings wherein similar parts of the invention are identified by like reference numerals, there is seen a panel member, generally illustrated as 10, produced in accordance with the method of the present invention. The panel member 10 comprises a polymeric foamed material, generally illustrated as 12, and a plurality of stud or brace members 14 disposed in the polymeric foamed material 12. Each of the brace members 14 pass into a slot, generally illustrated as 30 (see FIGS. 4 and 8), which was preferably preformed or precut. As best shown in FIGS. 6 and 29, slot 30 may be non-linear. Each of the brace members 14 may be any suitable brace member such as studs, load-bearing members, etc. constructed of any suitable material (e.g. metal, wood, etc.) Most preferably, the brace members 14 are metal (e.g. a light gauge metal) studs for load-bearing and adding strength to the polymeric foamed material 12. As best shown in FIGS. 1 and 6, each brace member 14 includes brace sides **14*a*, 14*b*, 14*c*, and 14*d* and 14*e* which are all essentially surrounded by the polymeric foamed material 12. Stated alternatively and as best shown in FIGS. 33 and 34, each stud or brace member includes a web 14*w*, a pair of flanges 14*f*—14*f* integrally secured to the web 14*w*, and a pair of flange returns 14*r*—14*r*, respectively integrally bound to the respective flanges 14*f*—14*f*.**

Figure 30:
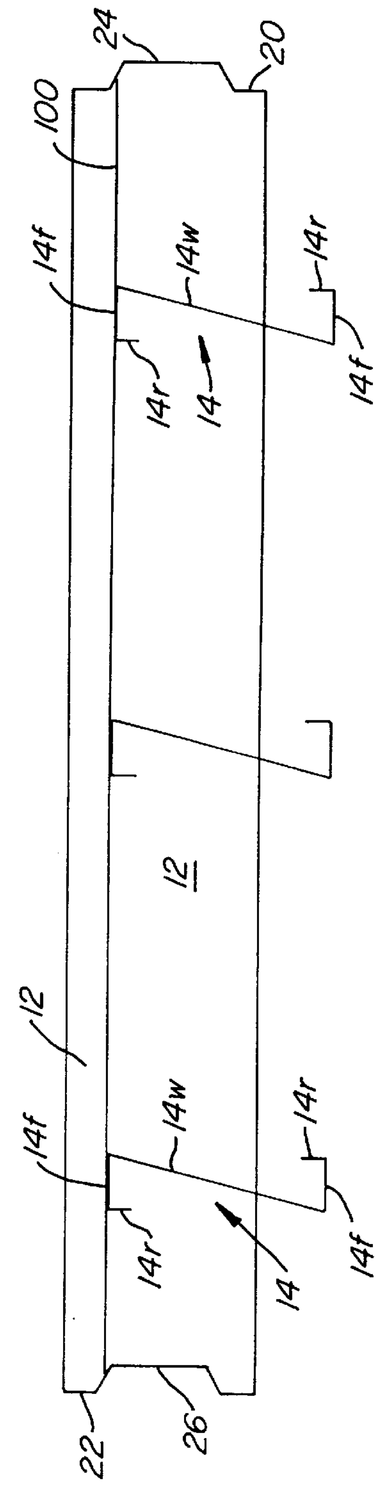
FIG. 30 is an end elevational view of the polymeric foamed material structure of FIG. 29 after a plurality of Z-shaped studs or braces have been inserted into the slots or chases such that a portion of the Z-shaped studs or braces protrudes from the polymeric foamed material structure.
Figure 31:
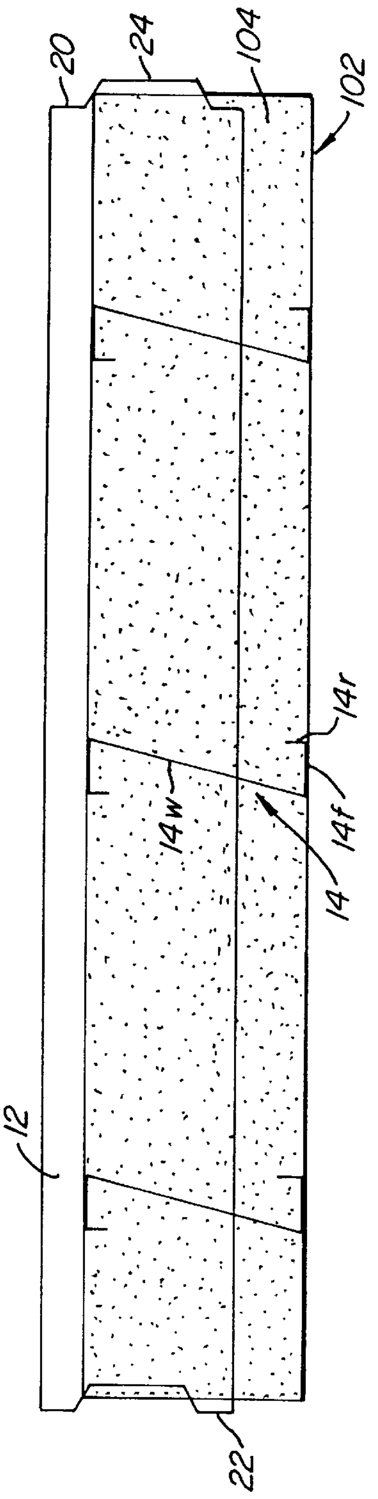
FIG. 31 is an end elevational view of the polymeric foamed material structure in FIG. 30 after a track member has been inserted into the track chase and over the ends of the Z-shaped studs or brace members.
Figure 35:
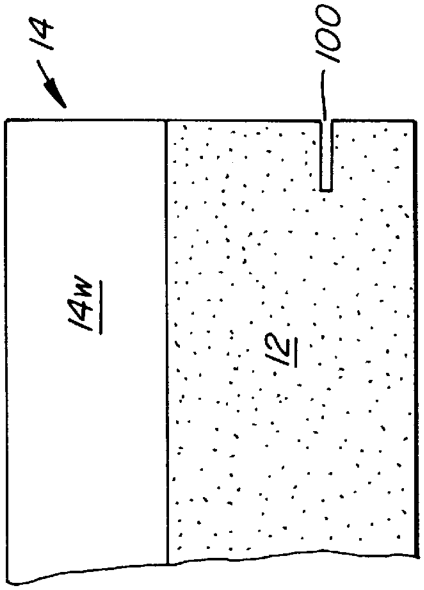
FIG. 35 is a vertical sectional view taken in direction of the arrows and along the plane of line 35—35 in FIG. 34, illustrating a track chase which was cut in the polymeric foamed material by a hot wire cutter.

In the embodiment of the invention shown in FIGS. 30 and 31, each stud or brace member 14 is generally geometrically Z-shaped with the web **14*w* being oblique with respect to flanges 14*f*—14*f* as opposed to being normal thereto as shown in FIGS. 31 and 35. In the embodiment of the invention shown in FIGS. 27, 28, 30, 31, 33 and 34 a portion of each stud or brace member protrudes from the polymeric foamed material 12. More specifically, one of the flanges 14*f*—14*f* and its associated flange return 14*r*, along with a portion of the web 14*w*, are embedded in the polymeric foamed material 12, while the remaining flange 14*f* and its associated flange return 14*r*, along with a remaining portion of the 14*w*, are disposed outside of the polymeric foamed material 12**.

Figure 20:
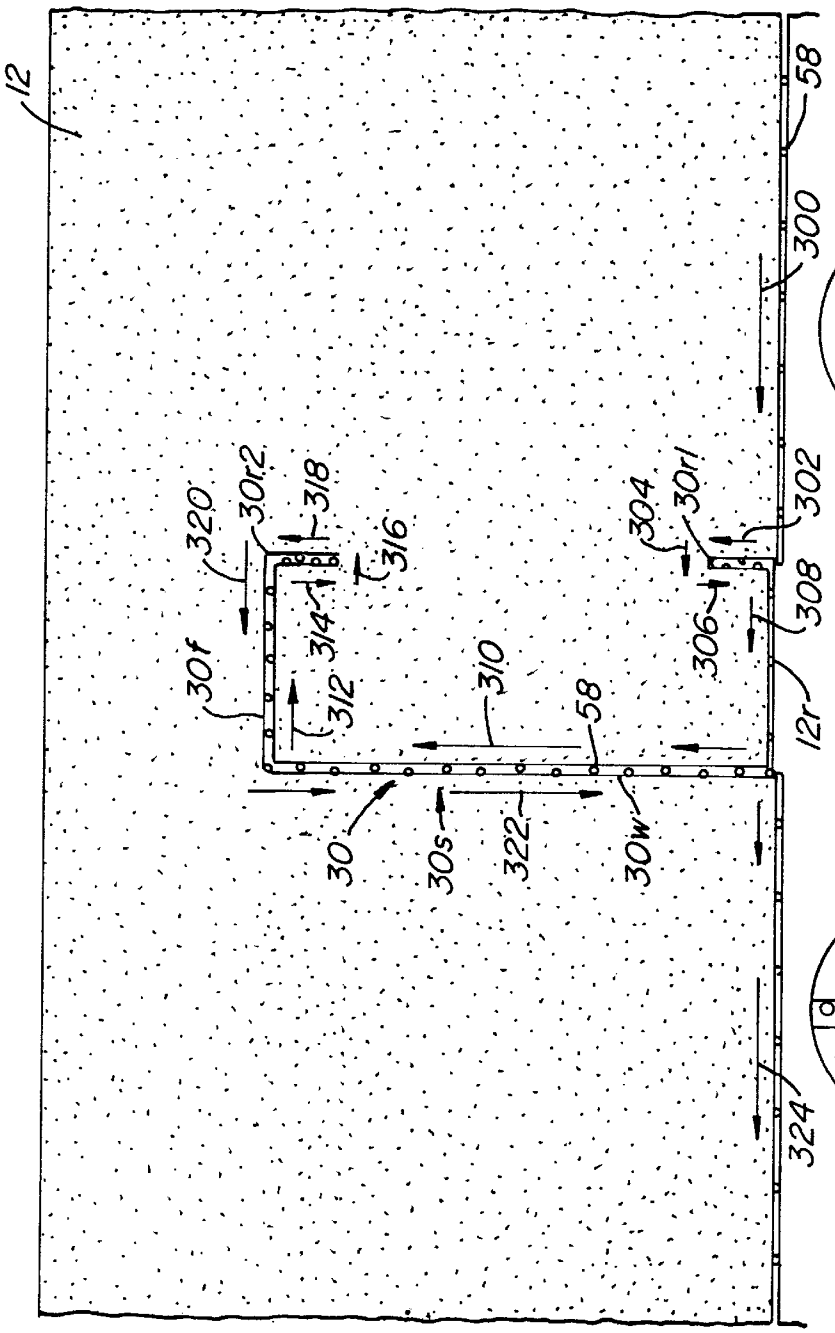
FIG. 20 is an end elevational view of a polymeric foamed structure having a slot formed therein with a hot wire cutter with arrows representing directions and paths that the hot wire cutter travelled in forming the slot.
Figure 21:
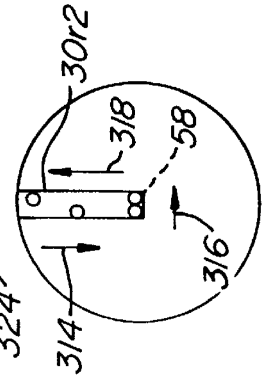
FIG. 21 is an exploded detail view of a section of the slot of FIG. 20 with the hot wire cutter being shown in a dotted line representation and with the arrows showing the directions and paths of travel for the hot wire cutter.
Figure 22:
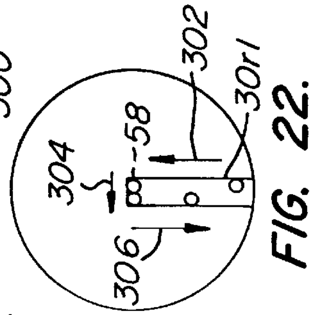
FIG. 22 is an exploded detail view of another section of the slot of FIG. 20 with the hot wire cutter being shown again in a dotted line representation and with the arrows showing again the directions and paths of travel for the hot wire cutter.
Figure 20A:
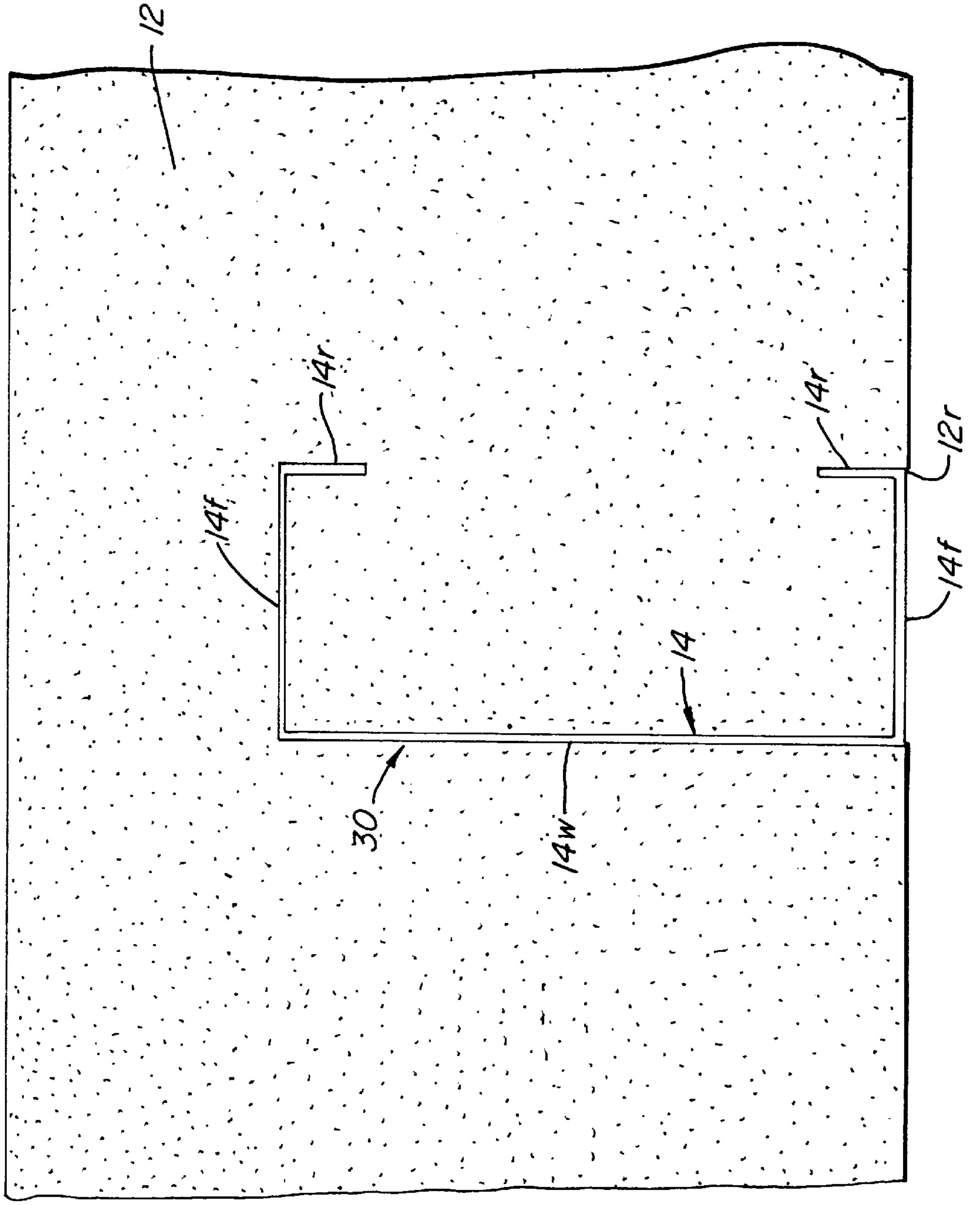
FIG. 20A is an enlarged end elevational view of the polymeric foamed structure of FIG. 20 with a stud or brace member lodged in the slot.

Referring now to FIGS. 20 and 20A, there is seen a slot 30 communicating with a polymeric material recess **12*r*. Slot 30 and polymeric material recess 12*r* were cut in the polymeric foamed material in accordance with a cutting procedure set forth hereinafter. The slot 30 more specifically includes vertical slot section 30$r_1$ and a generally inverted L-shaped slot section 30$_s$ which includes individual slot sections 30*w*, 30*f* and 30$r_2$. As best shown in FIG. 20, slot sections 30$r_1$ and 30*w* directly communicate with the polymeric material recess 12*r*. A brace member 14 lodges in slot section 30$r_1$, in polymeric material recess 12*r*, and in slot section 30*s*. More specifically and as best shown in FIG. 20A, one flange return 14*r* and one flange 14*f* of a brace member 14 respectively lodges in slot section 30$r_1$ and polymeric material access 12*r*, while the remaining web 14*w*, flange 14*f* and flange return 14*r* of the brace 14 respectively lodges in slot section 30*w*, slot section 30*f* and slot section 30$r_2$ of the slot section 30*s*.**

Figure 20B:
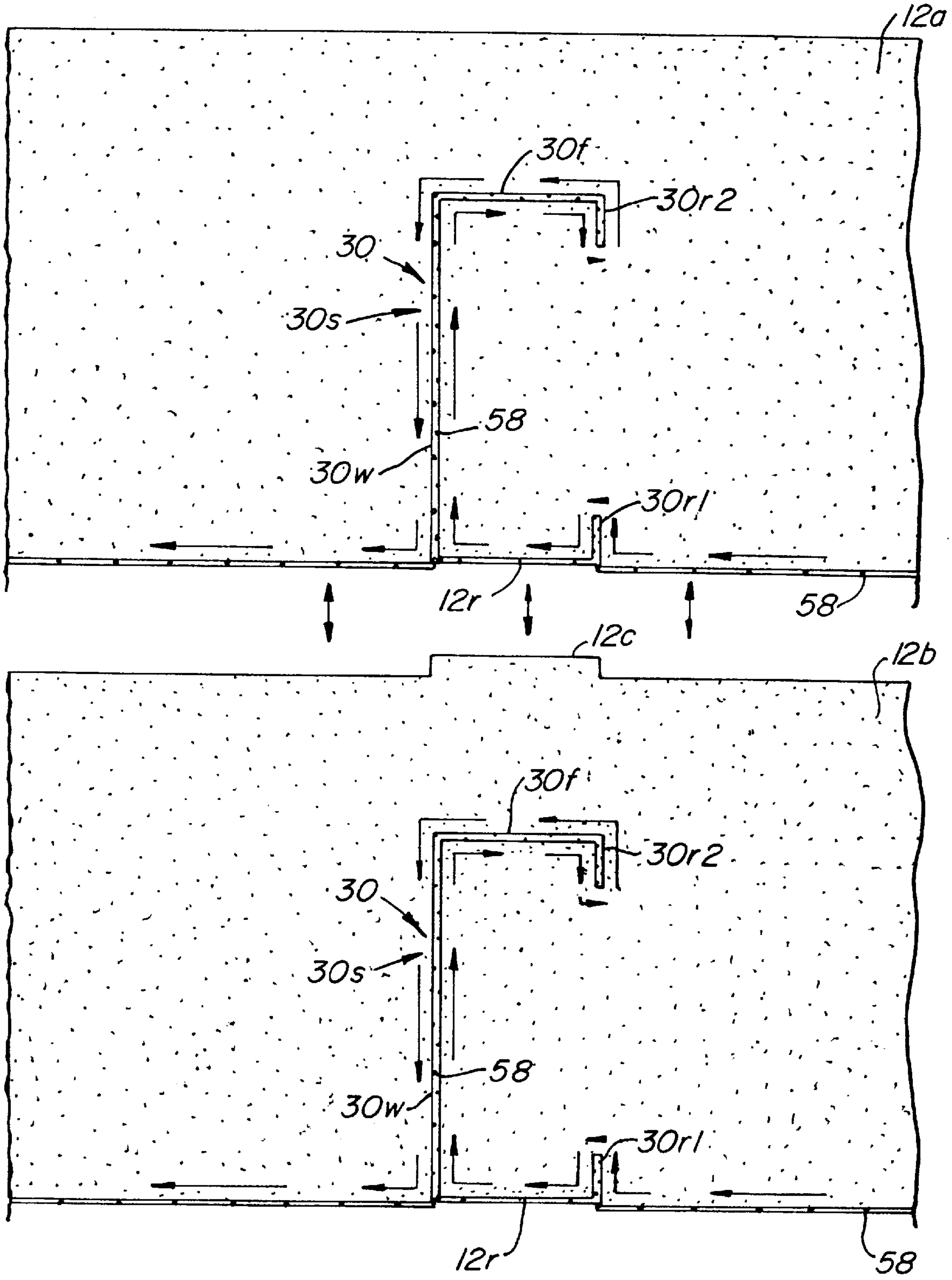
FIG. 20B is an end elevational view of a pair of polymeric foamed material structures which were integrally bound to each other before being severed, with one polymeric foamed material structure having a polymeric material recess and with the other polymeric foamed material structure having a polymeric material crest which may serve as a benchmark or indicator for a brace member when the brace member is lodged in a slot located immediately below the polymeric material crest.
Figure 23:
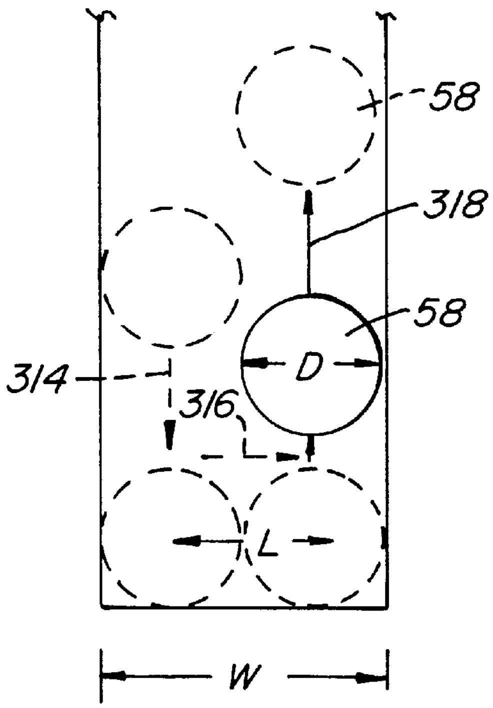
FIG. 23 is an enlarged view of the detail view of FIG. 21 with "W" indicating the width of the slot and "D" indicating the diameter of the hot wire cutter.
Figure 24:
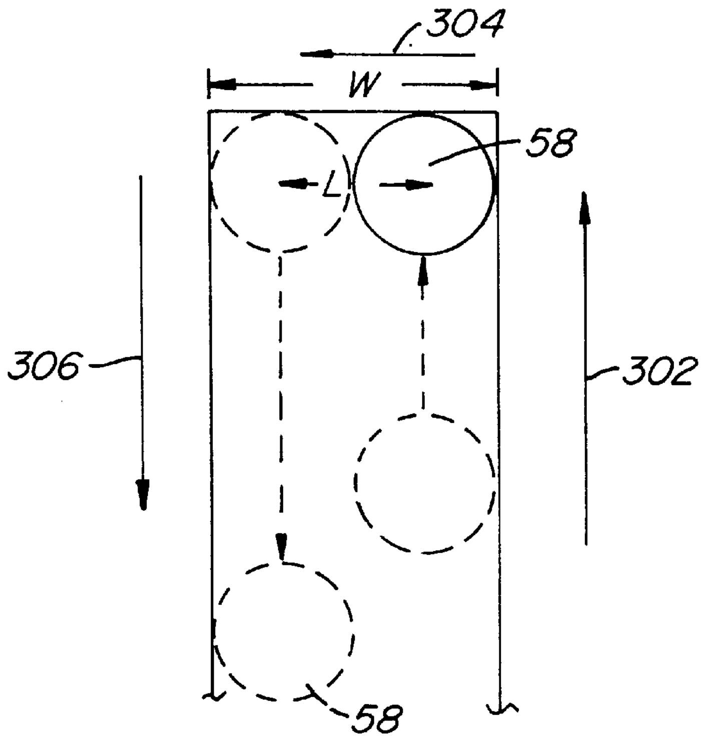
FIG. 24 is an enlarged view of the detail view of FIG. 22.
Figure 25:
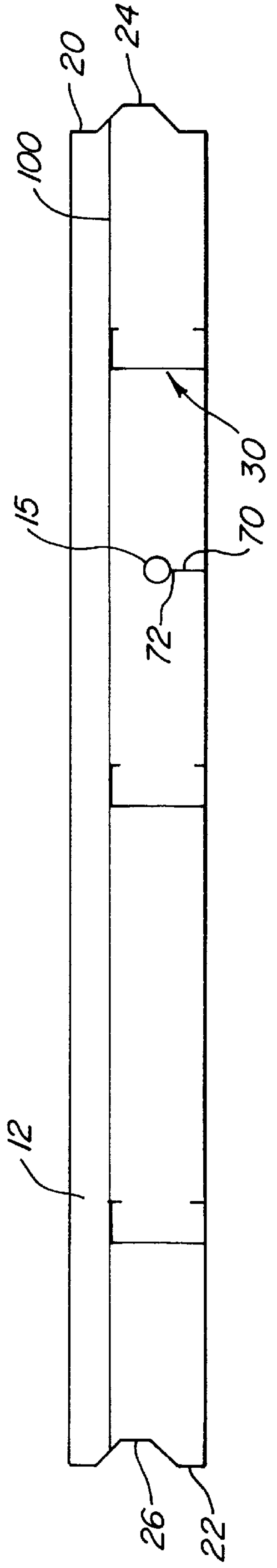
FIG. 25 is an end elevational view of a polymeric foamed material structure produced from a block of polymeric foamed material and after a hot wire cutter has cut a plurality of slots (i.e., C-brace chases), a polymeric opening (i.e., a wiring chase), and a track chase in the polymeric foamed material structure.
Figure 26:
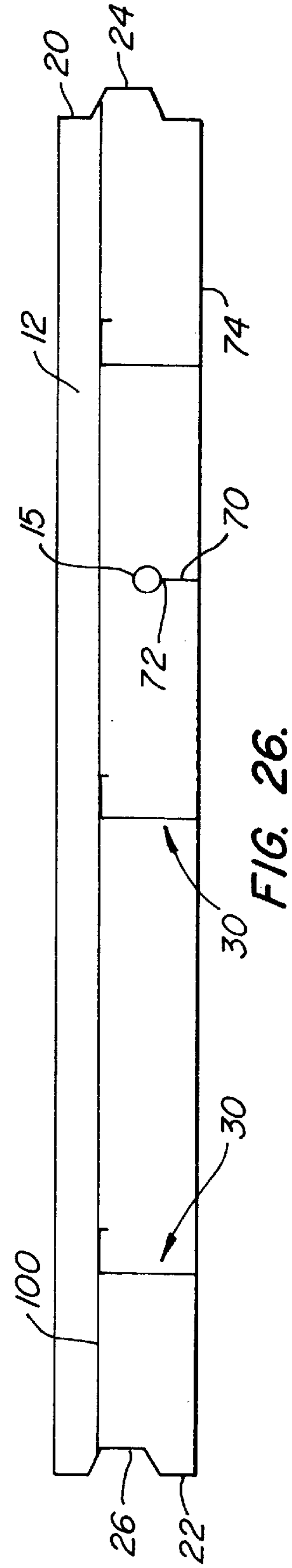
FIG. 26 is another end elevational view of a polymeric foamed material structure produced from a block of polymeric foamed material and after a hot wire cutter has cut in the polymeric foamed material a plurality of slots or chases for receiving brace or stud members, a polymeric opening or wiring chase for receiving a conduct, and a track chase for receiving a track member.

After a polymeric material recess **12*r* has been cut in a polymeric foamed material 12, the polymeric foamed material 12 adjacent or contiguous to the polymeric foamed material 12 having the polymeric material recess 12*r* has a polymeric material crest or ridge 12*c* as best shown in FIG. 20B. This polymeric material crest 12*c* previously integrally resided within the polymeric material recess 12*r*, and may be either removed, such as by sanding, or be used as a benchmark or indicator for a location of a brace member 14. Referring more particularly to FIG. 20B wherein there is seen two severed polymeric foamed materials 12*a* and 12*b*, with polymeric foamed material 12*a* having polymeric material recess 12*r* and with polymeric foamed material 12*b* having the polymeric material crest 12*c*. When a brace member 14 is slid into the slot 30 of the polymeric foamed material 12*b*, the brace member 14 in the polymeric foamed material 12*b* would be immediately below (e.g. one (1) to three (3) inches below) the polymeric material crest 12*c*. Thus, a person looking at the planar side of polymeric foamed material 12*b* having the polymeric material crest 12*c*, and not being able to see the planar side of the polymeric foamed material 12*b* where the brace member 14 is exposed, would still know that immediately below the polymeric material crest 12*c* lies a brace member 14. Thus, the polymeric material crest 12*c* may serve as a benchmark or indicator for the location of a brace member 14**.

Figure 27:
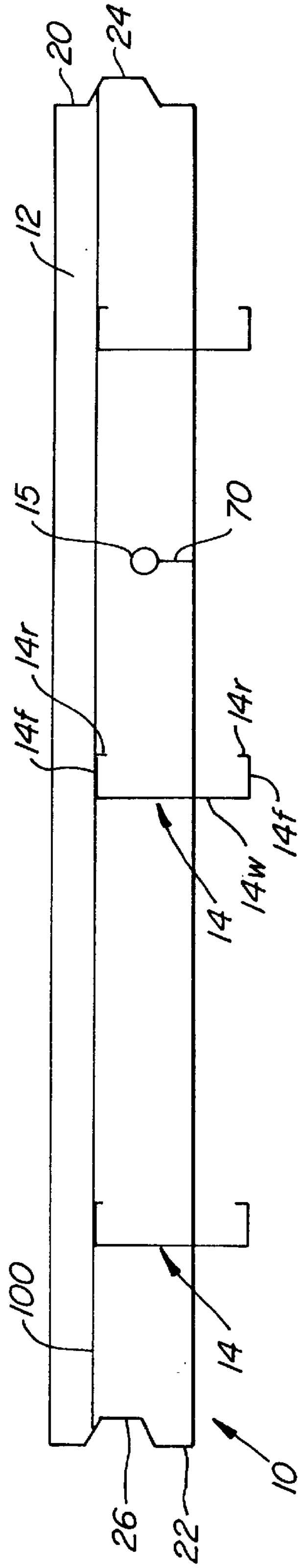
FIG. 27 is an end elevational view of the polymeric foamed material structure of FIG. 26 after brace or stud members (i.e., C-shaped braces or studs) have been slid into the plurality of slots or chases such that a portion of the brace members protrude from the polymeric foamed material structure.
Figure 28:
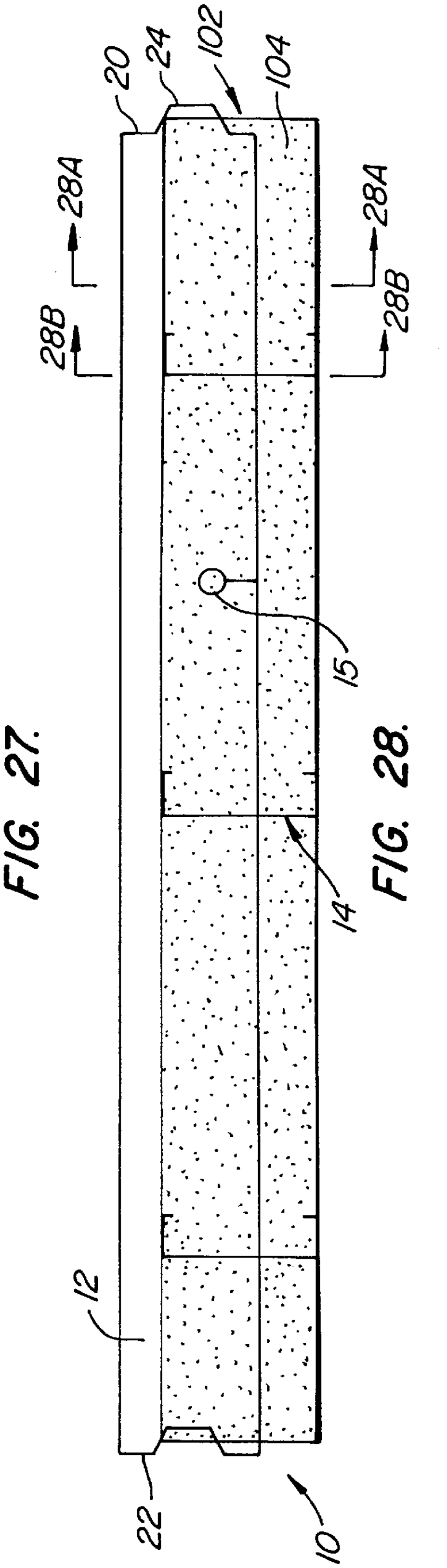
FIG. 28 is an end elevational view of the polymeric foamed material structure of FIG. 27 after a track member has been slid into the track chase and over the ends of the brace or stud members.
Figure 28A:
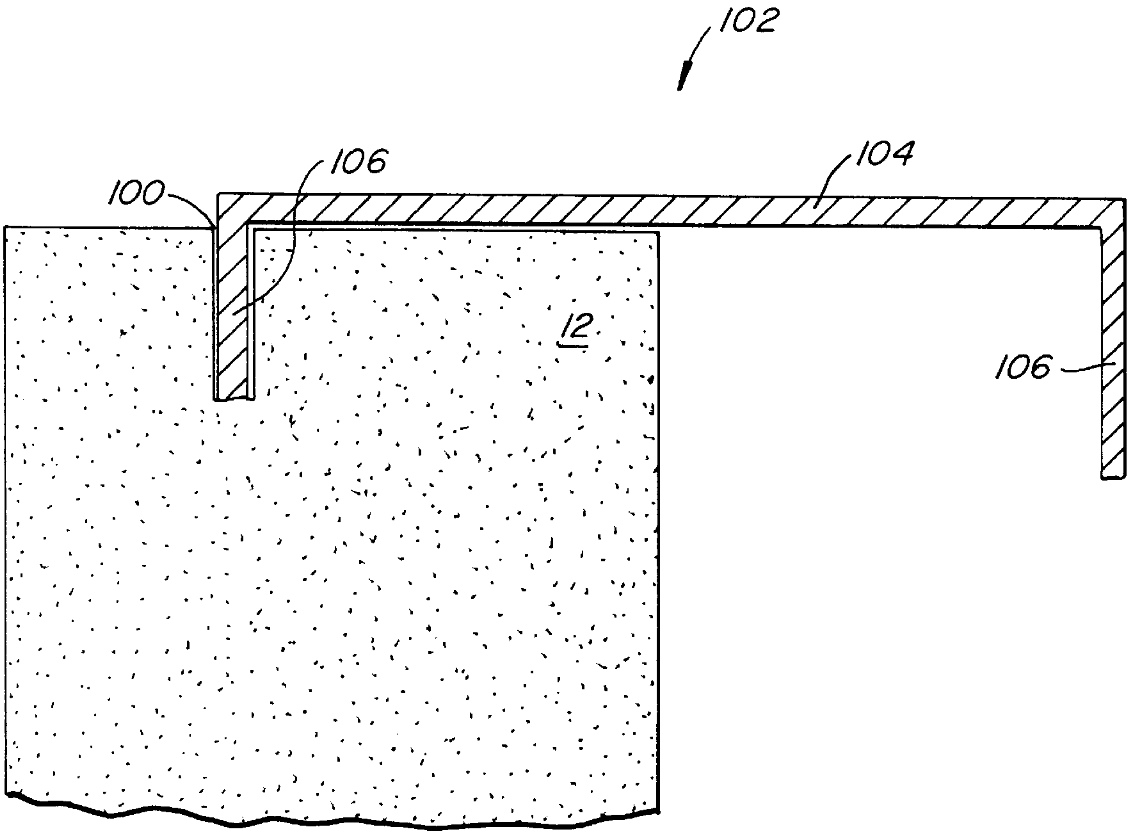
FIG. 28A is a vertical sectional view taken in direction of the arrows and along the plane of line 28A—28A in FIG. 28.
Figure 28B:
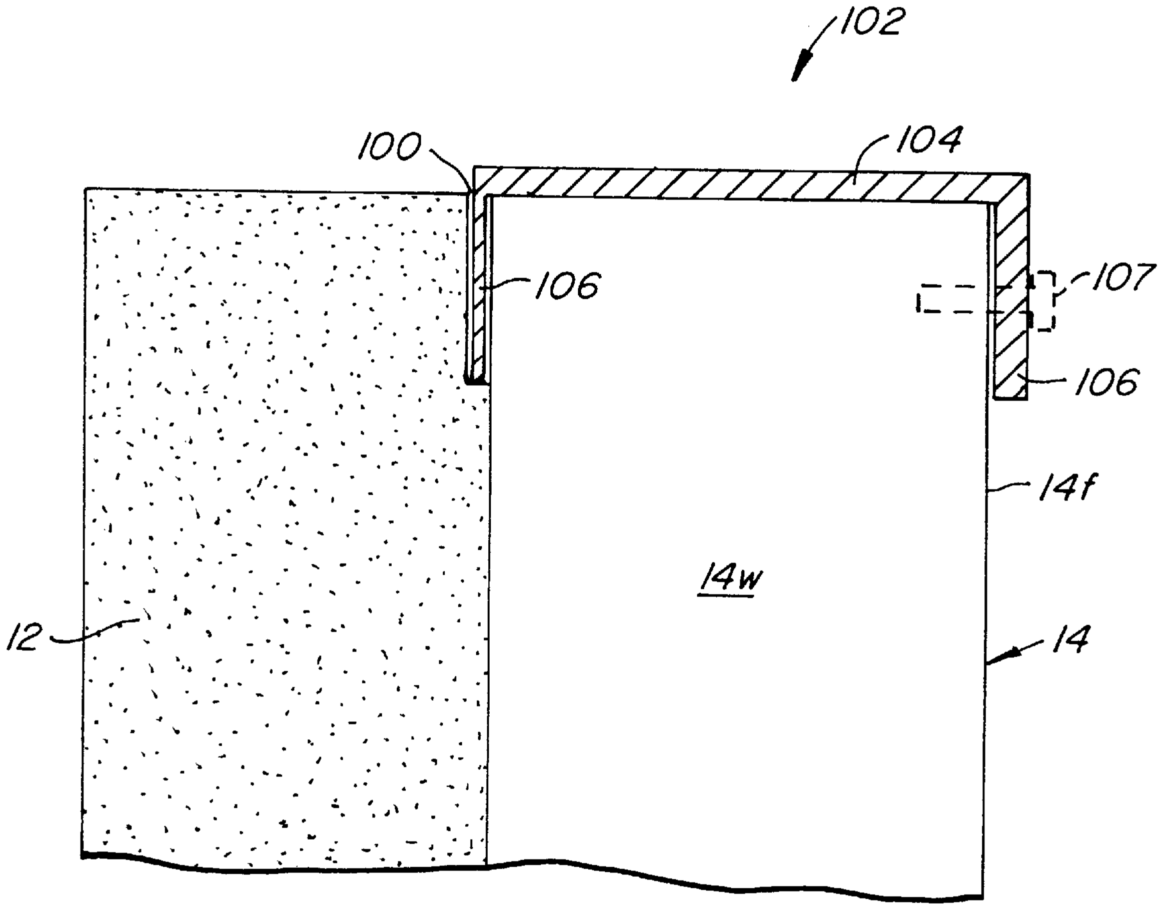
FIG. 28B is a vertical sectional view taken in direction of the arrows along the plane of line 28B—28B in FIG. 28.

In the embodiment of the invention shown in FIGS. 25–31, 34 and 36, the polymeric foamed material 12 includes a track chase 100 (i.e., a cut slot ranging from about one-quarter (¼) inch to about 1½ inches in depth), as best shown in FIG. 35. A track member 102 is provided and includes a track base 104 with a pair of track flanges 105–106 integrally bound thereto. As best shown in FIGS. 28A and 28B, one of the track flanges 106 may lodge in the track chase 100 with a portion of the track base 104 extending away from the polymeric foamed material 12 (see FIG. 28A), such that one of the track flanges 106 associated with the track base 104 is situated outside of the polymeric foamed material 12. The track flange 106 disposed outside of the polymeric foamed material 12 may be secured to one of the flanges **14*f* of the stud or brace member 14 by a screw or bolt 107 as best shown in FIG. 28**B.

The panel member 10 may additionally include a conduit 16 also disposed in the polymeric foamed material 12, preferably transversely disposed therein and generally normal with respect to the brace members 14. The conduit 16 passes into a transverse polymeric opening 17 (see FIGS. 10 and 11) in the polymeric foamed material 12. In the embodiment of the invention shown in FIGS. 15–35, the polymeric foamed material 12 in the panel member 10 is provided with a longitudinal (and/or vertical) polymeric opening 15 which is preferably for receiving a conduit 19 (see FIG. 36). The conduits 16 and 19 may be employed for any suitable use; for example, a utility receptor (e.g. electrical wires), water, gas, etc. The polymeric openings 15 and 17 as well as slot 30 are preferably formed with at least one seared or cartherized wall 32. Cartherizing and/or searing the wall(s) of the polymeric openings 15 and 17 and/or slot 30 hardens and smoothes the wall(s) to facilitate the sliding of the conduits 16 and 19 and to brace member(s) 14 thereinto. As will be further explained below, the seared or cartherized wall 32 is preferably formed by hot wire cutting.

Figure 36:
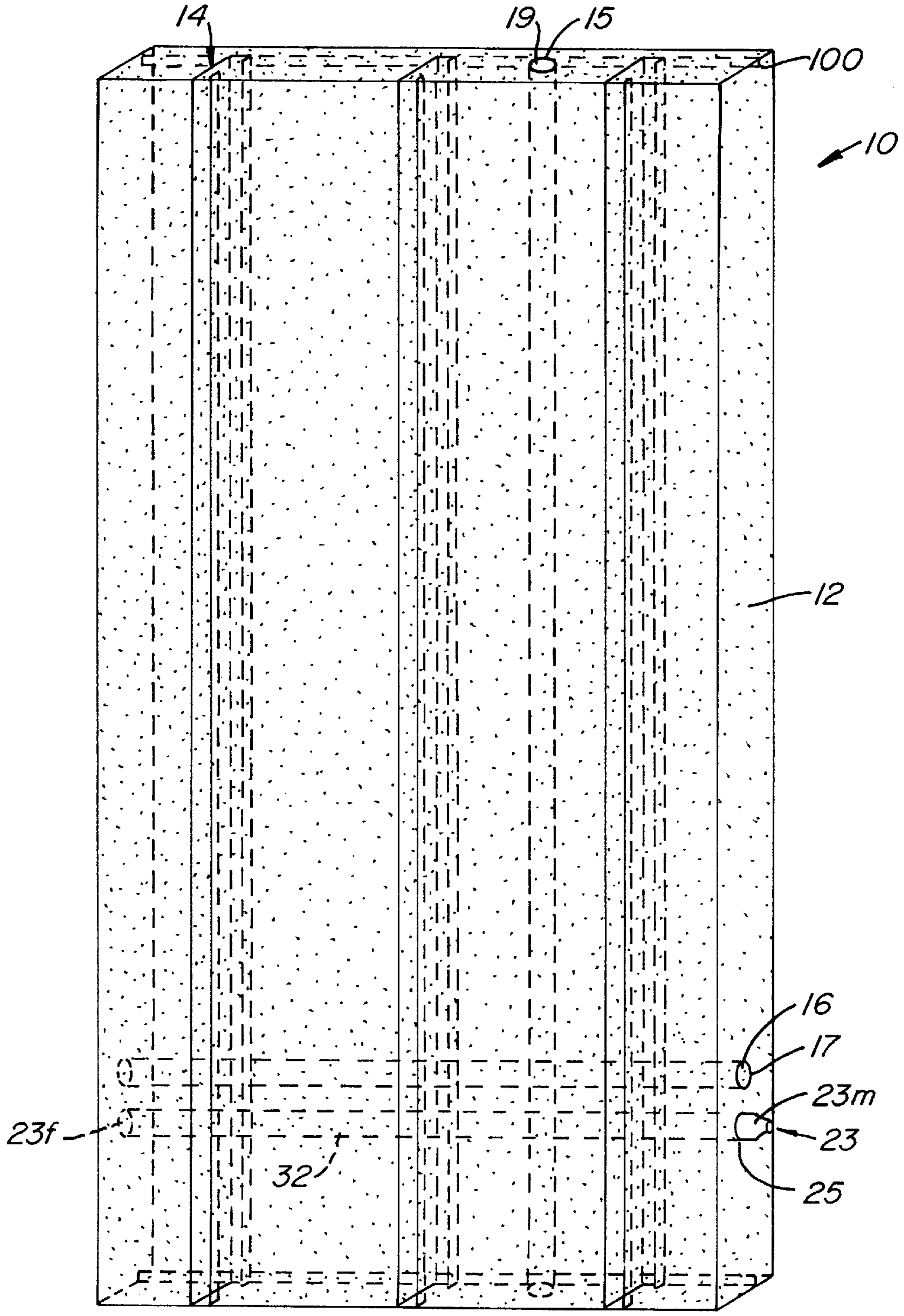
FIG. 36 is a perspective view of a polymeric foamed material panel having a plurality of braces embedded therein with a vertical conduit having been slid into a vertical wiring chase, and with a horizontal conduit having been slid into a horizontal wiring chase, and including an internal reinforcing member lodged within a horizontal polymeric opening with a male end of the internal reinforcing member protruding from a side of the polymeric foamed material panel.
Figure 37:
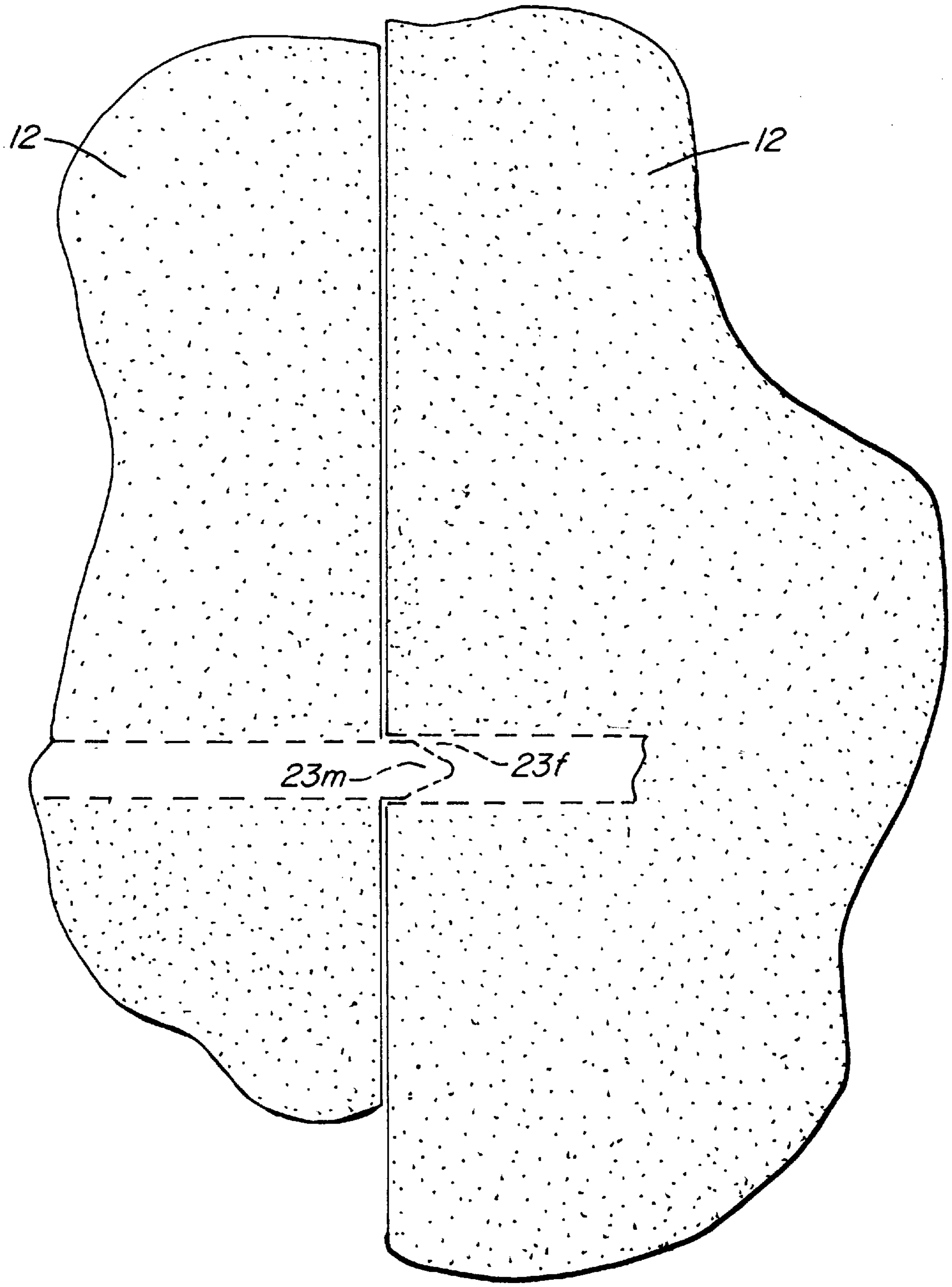
FIG. 37 is a partial side elevational view of a pair of engaged polymeric foamed material panels having respective internal reinforcing members with the male end of one internal reinforcing member lodged in the female end of the other internal reinforcing member.

The panel member 10 may also additionally include an internal reinforcing member, generally illustrated as 23 in FIG. 36. The reinforcing member 23 includes a male end 23*m* and a female end 23*f*. When two panels 10—10 are placed next to each other in a side-to-side relationship for assembling a structure, the male end 23*m* of one reinforcing member 23 in one panel 10 slidably lodges into the female end 23*f* of the other panel 10, as best shown in FIG. 37. The reinforcing member 23 lodges in a transverse polymeric opening 25, which is formed similarly as transverse polymeric opening 17 is formed. The reinforcing member 23 preferably extends from a tongue (identified as "24" below) on one end of the panel member 10 to a channel (identified as "26" below) on the other end of the panel member 10. Thus, the male end 23*m* of the reinforcing member 23 would protrude from a tongue while the female end 23*f* of the reinforcing member 23 would communicate with a channel. Transverse polymeric opening 25 is formed with at least one seared or cartherized wall 32 to facilitate the sliding of the reinforcing member 23 thereinto.

Each of the brace members 14 has an opening 18 that has a circumference (or perimeter) which is larger than the circumference (or perimeter) of the conduit 16 and larger than the circumference (or perimeter) of the polymeric opening 17 such that after any and all openings 18 have been aligned with any and all polymeric openings 17, the conduit 16 may pass through a respective polymeric opening 17 and through a respective polymeric opening 18 in the brace members 14, preferably without contacting any of the circumferential perimeter of the opening 18 and be supported in a suspended relationship with respect thereto by the polymeric foamed material 12. When ever "perimeter" is stated in the specification and in the claims, it is to be understood to mean any boundary of any opening (e.g. a square opening, a circular opening, etc.) Thus, the term "perimeter" is to include opening, circumference.

For the embodiment of the invention shown in FIGS. 36 and 37, each of the brace members 14 would have an additional opening 18 that has a circumference (or perimeter) which is larger than the circumference (or perimeter) of the internal reinforcing member 23 and larger than the circumference (or perimeter) of the polymeric opening 25 such that after any and all additional openings 18 have been aligned with any polymeric opening 25, the internal reinforcing member 23 may lodge in the polymeric opening 25 and pass through the additional opening 18 in the brace members 14, preferably without contacting any of the circumferential perimeter of the additional opening 18 such as to be supported in a suspended relationship with respect thereto by the polymeric foamed material 12.

Figure 13:
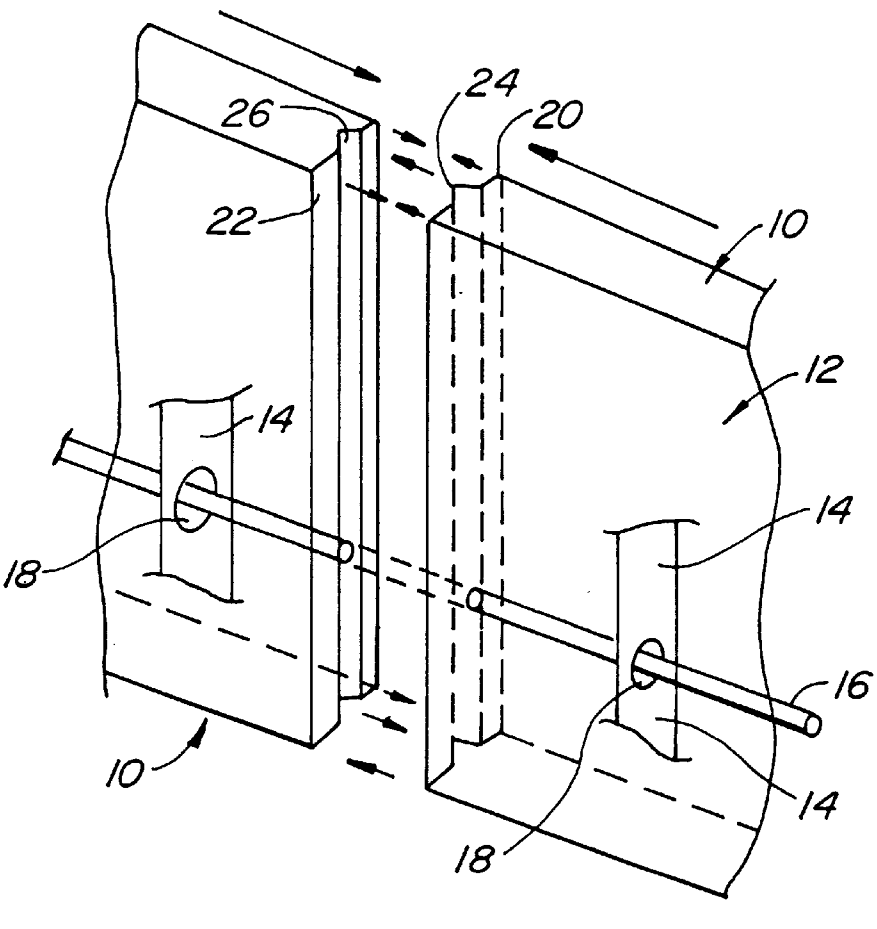
FIG. 13 is a partial perspective view of two polymeric foamed material panel members with ends of the two polymeric foamed material panel members being generally aligned such that the tongue on one end of one panel member may slid into a channel in one of the ends of the other panel member.
Figure 12:
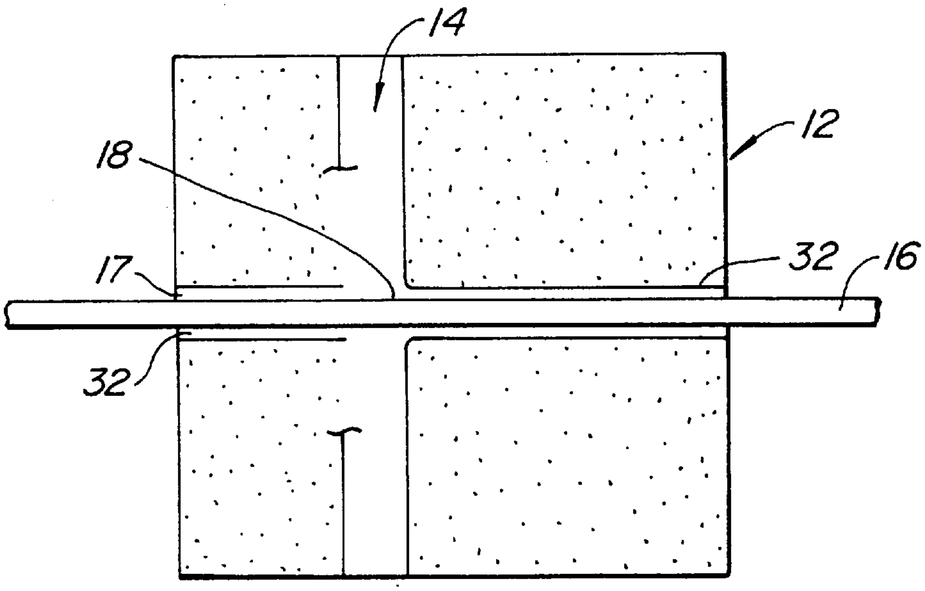
FIG. 12 is vertical sectional view of the polymeric foam material supporting a conduit while the conduit passes through an opening in the brace or stud member without touching any of the circumference or perimeter of the stud or brace member.
Figure 14:
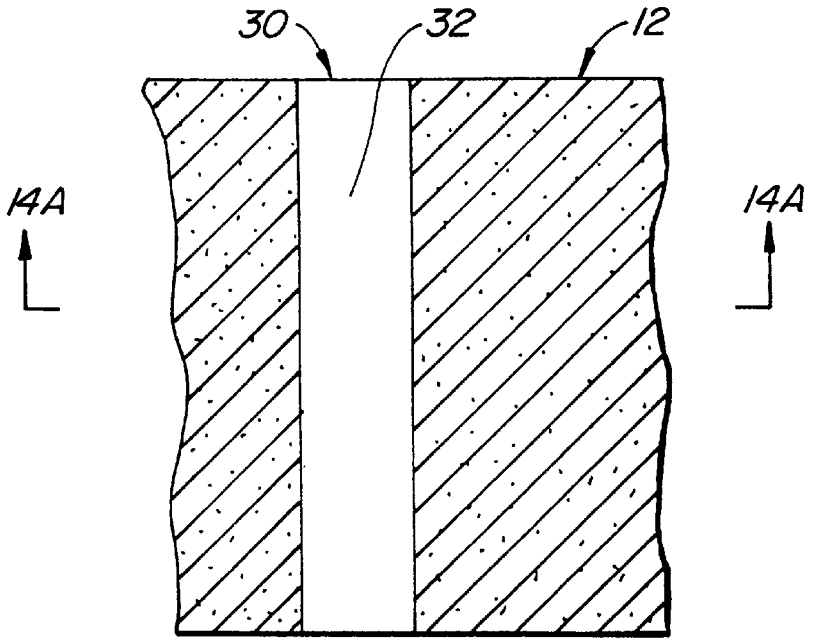
FIG. 14 is a partial vertical sectional view taken in direction of the arrows and along the plane of line 14—14 in FIG. 8.
Figure 14A:
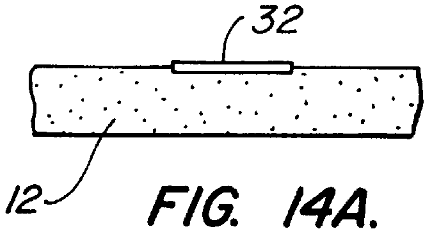
FIG. 14A is a vertical sectional view taken in direction of the arrows and along the plane of line 14A—14A in FIG. 14.
Figure 15:
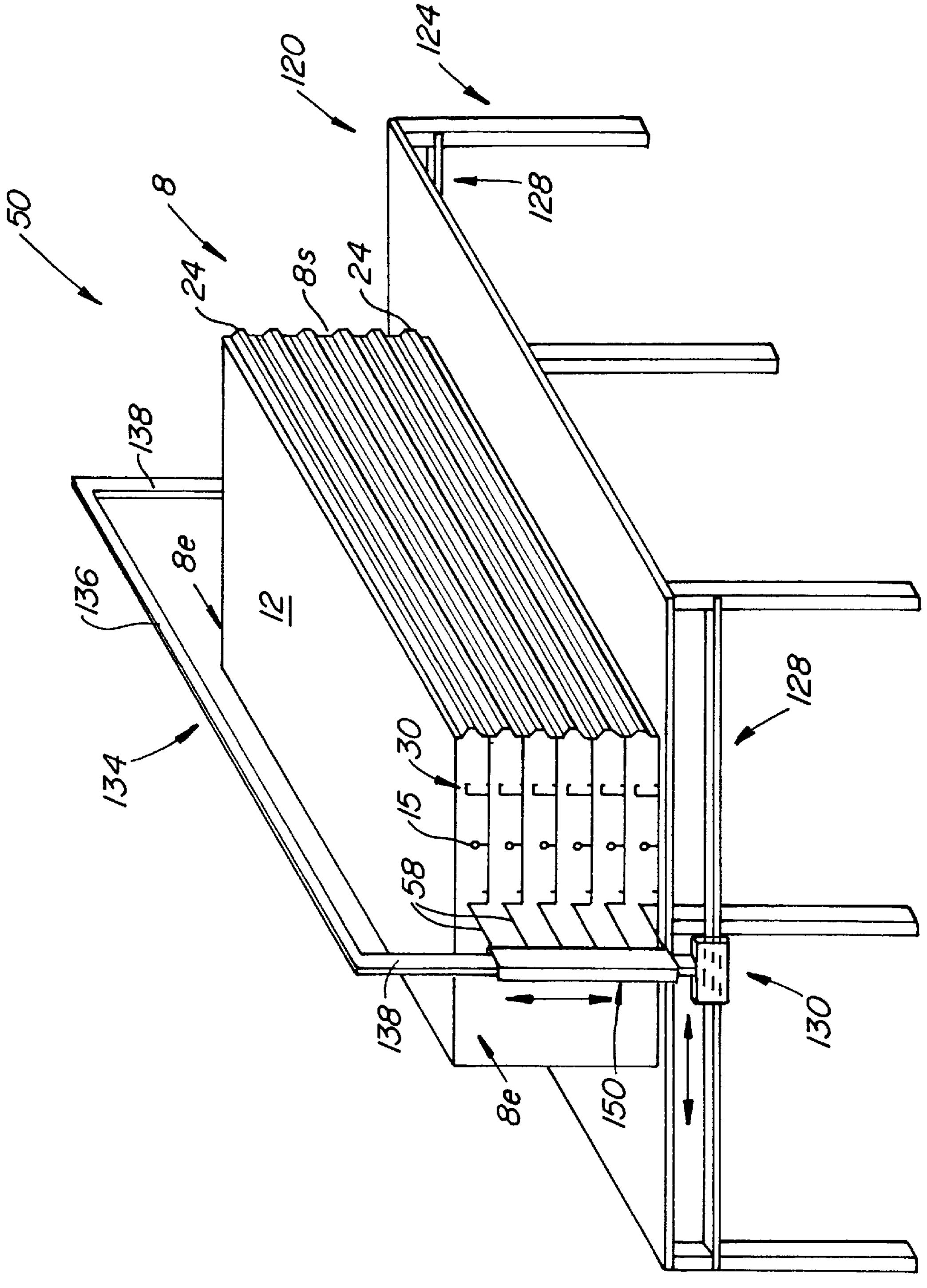
FIG. 15 is a perspective view of a plurality of hot wire cutters cutting through a block of polymeric foamed material to produce a plurality of polymeric foamed structures having slots for receiving brace or stud members and having chases (or polymeric openings) wherethrough conduits pass.

Each of the panel members 10 also preferably includes ends 20 and 22 (each a defined edge). End 20 is formed with a tongue 24 and the end 22 is formed with a channel 26. Formation of the tongue 24 and/or the channel 26 is preferably accomplished by cutting (preferably hot wire cutting) a portion 36 (see FIG. 8) of polymeric foamed material 12 off of the end 20 and/or end 22 respectively. As best shown in FIG. 13, a pair of panel members 10—10 may be interengaged by sliding the tongue 24 of end 20 into the channel 26 of end 22 to form a structure. As further best shown in FIG. 13, each of the panel members 10 includes the brace member 14 having the opening 18 with the conduit 16 passing through and between the two interengaged panel members 10—10 such that the polymeric foamed material 12 of each of the panel members 10 supports the conduit 16 in a space relationship with respect to the perimeter (i. e. circumference) of each of the openings 18. In other words, the conduit 16 is preferably not to contact any part of the brace member 14.

The polymeric foamed material 12 of the present invention may be any suitable material that is capable of producing the panel 10 of the present invention, preferably a suitable material that is capable of being cut and/or burned and/or melted (i.e. hot wire cut or melted) to produce the panel 10 of the present invention. The polymeric foamed material 12 may be either high density and/or low density polymeric material. The polymeric foamed material 12 provides significant insulating qualities and thereby reduces heat and cooling costs as compared with conventional fiberglass batt insulation of equal thickness. Furthermore, the polymeric foamed material 12 in combination with the plurality of brace members 14 may be customized to provide complete design flexibility and superior structural advantages in shear strength and lateral load capability. The polymeric foamed material 12 exhibits a high strength to weight ratio and also exhibits superior insulating properties. The polymeric foamed material panel 10 provides both a structure and a substrate for the interior and exterior finishes.

Suitable polymeric foamed materials 12 have been discovered to be heat expandable plastic materials, such as pelletized polystyrene and the like. Other suitable heat expandable plastic materials that are within the spirit and scope of the present invention for the polymeric foamed material 12 is polyethylene, polyurethane, polypropylene, polyvinylchloride, etc., all being at a density to provide good thermal insulation and strength. The density is preferably of the order of about ½ pound per cubic foot to about 8 pounds per cubic foot. A density of from about 1 pound per cubic foot to about 3 pounds per cubic foot has been found to provide very good thermal properties as well as excellent physical properties including strength.

The heat expandable plastic material also provides for excellent burn-back or melt-back qualities when cut by a laser cutter (not shown) or by a hot wire cutter (identified as "50" below). When the below identified hot wire cutter cuts the heat expandable plastic material, the material typically burns and melts, more specifically melts back, to form the polymeric openings 15, 17 and 25 and slot 30 within the polymeric foamed material 12. Prior to commencing the formation of polymeric openings 15, 17 and 25 and/or slot 30 (i.e. a brace-receiving-configuration or brace-receiving configured slot 30) within the polymeric foamed material 12, the below identified hot wire cutter cuts and/or burns and/or melts back from a surface 74 (i.e. a defined surface 74) a slot 70 (preferably a generally straight thread-like slot 70 with a seared wall 32) down to a point 72 (i.e. a preconfiguration cut point 72) whereafter the below identified hot wire cutter cuts and/or burns and/or melts back the heat expandable plastic material to produce the polymeric openings 15, 17 and 25 and/or slots 30. The polymeric opening 17 is more technically produced after a residual core 12A (see FIG. 11) is removed in any suitable manner or by any suitable means. The polymeric openings 15 and 25 are similarly produced, with the residual cores for polymeric openings 15 and 25 not being shown.

Certain epoxy resinous materials have also been discovered to be suitable polymeric foamed material 12. Other suitable polymeric foamed material(s) 12 for the present invention include a rigid polystyrene, polyurethane, or polyisocyanurate foam or styrofoam. The polymeric foamed material 12 of the present invention provides for prefabricated panels 10 that may be easily installed at a building site for constructing a house, an industrial building, or any other structure, generally illustrated as 40 in FIGS. 2 and 2A.

The most preferred polymeric foamed material 12 from which the panel 10 is to be constructed is expanded polystyrene beads. It is lightweight, quite strong and has excellent insulating qualities. On an outside wall 42 (see FIG. 6) of the polymeric foamed material panel 10, a sheet of outer skin facing material 46 (such as one or more asbestos cement sheet, plywood, reconstituted timer sheeting, flat steel sheet, profiled steel sheet, rigid plastic sheet or flexible metal or plastic film or various combinations of outer skins) may be mounted or secured thereto. Examples of other exterior finishes which may be applied include one or more of: EIFS, stucco, metal cladding roofing material, ceramic tiling, wood, vinyl or other treatment customarily used in building construction. On an inside wall 48 (see FIG. 6 again) of the polymeric foamed material panel 10, a sheet of inner skin facing material 49 (e.g. sheet rock or the like) may be mounted or secured thereto. The sheet of inner skin facing material 49 may be any one or more suitable material(s) customarily employed in finishing the inside walls, roofs, etc., in building construction.

Figure 7:
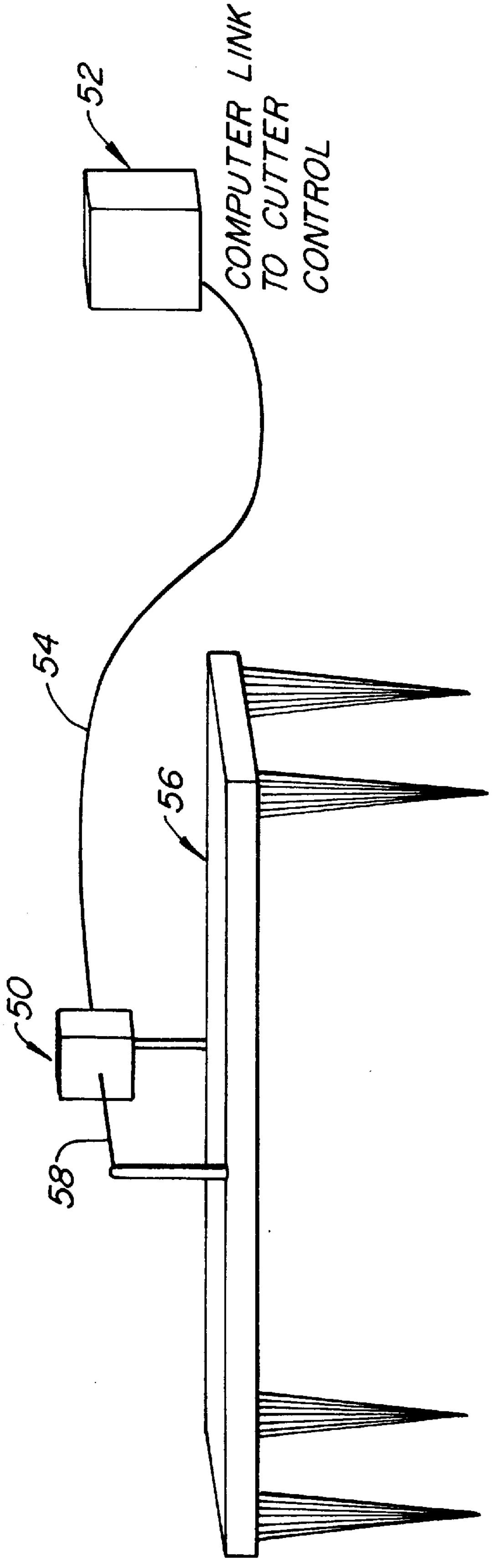
FIG. 7 is a perspective view of the hot wire cutter mounted on a table and operated by a computer.

A hot wire cutter assembly, generally illustrated as 50 (see FIG. 7), is preferably provided for cutting and searing purposes. The hot wire cutter assembly 50 is electrically engaged to a computer 52 via one or more conductors 54. The hot wire cutter assembly 50 is typically mounted on a table assembly 56 whereupon polymeric foamed material 12 is placed to be hot wire cut. The hot wire cutter assembly 50 includes at least one wire 58 for receiving current to be heated and to be moved for cutting and searing proposes in accordance with commands from the computer 52, or from manual commands.

The hot wire cutter assembly 50 may be any suitable hot wire cutter assembly that is capable of cutting the desired slots (e.g. generally C-shaped or Z-shaped slots 30 and generally vertical or straight thread-like slots 70, etc.) and openings (e.g. polymeric openings 17, etc.) in the polymeric foamed material 12. A suitable hot wire cutter assembly 50 is commercially available from Starr Mfg., Inc., a division of Starr Foam, Inc. of Fort Worth, Tex. The computer 52 to operate the hot wire cutter assembly 50 may also be obtained from Starr Mfg., Inc. The wire(s) 58 of the hot wire cutter assembly 50 preferably has a diameter ranging from about 0.03 inch to about 0.07 inch, more preferably from about 0.04 inch to about 0.06 inch. The wire(s) 58 typically receives less than approximately ten (10) amps at a difference of potential of about 110 volts. At a difference in potential of about 220 volts the wire(s) 58 would receive less than about five (5) amps. It is to be understood that the wire 58 may have any suitable diameter, and operate at any suitable voltage or amperage, for practicing the present invention.

Referring in detail now to FIGS. 15–18, there is seen another embodiment for the hot wire cutter assembly 50 as comprising a plurality of wires 58 for cutting through a block, generally illustrated as 8, of polymeric foamed material 12. The hot wire cutter assembly 50 is available commercially from HP Machine, 1600 West Acoma Blvd., Lake Havasu, Ariz. 86403, under product model number: Model S-TEL-9000 CNC. The hot wire cutter assembly 50 includes a table assembly, generally illustrated as 120, upon which the block 8 of polymeric foamed material 12 lies while movement of the plurality of wires 58 during the cutting procedure are controlled by a computer control assembly 200 (see FIG. 18). The wires 58 of the hot wire cutter assembly 50 for the embodiment of the invention shown in FIGS. 15–18 preferably have a diameter ranging from about 0.03 inch to about 0.07 inch, more preferably from about 0.04 inch to about 0.06 inch. The wires 58 typically receive less than approximately ten (10) amps at a difference of potential of about 110 volts. At a difference in potential of about 220 volts the wires 58 would receive less than about five (5) amps. It is to be understood that the wires 58 may have any suitable diameter, and operate at any suitable voltage or amperage, for practicing the present invention.

Figure 16:
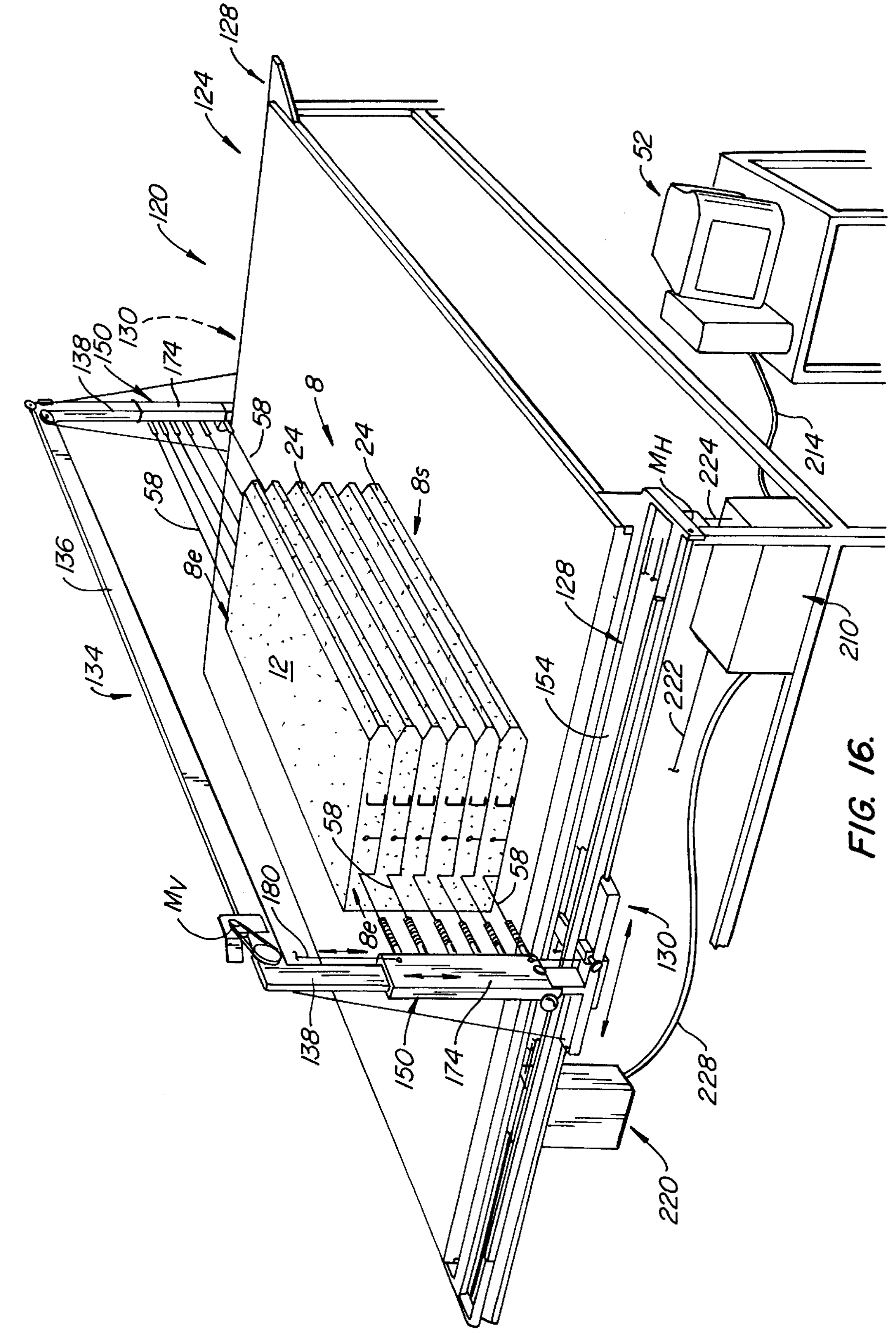
FIG. 16 is a perspective view of a table assembly supporting a block of polymeric foamed material with a plurality of hot wire cutters passing and cutting through the polymeric foamed material block, and with the vertical and horizontal movement of the hot wire cutters being respectively controlled by a motor ($M_V$) for controlling the vertical movement of the plurality of hot wire cutters and by a motor ($M_H$) for controlling the horizontal movement of the plurality of hot wire cutters, wherein power to the motors $M_V$ and $M_H$ is allocated or metered from a CNC controller which receives signals from a computer.
Figure 17:
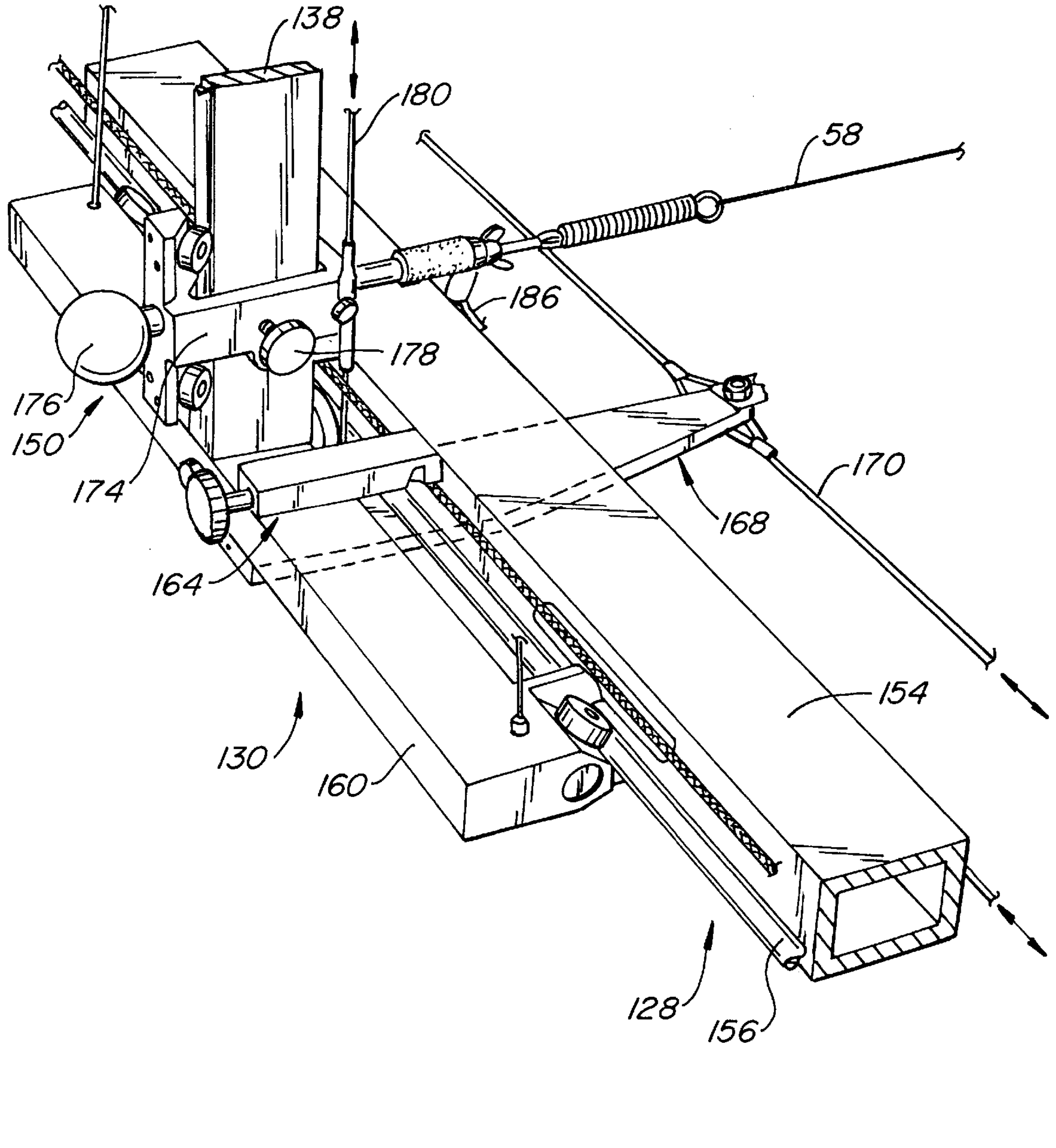
FIG. 17 is an enlarged partial perspective view of a horizontal trolley supporting a vertical support of a harp and slidably engaged to a horizontal trolley track supported by the table assembly, and of a vertical trolley slidably mounted to the vertical support of the harp with a hot wire cutter coupled to the vertical trolley, such that the horizontal trolley can move the hot wire cutter in a horizontal direction and the vertical trolley can move the hot wire cutter in a vertical direction.

The table assembly 120 includes a table 124 having a pair of generally identical horizontal track assemblies 128—128 connected thereto. A horizontal trolley assembly 130 is slidably mounted to each of the horizontal track assemblies 128. Only one of the horizontal trolley assemblies 130 is shown in FIG. 16, with the other horizontal trolley assembly 130 (not shown) being broadly referenced by a broken-line arrow from 130. The table assembly 120 also includes a support harp 134 having a horizontal support section 136 and a pair of opposed vertical support sections 138—138 integrally bound to the horizontal support section 136. As best shown in FIG. 17, the respective vertical support sections 138 are supported respectively by one of the horizontal trolley assemblies 130 such that when both of the horizontal trolley assemblies 130—130 move in a certain horizontal direction, the support harp 134 also moves in the same horizontal direction. Each of the vertical support sections 138 slidably supports a vertical trolley assembly 150 to which the plurality of wires 58 couple such that when the vertical trolley assemblies 150—150 are moved by the computer control assembly 200 in a certain vertical direction, the plurality of wires 58 move accordingly in the same vertical direction. Thus, computer control assembly 200 for the present invention, may move the wires 58 either horizontally or vertically, or both horizontally and vertically simultaneously to form any desired shape for the slots 30 or form the cylindrical shaped polymeric openings 15, 17 and 25.

The horizontal track assemblies 128 each include a main table frame 154 having a horizontal trolley track 156 as best shown in FIG. 17. As further best shown in FIG. 17, the horizontal trolley assembly 130 comprises a horizontal trolley 160 slidably mounted along the horizontal trolley track 158, a horizontal locking assembly 164 for locking the horizontal trolley 160, and a drive brace 168 bound to the horizontal trolley 160 and coupled to a horizontal drive cable 170 such that when the horizontal drive cable 170 is moved in a certain horizontal direction by hand or by a motor (identified as "$M_H$" below), the drive brace 168 also moves, causing the horizontal trolley 160 to also move, in the same certain horizontal direction. The horizontal drive cable 170 is also similarly engaged and coupled to the other horizontal trolley assembly 130 (not shown) through a series of pulleys (not shown) underneath the table 124 such that both horizontal trolley assemblies 130—130 are capable of being moved in unison and in the same horizontal direction by a motor (identified as "$M_H$" below). As was previously indicated, when the horizontal trolley assemblies 130—130 are moved in a certain horizontal direction, the support harp 134 (and the wires 58) also moves in the same certain horizontal direction.

Each of the vertical trolley assemblies 150 include a sleeve 174 movably engaged to one of the vertical support sections 138 of the support harp 138, as best shown in FIGS. 16 and 17. Each of the vertical trolley assemblies 150 have a manual actuation knob 176, a vertical locking mechanism 178, and a vertical drive cable 180 coupled to the sleeve 174. The plurality of wires 58 are coupled to the sleeve 174 such as to move vertically therewith. When the vertical drive cable 180 is moved in a certain vertical direction by a motor (identified as "$M_V$" below), the sleeve 174 (along with the plurality of wires 58 coupled thereto) also moves in the same certain vertical direction. The vertical drive cable 180 is also similarly engaged and coupled to the sleeve 174 of the other vertical trolley assembly 150 through a series of pulleys (not shown) such that both vertical trolley assemblies 150—150 are capable of being moved in unison and in the same vertical direction by hand or by a motor (identified as "$M_V$" below). As previously mentioned, when the vertical trolley assemblies 150—150 are moved in a certain vertical direction along the vertical support section 138 of the support harp 134, the wires 58 also move in the same certain vertical direction. As best shown in FIG. 17, an electrical conductor 186 is coupled to the wires 58 and communicates with a power source for conducting electrical power from the power source to the wires 58 for heating the same.

Figure 18:
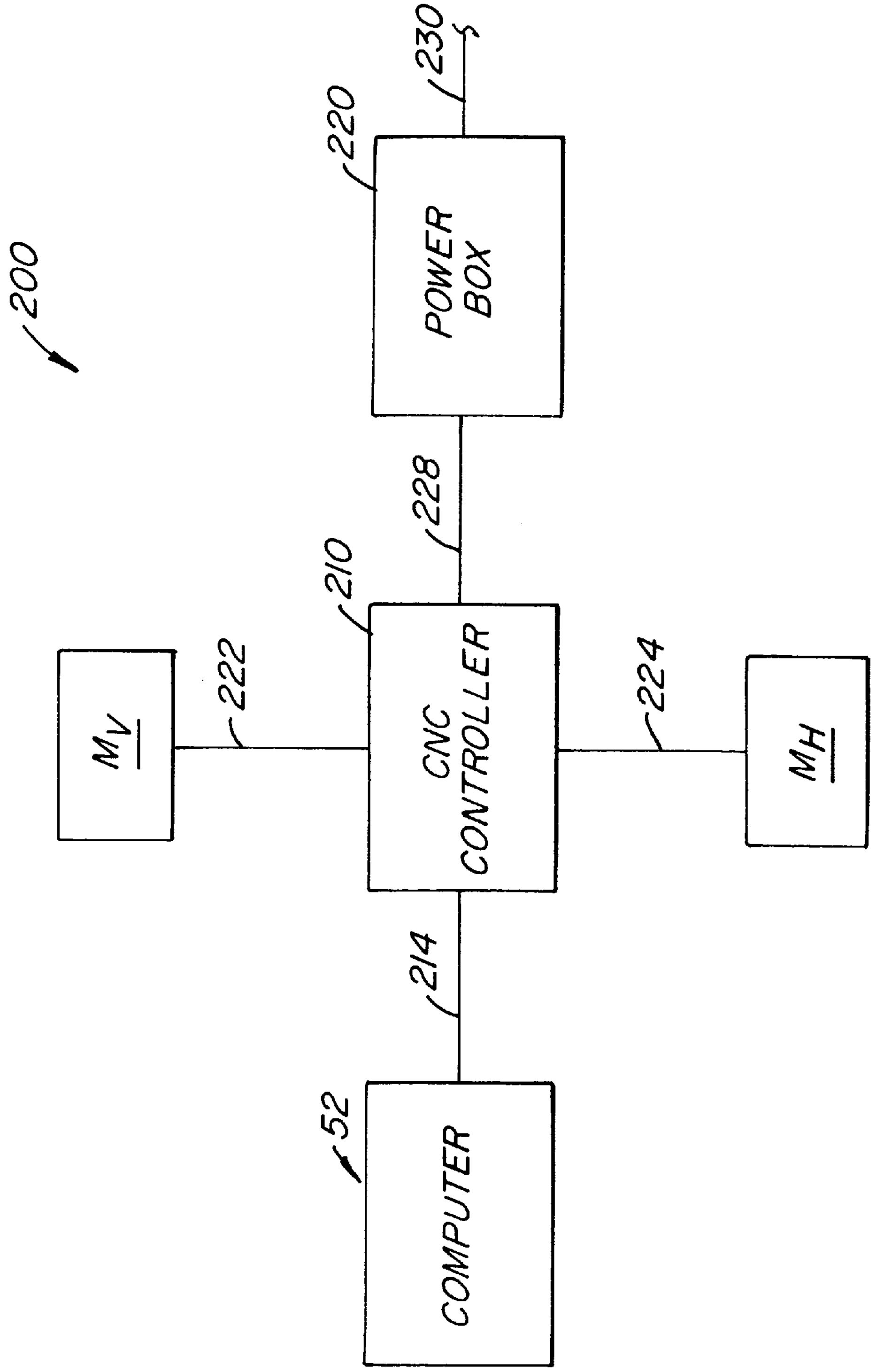
FIG. 18 is a schematic block diagram of the computer control assembly for controlling the plurality of hot wire cutters illustrating a computer, a CNC controller electrically engaged to the computer for receiving signals therefrom, a power box communicating with a power source and electrically engaged to the CNC controller to supply power to the CNC controller, and a pair of motors ($M_V$ and $M_H$) electrically engaged to the CNC controller for receiving metered or allocated power from the CNC controller to control the vertical and horizontal movement of the plurality of hot wire cutters.

Referring now to FIG. 18 for the computer assembly 200 of the present invention, there is seen the computer 52 electrically engaged to a CNC controller 210 via at least one conductor 214. CNC controller 210 is electrically engaged to motor $M_V$, to motor $M_H$ and to power box 220 via conductor 222, conductor 224, and conductor 228 respectively. Power box 220 communicates with a power source through at least one conductor 230 for receiving electrical power and administering the same to the CNC controller 210 through conductor 228. Through a program in the computer 52, appropriate signals are sent to the CNC controller 210 which in turn releases and/or allocates electrical power to the two motors $M_V$ and $M_H$ based on the signals received from the computer 52. As was previously indicated, the motors $M_V$ and $M_H$ respectively control the vertical and horizontal movement of the wires 58 by moving the vertical trolley assemblies 150 and the horizontal trolley assemblies 130 respectively. The computer control assembly 200 is available commercially from HP Machine, 1600 West Acoma Blvd., Lake Havasu, Ariz. 86403.

Figure 9:
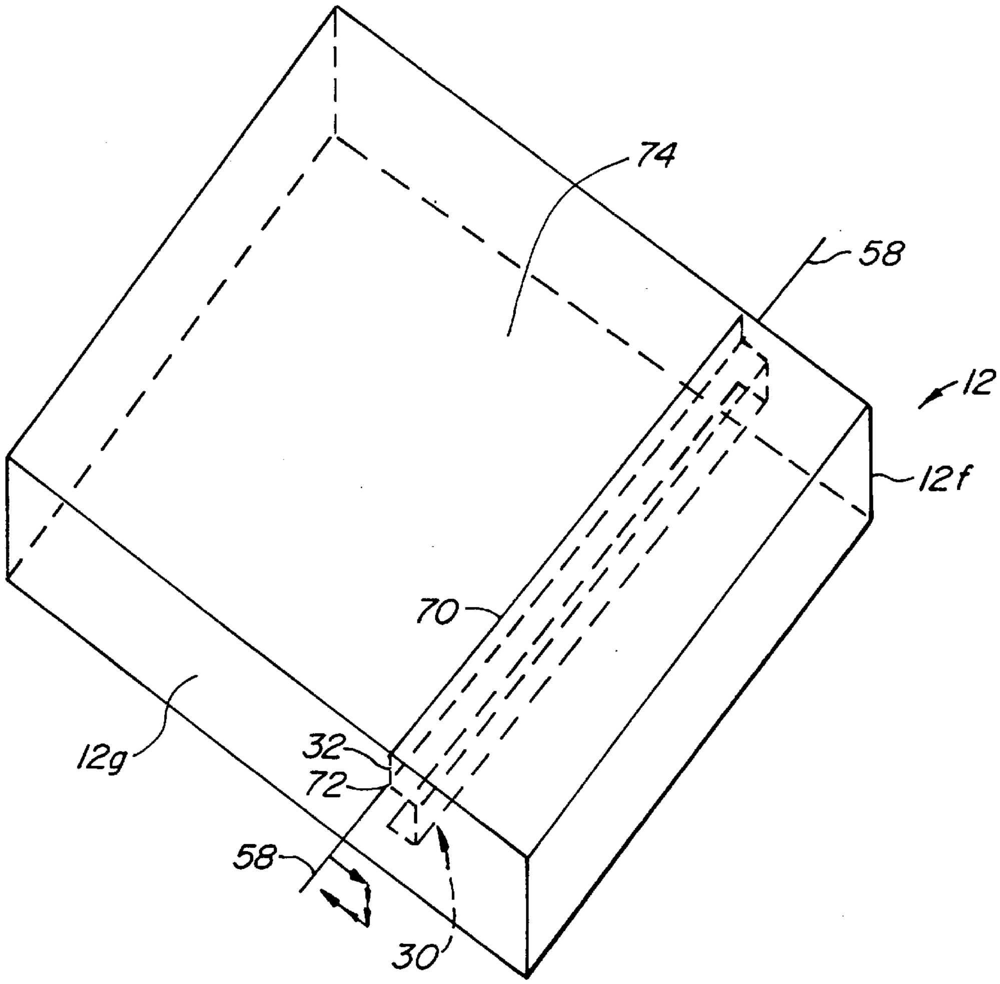
FIG. 9 is a perspective view of a hot wire cutter having cut through the polymeric foam material to a point where a subsequent general C-shaped slot is to be cut by the hot wire cutter, the C-shaped slot to be cut being represented by dotted lines.

Continuing to refer to the drawings for operation of the invention and the method for producing the panel 10, the polymeric foamed material 12 is placed upon the table assembly 56 and under (i.e. laterally adjacent to) the wire 58 of the hot wire cutter assembly 50. While operation of the invention is being initially illustrated with respect to a wire cutter assembly 50 having a single wire 58, a wire cutter assembly 50 having a plurality of wires 58 would operate similarly. Commands are entered into the computer 52 and the wire 58 is heated to a desired temperature (e.g. from about 230° F. to about 580° F., preferably from about 250° F. to about 350° F.) and the now hot wire 58 is lowered against the surface 74 and commences to cut and/or burn and/or melt back the polymeric foamed material 12 to produce the generally straight thread-like vertical slot 70. The slot 70 is continually formed or produced until the hot wire 58 reaches point 72 (see FIG. 9) whereupon the computer 52 sends another signal to the hot wire cutter assembly 50, causing the hot wire 58 to be moved in an essentially generally C-shaped path (as represented by dotted lines in FIG. 9) to produce an essentially generally C-shaped slot 30. One or more of these slot(s) 30 may be formed in the polymeric foamed material 12. As best shown in FIG. 9, two slot(s) 30 were produced in the polymeric foamed material 12.

After the hot wire 58 has cut the slot(s) 30 and 70, the cutting path(s) is reversed by commands from the computer 52 such that the hot wire 58 reversely retraces its initial cutting path(s), which reverse retracing typically causes more burning and/or melt back of polymeric foamed material 12 contiguous to the slot(s) 30 and 70. In reverse retracing of its initial cutting path, the hot wire 58 is "cleaning out" the slot(s) 30 and slot(s) 70 that terminate in slot(s) 30 for further defining the slot(s) 30 and 70, especially slot 30 which is of an opening between opposed perimetrical boundaries approximating the thickness of the brace member 14 for snugly receiving the brace member 14 to essentially fully encapsulate the same. Preferably, slot(s) 30 have openings that are greater than the opening of slot(s) 70 that terminate in slot(s) 30. In reverse retracing of its initial cutting path(s), the hot wire 58 further sears and/or cartherizes the seared wall(s) 32 of the slot(s) 70 and 30 to further harden and smooth the same. After the hot wire 58 has reversely retraced its initial cutting path(s), the hot wire 58 exits out of slot 70 that terminates in slot 30 and is subsequently elevated above the surface 74.

Figure 10:
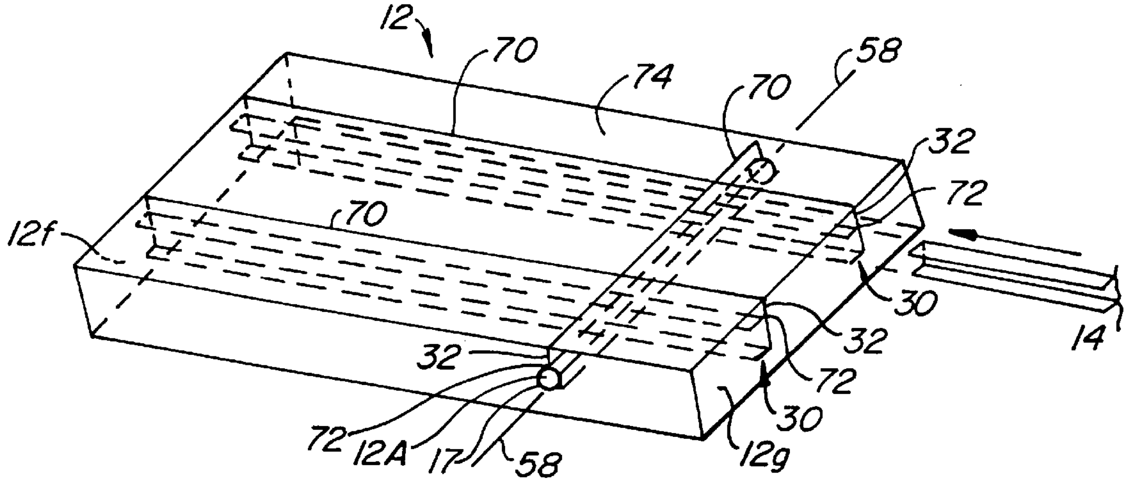
FIG. 10 is a perspective view of the polymeric foamed material after a pair of C-shaped slots have been cut with the hot wire cutter and after the polymeric foam material has been rotated, with a hot wire cutter having cut a general cylindrical opening in the polymeric foam material transverse to the C-shaped slots, leaving a residual core material in the transverse opening; and further illustrating a metallic U-shaped stud in proximity to one of the C-shaped slots for being slid into the same.
Figure 11:
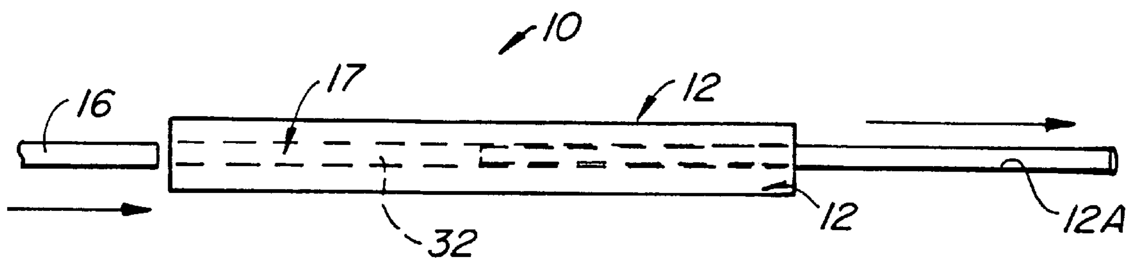
FIG. 11 is an end elevational view of the residual core material being removed from the cylindrical opening in the polymeric foam material and with a conduit aligned with the cylindrical opening in order to be slid subsequently therein.

After forming the desired number of slot(s) 30, the polymeric foamed material 12 is subsequently preferably rotated on top of the table assembly 56 in order to posture the polymeric foamed material 12 for formation of the polymeric opening(s) 17. This obviously is an optional step since there are times that the polymeric foamed material panel 10 is to be produced without any polymeric opening(s) 17. The amount of rotation of the polymeric foamed material 12 for forming polymeric opening(s) 17 would be any suitable amount to accomplish the desired cutting results. Preferably, for a square or rectangular shaped polymeric foamed material 12 as shown in FIGS. 9 and 10, the rotation would be approximately 90° such that the polymeric opening 17 to be formed would be generally normal to the slot(s) 30.

In forming the polymeric opening 17, the hot wire 58 is lowered by the hot wire cutter assembly 50 against the surface 74 and another slot 70 is commenced to be cut by the hot wire 58. The slot 70 is continually cut until a point 72 (i.e. a preconfiguration cut point 72) is again reached whereupon the computer signals the hot wire cutter assembly 50 to move the hot wire 58 in a circular fashion or manner to cut and/or burn and/or melt back polymeric foamed material 12 such that when the core material 12A is removed, the polymeric opening 17 is produced with slot 70 terminating in polymeric opening 17. As previously indicated, removal of the core material 12A may be by any suitable means including manual removal of it.

As was seen in the production of slot(s) 30 and 70, after the hot wire 58 has cut polymeric opening 17 (i.e. cylindrical polymeric opening 17) and slot(s) 70 that terminate in polymeric opening(s) 17, the cutting path(s) (e.g. a cylindrical cutting path) is reversed by commands from the computer 52 such that the hot wire 58 reversely retraces its initial cutting path(s) in the formation of polymeric opening 17. Such reverse retracing causes more burning and/or melt back of polymeric foamed material 12 contiguously or juxtaposedly exposed on the initially seared wall(s) 32 of the polymeric opening 17 and the slot(s) 70. In reverse retracing of its initial cutting path(s), the hot wire 58 is also further searing and/or cartherizing the wall (i.e. the cylindrical wall) around the core material 12A to further smooth and harden the same to facilitate the removal of the core material 12A. As was previously indicated for the formation of slot(s) 30, by reversely retracing its initial cutting path(s), the hot wire 58 is "cleaning out" the polymeric opening(s) 17 and slot(s) 70 terminating in polymeric opening(s) 17 for further defining polymeric opening(s) 17 and slot(s) 70, especially the polymeric opening(s) 17 which for cylindrical polymeric opening(s) 17 have a diameter that approximates the diameter of conduit 16 for snugly receiving conduit 16 to essentially fully encapsulate the same. Also by reverse retracing of its initial cutting path(s), the hot wire 58 further sears and/or cartherizes the seared wall(s) 32 of polymeric opening(s) 17 and the slot(s) 70 terminating in the polymeric opening (s) 17 to further harden and smooth the same. After the hot wire 58 has reversely retraced its initial cutting path(s) in the formation of polymeric opening(s) 17, the hot wire 58 exits out of the slot 70 terminating in the polymeric opening 17 and is then elevated above the surface 74.

After the core material 12A has been removed from polymeric opening 17, the brace member 14 (see FIG. 10) is aligned with the general C-shaped slot 30 (see FIG. 10) and is subsequently pushed into the cut slot 30 such that the brace member 14 would preferably extend from one extremity of the polymeric foamed material 12 to another extremity of the polymeric foamed material 12. In order words, it is preferred that the brace member 14 extends entirely through the polymeric foamed material 12 such that ends of the brace member 14 are exposed at opposed ends of the polymeric foamed material 12. This enables a more optimal load-bearing function for the brace members 14. Each brace member 14 is preferably inserted into each slot 30.

Figure 4:
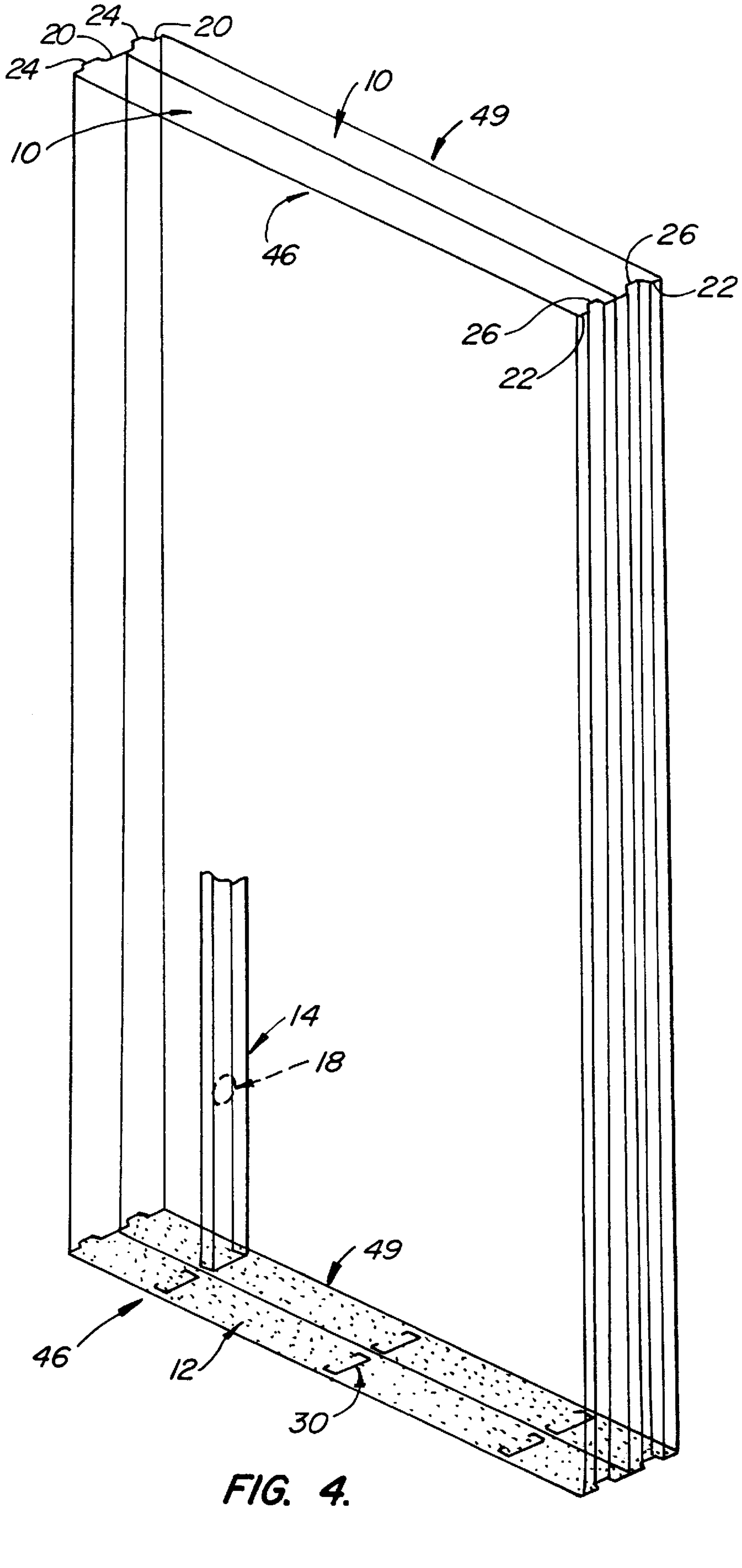
Figure 5:
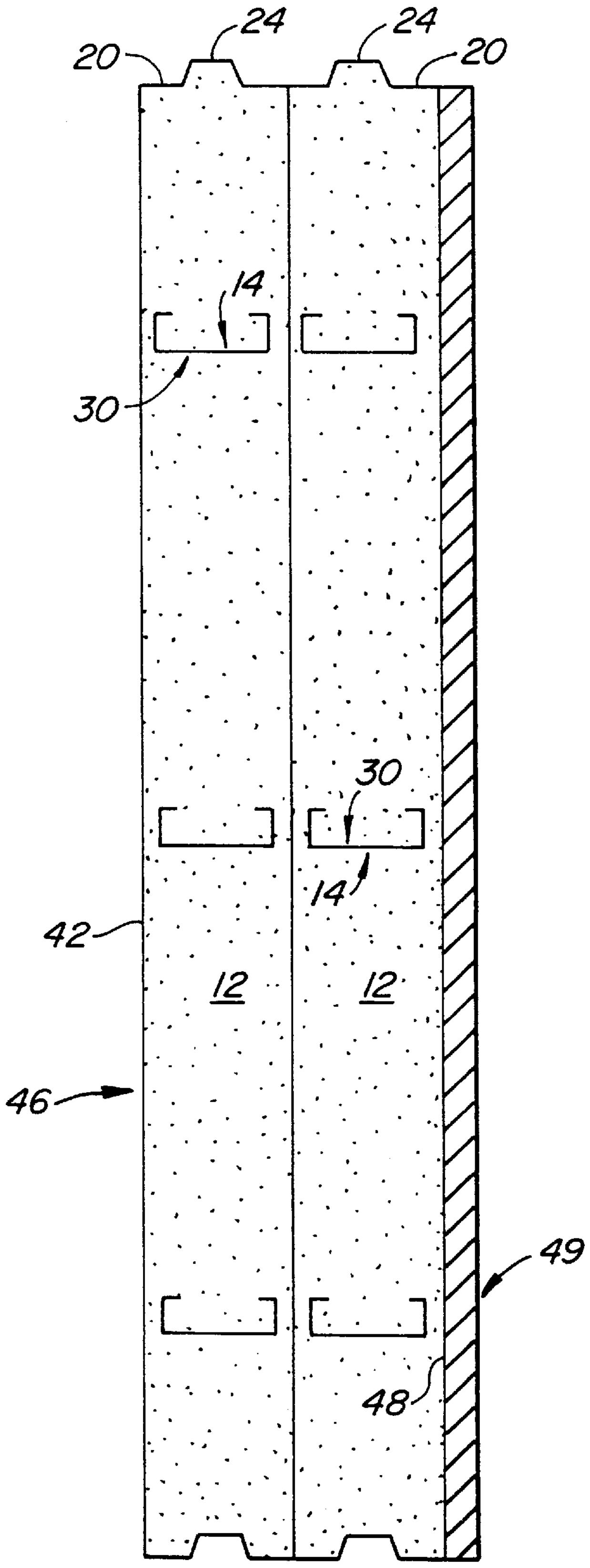

The brace members 14 may be typically provided with the opening (s) 18 which is capable of being aligned with the polymeric opening(s) 17 when and after the brace member (s) 14 are slid into the slot(s) 30 (i.e. preferably generally C-shaped slot(s) 30) in the polymeric foamed material 12. After such alignment, one or more panels 10 may be sent to a construction site such that two or more of the panel(s) 10 may be combined in any desired manner (e.g. contiguous as shown in FIGS. 4 and 5 or aligned as shown in FIG. 13) to produce a structure 40. When postured in an alignment in accordance with FIG. 13, the conduit 16 may be slid through the polymeric opening(s) 17 and through the opening(s) 18 (see FIG. 1) in the brace member(s) 14, preferably such that the conduit 16 is supported by the polymeric foamed material 12 in the two or more panels 10 and preferably such that the conduit 16 does not contact any perimeter of the opening (s) 18 in the brace member(s) 14.

The tongue 24 and the channel 26 may be cut in the opposed ends 20 and 22 of the polymeric foamed material 12 at any desired time. More specifically, the tongue 24 and the channel 26 may be cut after the generally C-shaped slot(s) 30 and polymeric opening(s) 17 have been cut in the polymeric foamed material 12, or the tongue 24 and the channel 26 may be cut before the generally C-shaped slot(s) 30 and polymeric opening(s) have been cut in the polymeric foamed material 12. After the tongue 24 and the channel 26 have been formed, any wall(s) that the hot wire 58 has contacted is or becomes seared wall(s) 32. Thus, the wall(s) of the channel 26 and the tongue 24 are seared wall(s) 32.

Continuing to refer to the drawings for operation of another preferred embodiment of the present invention including the method(s) for producing the panel 10, the block 8 of the polymeric foamed material 12 is placed upon the table 124 of the table assembly 120 and next (i.e. laterally adjacent) to the wires 58 of the hot wire cutter assembly 50. The wires 58 are positioned along a side **8*s* (i.e. a defined surface FIGS. 15 and 16) of the block 8 of the polymeric foamed material 12. The block 8 of the polymeric foamed material 12 has opposed ends 8*e*, 8*e* (see FIGS. 15 and 16). The wires 58 are heated to a desired temperature (e.g. from about 230° F. to about 580° F.). The computer control assembly 200 may be programmed to cause the motors $M_H$ and $M_V$ to move the wires 58 in any desired direction for any desired distance such that a plurality of panels 10 may be produced from the block 8 of polymeric foamed material 12. Preferably, the wires 58 are caused to be initially moved by the computer control assembly 200 to cut a plurality of tongues 24 in the side 8*s* of the block 8 of polymeric foamed material 8. After the tongues 24 have been formed (see FIGS. 15 and 16), the wires 58 are caused to be moved by the computer control assembly 200 to subsequently cut a plurality of slots 30 in the block 8 of polymeric foamed material 12 and to sever the block 8 into a plurality of polymeric foamed materials 12 (i.e. a plurality of polymeric foamed material structures 12*s* shown in FIG. 19), with each polymeric foamed material structure 12*s* having a plurality of slots 30, and preferably, at least one polymeric foamed material opening 15**.

Figure 19:
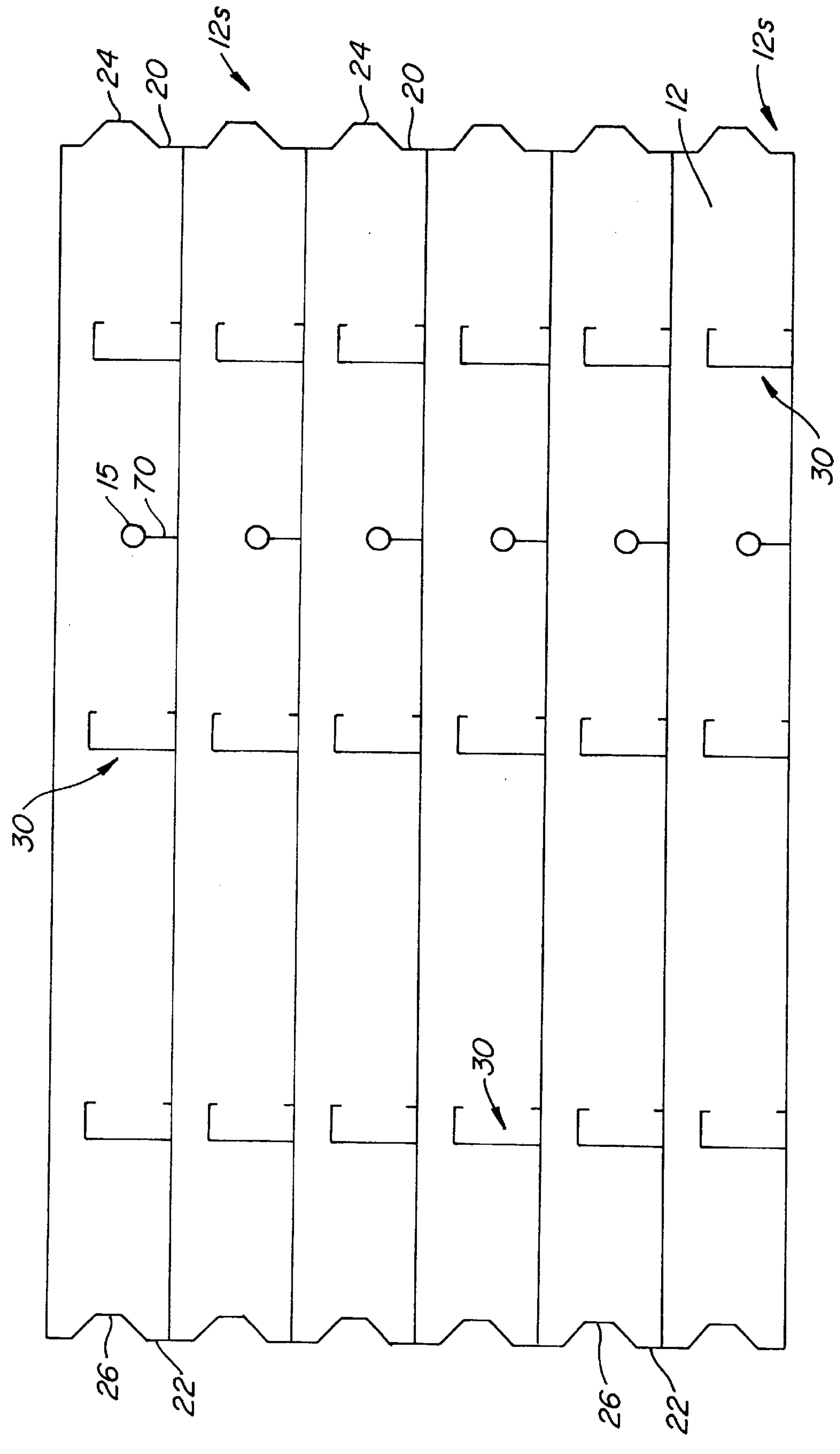
FIG. 19 is an end elevational view of a plurality of polymeric foamed structures produced after a plurality of computer-controlled hot wire cutters have passed through a block of polymeric foamed material.
Figure 32:
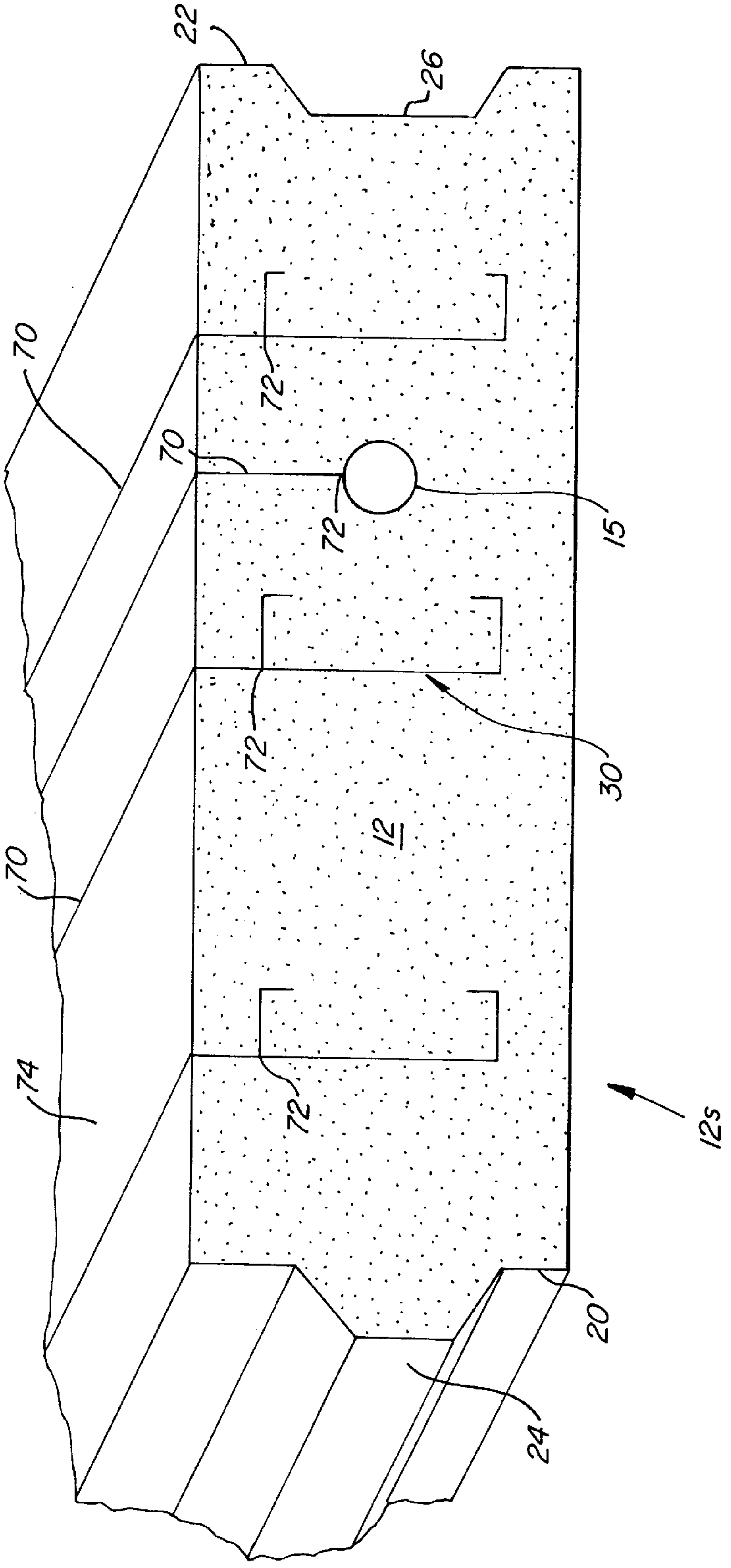
FIG. 32 is an enlarged partial perspective view of an end of a polymeric foamed material structure after a hot wire cutter has cut a plurality of C-shaped slots in the polymeric foamed material structure and after a polymeric opening (i.e. a wiring chase) has also been cut in the polymeric foamed material structure by the hot wire cutter.

The slots 30 may be of any desired shape or configuration to receive a comparable shaped or configured stud or brace 14. Preferably, the slots are generally C-shaped, as shown in FIG. 19 and FIG. 32. Alternatively and preferably further, the slots 30 may be partially Z-shaped (see FIG. 29) to partially receive a Z-shaped brace 14 such that when a Z-shaped brace 14 is slid into the partially Z-shaped slot 30, a portion of Z-shaped brace 14 protrudes away from the polymeric foamed material 12, as best shown in FIG. 30. The slots 30 may be partially C-shaped (see FIG. 26) to partially receive a C-shaped brace 14 such that when a C-shaped brace 14 is slid into the partially C-shaped slot 30, a portion of the C-shaped brace 14 protrudes away from the polymeric foamed material 12, as best shown in FIGS. 27 and 28B. The polymeric openings 15 are preferably cylindrical openings for receiving the conduits 19.

After the slots 30 and polymeric openings 15 have been cut and the plurality of polymeric foamed material structures **12*s* have been produced (see FIG. 19) from the block 8 of polymeric foamed material 12, the computer control assembly 200 preferably causes the wires 58 to be moved to cut a plurality of channels 26 in the side of the block 8 of the polymeric foamed material 12 opposed to the side 8*s*. Subsequently, the plurality of polymeric foamed material structures 12*s*, while remaining in a stacked or superimposed relationship, are rotated 90 degrees to posture the stacked polymeric foamed material structures 12*s* for formation of the track chases 100 and the transverse polymeric opening(s) 17 and 25 if desired. The wires 58 are moved by computer control assembly 200 such that the track chases 100 are formed in each of the polymeric foamed material structures 12*s* at any desired location, preferably at the location shown in FIGS. 25–31. The transverse polymeric openings 17 may be formed in the respective polymeric foamed material structures 12*s* by passing each wire 58 in an initially cut path between any two superimposed polymeric foamed material structures 12*s*—12*s* and either raising or lowering the wire 58 against the respective surface 74 (e.g. see FIG. 10) of a respective polymeric foamed material structure 12*s* and respective slots 70 are commenced to be cut by each of the hot wires 58. The respective slots 70*s* are continually cut until respective points 72 (i.e. preconfiguration cut points 72) are reached whereupon the computer 52 signals the hot wire cutter assembly 50 to move the hot wires 58 in a circular fashion or manner to cut and/or burn and/or melt back polymeric foamed material 12 such that when respective core materials 12A are removed, the polymeric opening 17 is produced in each of the polymeric foamed material structures 12*s* with a respective slot 70 terminating in a respective polymeric opening 17. As previously indicated, removal of the core material 12A may be by any suitable means including manual removal of it. Polymeric openings 25 may be formed in the same manner after a core material (not shown, but similar to core material 12A) has been removed. As was previously indicated, conduits 16 and internal reinforcing member 23 are to be respectively inserted into the polymeric openings 17 and into the polymeric openings 25**.

Referring now to FIGS. 19–25 for the procedure of cutting generally C-shaped slots 30 as shown in the respective polymeric foamed material structures 12*s*, the plurality of hot wires 58 are moved by the computer control assembly 200 in direction of the arrow 300 (see FIG. 20) for a desired distance. The wires 58 are then moved in direction of the arrow 302 (which is preferably normal to the direction of the arrow 300) for a distance which approximates the length of a flange return 14*r* of a generally C-shaped brace member 14. Wires 58 are subsequently moved a predetermined distance L (see FIG. 24) in direction of the arrow 304 into an off-set position. The distance L is preferably equal to about the measurement of the diameter D (see FIG. 23) of one of the wires 58. The direction of the arrow 304 is preferably a direction which is generally perpendicular to direction of arrow 302. From the off-set position the wires 58 move in direction of the arrow 306 for a distance which is less than distance that the wires 58 moved when travelling in direction of the arrow 302. When the wires 58 are travelling in direction of the arrow 306, they are forming an off-set path next to the path that the wires 58 formed in travelling the direction of arrow 302. The width W of the off-set path is approximately equal to twice the measurement of the diameter D of the wires 58 (see FIG. 24).

After travelling a distance in direction of the arrow 306 which is less than the distance that the wires travelled in direction of the arrow 302, the wires 58 travel in direction of the arrow 308 (see FIG. 20 again). The direction of the arrow 308 is generally normal to the direction of the arrow 306. After travelling a desired distance along a path in direction of the arrow 308, the wires are then moved by the computer control assembly 200 in direction of the arrow 310. It should be understood that the distance that the wires 58 travelled in direction of the arrow 308 is approximately equal to the length of a flange 14*f* of a generally C-shaped brace member 14. The distance that the wires 58 travelled in direction of the arrows 308 is also approximately equal to the width of a polymeric material crest 12*c* (see FIG. 20B), with the height of the polymeric material crest 12*c* resulting from the wires 58 travelling at a distance in direction of the arrow 306 that is less than the distance that the arrows travelled in direction of the arrows 302. Polymeric material crest 12*c* also results from a polymeric material recess 12*r* being formed (see FIG. 20B again).

The wires 58 travel a distance in direction of the arrow 310, which distance is approximately equal to the length of a web 14*f* of a generally C-shaped brace member 14. From the direction of the arrow 310, the wires 58 travel in direction of the arrow 312 for a distance that approximately equals the distance that the wires 58 travelled in direction of the arrow 308. The direction of the arrow 312 is generally perpendicular to the direction of the arrow 310. The wires 58 subsequently travel in direction of the arrow 314 for a distance that approximately equals the distance that the wires 58 travelled in direction of the arrow 306. From direction of the arrow 314, the wires 58 are then moved in direction of the arrow 316 for a predetermined distance which is preferably equal to the predetermined distance L (see FIG. 24). The wires 58 are now in another off-set position. From this off-set position, the wires 58 generally retrace the path that the wires 58 cut when moving in direction of the arrows 310, 312 and 314. While retracing this path, the wires 58 remain in the off-set position. In retracing the path that the wires 58 made when moving in direction of the arrows 310, 312 and 314, the wires 58 move in direction of the arrows 318, 320 and 322, as best shown in FIG. 20. The distance that the wires 58 travel in direction of the arrow 318 is generally equal to the distance that the wires 58 travelled when travelling in the direction of the arrow 302. The direction of the arrow 320 is generally normal to the direction of arrows 318 and 322. After having moved in direction of the arrows 318, 320 and 322 to form an off-set path next to the path that the wires 58 formed when moving in direction of the arrows 310, 312, and 314, the wires 58 then move in direction of the arrow 324. The generally C-shaped slot 30 of FIGS. 19, 20, and 25 has now been formed.

By the practice of the present invention there is provided a method for producing the polymeric foamed material panel 10 (e.g. a low density synthetic panel) comprising the steps of: (a) providing the polymeric foamed material 12; (b) cutting (e.g. with one or more wires 58) the polymeric foamed material 12 of step (a) until reaching the preconfiguration cut point 72; (c) cutting subsequently from the preconfiguration cut point 72 the brace-receiving configuration (i.e. the slot 30) in the polymeric foamed material 12; and (d) sliding the brace member into the brace-receiving configuration (or the slot 30) to produce the polymeric foamed material panel 10. The cutting in step (b) and the cutting in step (c) comprises cutting the polymeric foamed material 12 of step (a) with the hot wire cutter assembly 50 which is preferably operated by the computer 52. The cutters may also be laser cutters. The brace-receiving configuration in the polymeric foamed material 12 preferably comprises the slot 30 for receiving the brace member 14. The slot 30 includes at least one seared wall 32 for facilitating the sliding of the brace member 14. The brace member 14 includes the opening 18 with an opening perimeter. The method additionally comprises forming the polymeric (foamed material) opening 17 in the polymeric foamed material 12. The polymeric foamed material opening 17 has a polymeric foamed material opening perimeter. The sliding in step (d) comprises sliding the brace member 14 into the brace-receiving configuration until the opening 18 of the brace member 14 is generally aligned with the polymeric (foamed material) opening 17. The opening perimeter of the opening 18 in the brace member 14 has a dimension that is greater than 4 dimension of the polymeric foamed material opening perimeter of the polymeric (foamed material) opening 17 in the polymeric foamed material 12.

By the practice of the present invention there is further provided a method for forming a structure 40 comprising the steps of: (a) providing a first polymeric foamed material 12 having a first defined edge 20 (i.e. end 20); (b) cutting a first brace-receiving-configured slot 30 in the first polymeric foamed material 12; (c) cutting the first defined edge 20 of the first polymeric foamed material 12 to form the tongue 24 on the first defined edge 20; (d) sliding a first brace member 14 into the first brace-receiving-configured slot 30; (e) providing a second polymeric foamed material 12 having a second defined edge 22 (i.e. end 22); (f) cutting a second brace-receiving-configured slot 30 in the second polymeric foamed material 12; (g) cutting the second defined edge 22 of the second polymeric foamed material 12 to form the channel 26 in the second defined edge 22; (h) sliding the second brace member 14 into the second brace-receiving-configured slot 30; and (i) sliding the tongue 24 on the first defined edge 20 of the first polymeric foamed material 12 into the channel 26 in the second defined edge 22 of the second polymeric foamed material 12 to form the structure 40.

By the further practice of the present invention there is also provided a polymeric foamed material panel 10 comprising a panel 10 consisting of the polymeric foamed material 12; a brace-receiving-configured slot (i.e. slot 30 preferably) disposed in the polymeric foamed material 12 of the panel 10 and a brace member 14 disposed in the brace-receiving-configured slot 30 in the polymeric foamed material 12 of the panel 10. The preferred brace-receiving-configured slot 30 includes at least one seared wall 32; typically all walls of the slot 30 are seared. The polymeric foamed material panel 10 additionally comprises a generally straight thread-like slot 70 extending from a defined surface 74 of the polymeric foamed material 12 to the brace-receiving-configured slot 30; and a second generally straight thread-like slot 70 extending from the defined surface 74 of the polymeric foamed material 12 to a generally cylindrical polymeric opening 17 in the polymeric foamed material 12. All walls of the polymeric opening 17 are typically seared.

Practice of the present invention also provides method for producing a plurality of polymeric foamed material panels 10 comprising the steps of: (a) providing a block 8 of polymeric foamed material 12; (b) cutting the polymeric foamed material 12 with a plurality of cutters (e.g. laser cutters or hot wires 58) until each cutter reaches a respective preconfiguration cut point (i.e. preconfiguration cut point 72); (c) cutting subsequently with each cutter from the respective preconfiguration cut point of each cutter a respective brace-receiving slot 30 in the polymeric foamed material 12; (d) cutting then the polymeric foamed material 12 with the plurality of cutters to produce a plurality of polymeric foamed material structures 12*s* having a plurality of brace-receiving slots 30; and (e) sliding a plurality of brace members 14 into the brace-receiving slots 30 of the polymeric foamed material structures 12*s* to produce a plurality of polymeric foamed material panels 10, each of the polymeric foamed material panels 10 having at least one of the brace members 14. This method additionally comprises cutting with each cutter a respective polymeric foamed material opening (e.g. opening 15, 17 or 25) in the polymeric foamed material 12 such that each polymeric foamed material structure 12*s* has a polymeric foamed material opening (e.g. opening 15, 17 or 25) to define a chase. The cutters are preferably computer operated to provide desired cut accuracy.

Another practice of the present invention provides a method for producing a plurality of polymeric foamed material panels 10 comprising the steps of: (a) providing a block 8 (e.g., a generally stationary block) of polymeric foamed material 12 (e.g., expanded polystyrene (EPS)); (b) cutting the polymeric foamed material 12 with a plurality of cutters (e.g., hot wire cutters, laser cutter, etc.) until each cutter reaches a respective preconfiguration cut point 72; (c) cutting subsequently with each cutter from the respective preconfiguration cut point 72 of each cutter a respective brace-receiving slot 30 in the polymeric foamed material 12; (d) cutting then the polymeric foamed material 12 with said plurality of cutters to produce a plurality of polymeric foamed material structures 12*s* having a plurality of brace-receiving slots 30, which may be linear or nonlinear slots; and (e) sliding a plurality of brace members 14 into the brace-receiving slots 30 of the polymeric foamed material structures 12*s* to produce a plurality of polymeric foamed material panels 10, each of the polymeric foamed material panels 10 having at least one of the brace members 14. In the immediate foregoing method of the present invention, the brace members 14 include sides. More particularly, each of the brace members 14 preferably comprises the web 14*w*, the flanges 14*f*—14*f* integrally bound to the web 14*w*, and the flange returns 14*r*—14*r* integrally bound to the flanges 14*f*—14*f*. The web 14*w*, the flanges 14*f*—14*f*, and the flange returns 14*r*—14*r* are surrounded by the polymeric foamed material 12. Alternatively and as another embodiment of the present invention, a portion of at least one brace member 14 protrudes from each of the polymeric foamed material panels 10. Therefore, the sliding step (e) in the immediate foregoing method more specifically comprises sliding one of the flanges 14*f* and flange return 14*r* associated therewith, and a portion of the web 14*w* of respective brace members 14 into respective brace-receiving slots 30 of the polymeric foamed material structures 12*s* to produce the plurality of polymeric foamed material panels 10, with each of the polymeric foamed material panels 10 having the other flange 14*f* and the flange return 14*r* associated therewith, and a portion of the web 14*w* of at least one of the brace members 14 disposed outside thereof.

An alternative practice of the present invention provides a method for producing a plurality of polymeric foamed material structures 12*s* having slots 30 for receiving stud members 14 comprising the steps of: (a) cutting a polymeric foamed material 12 (e.g., a generally stationary block 8 of expanded polystyrene (ESP)) with a plurality of cutters, such as hot wire cutters or laser cutters, in a first direction (e.g. in direction of the arrow 300 in FIG. 20); (b) cutting subsequently in a second direction (e.g. in direction of the arrow 302 or arrow 310 in FIG. 20) the polymeric foamed material 12 with the plurality of cutters until each cutter forms a first respective slot in the polymeric foamed material 12; (c) cutting in the first direction the polymeric foamed material 12 with the plurality of cutters to produce a plurality of polymeric foamed material structures 125 having a plurality of first slots (e.g. slot sections 30$r_1$ in FIG. 20), which may be linear or nonlinear slots. The immediately foregoing method broadly additionally comprises cutting the polymeric foamed material 12 with the plurality of cutters until each cutter forms a second respective slot (e.g. slot section 30*s* in FIG. 20) in the polymeric foamed material 12. The immediate foregoing method more particularly additionally comprises cutting the polymeric foamed material 12 with the plurality of cutters until each cutter forms a respective recess (e.g. polymeric material recess 12*r* in FIG. 20) in the polymeric foamed material 12; and subsequently cutting the polymeric foamed material 12 with the plurality of cutters until each cutter forms a second respective slot (e.g. slot sections 30*s* in FIG. 20) in the polymeric foamed material 12 such that after cutting, a plurality of polymeric foamed material structures are produced having a plurality of first slots (e.g. slot sections 30$r_1$) and a plurality of second slots (e.g. slot sections 30*s*) and a plurality of recesses (e.g. polymeric material recesses 12*r*). A plurality of stud members 14 is provided wherein each of the stud members 14 comprises a web 14*w*, a first flange 14*f* integrally bound to the web 14*w*, a first flange return 14*r* integrally bound to the first flange 14*f*, a second flange 14*f* also integrally bound to the web 14*w*, and a second flange return 14*r* integrally bound to the second flange 14*f*. The stud members 14 are slid into the first and second slots and into the recesses of the polymeric foamed material structures 12*s*, such that after the sliding step, the first flange return 14*r* and the first flange 14*f* of each of the stud members 14 occupies respectively one of the first slots (e.g. slot sections 30$r_1$) and one of the recesses (e.g. polymeric material recess 12*r*) of the polymeric foamed material structures 12*s*, and the web 14*w*, the second flange 14*f* and the second flange return 14*r* of each of the stud members 14 occupies one of the second slots (e.g. slot section 30s) of the polymeric foamed material structures 12s. The cutters are preferably computer operated to provide the desired cut accuracy during the cutting steps.

Other features in alternative practices of the present invention include interrupting the movement of a plurality of cutters in a first direction of travel to move the cutters in at least one direction of travel which differs from the first direction of travel in order to form one or more brace-receiving slots. These features are embodied in a method for producing a plurality of polymeric foamed material structures 12s having brace-receiving slots 30 comprising the steps of: (a) providing a block 8 of polymeric foamed material 12; and (b) moving a plurality of cutters through the block 8 of polymeric foamed material in a first direction (e.g. in direction of arrow 300 in FIG. 20) of travel, while interrupting at least one time the moving of the plurality of cutters in the first direction of travel to move the cutters through the block 8 of polymeric foamed material 12 in at least one direction of travel (e.g. in direction of arrow 302 or arrow 310 in FIG. 20) which differs from the first direction of travel, such that each cutter produces a respective brace-receiving slot 30 in the polymeric foamed material 12, until the plurality of cutters have moved completely through the block 8 of polymeric foamed material 12 to produce a plurality of polymeric foamed material structures 12s with each structure 129 having at least one brace-receiving slot (e.g. slot sections 30s and/or $30r_1$ in FIG. 20). These features are also embodied in a method for producing a plurality of polymeric foamed material structures 12s having brace-receiving slots comprising the steps of: (a) providing a block 8 of polymeric foamed material 12 in a generally stationary position; (b) moving a plurality of cutters through the generally stationary block 8 of polymeric foamed material 12 in a first direction of travel (e.g. in direction of arrow 300 in FIG. 20); (c) interrupting the movement of the plurality of cutters from the first direction of travel through the generally stationary block 8 of polymeric foamed material 12 to move the cutters in at least one direction of travel (e.g. in direction of the arrow 302 in FIG. 20) which differs from the first direction of travel such that each cutter produces a respective brace-receiving slot (e.g. slot section $30r_1$ in FIG. 20) in the polymeric foamed material 12, and (d) continuing the moving of the plurality of cutters in the first direction of travel, while intermittently interrupting the movement of the plurality of cutters from the first direction of travel to move the cutters in at least one direction of travel (e.g. in direction of the arrow 310 in FIG. 20) which differs from the first direction of travel such that each cutter produces at least one additional respective brace-receiving slot (e.g. slot section 30s in FIG. 20) in the polymeric foamed material 12, until the plurality of cutters have moved completely through the generally stationary block 8 of polymeric foamed material 12 after which a plurality of polymeric foamed material structures 12s are produced with each polymeric foamed material structure 12s having a plurality of brace-receiving slots (e.g. slot sections 30s and/or $30r_1$ in FIG. 20).

In additional practices of the present invention there is broadly provided a method for producing a polymeric foamed material structure 12s having a slot (e.g. slot section $30r_1$ in FIG. 20) comprising the steps of: (a) cutting with a cutter a polymeric foamed material 12 until reaching a preslot cut point (e.g. the point where the hot wire 58 stops after being moved in direction of the arrow 300 in FIG. 20); (b) cutting subsequently a first path in the polymeric foamed material 12 with the cutter from the preslot cut point until reaching a first cut point (e.g. the point where the hot wire 58 stops after being moved in direction of the arrow 302 in FIG. 20); (c) moving the cutter in the polymeric foamed material 12 a predetermined distance (e.g. distance L in FIG. 24) from the first cut point to a second cut point (e.g. the point where the hot wire 58 stops after being moved in direction of the arrow 304 in FIGS. 20 and 24); and (d) cutting subsequently from the second cut point a second path (e.g. an off-set path) in the polymeric foamed material 12 with the cutter until the cutter reaches a postslot cut point (e.g. the point where the hot wire 58 stops after being moved in direction of the arrow 306 in FIGS. 20 and 24) to produce a polymeric foamed material structure 12s having a slot (e.g. slot section $30r_1$ in FIG. 20). In the immediate foregoing method of the present invention, the cutter is preferably a computer-operated hot wire cutter having a wire diameter D with a generally known diameter measurement, and the slot (e.g. slot section $30r_1$ in FIG. 20) has a width W equal to about twice the generally known diameter measurement of the wire diameter D, and a width W equal to about twice the predetermined distance (e.g. distance L in FIG. 24).

Further additional practices of the present invention broadly provide a method for producing at least one polymeric foamed material structure 12s having at least one slot (e.g. slot section 30s in FIG. 20) comprising the steps of: (a) providing at least one cutter; (b) cutting with the cutter a polymeric foamed material 12 until the cutter reaches at least one respective preslot cut point (e.g. the point where the hot wire 58 stops after being moved in direction of the arrow 308 in FIG. 20); (c) cutting subsequently with cutter from the respective preslot cut point at least one respective path in the polymeric foamed material 12 until the cutter reaches at least one first cut point (e.g. the point where the hot wire 58 stops after being moved in direction of the arrows 310, 312 and 314 in FIG. 20); (d) forming with the cutter in the polymeric foamed material 12 at least one respective off-set path (e.g. the path taken by hot wire 58 in moving in direction of the arrows 318, 320 and 322 in FIG. 20) communicating with the respective path to form at least one slot (e.g. slot section 30s in FIG. 20) within the polymeric foamed material 12; and (e) cutting subsequently the polymeric foamed material 12 with the cutter (e.g. in direction of the arrow 324 in FIG. 20) until the cutter has cut through the polymeric foamed material 12, producing at least one polymeric foamed structure 12s having at least one slot (e.g. slot section 30s in FIG. 20). In the immediate foregoing method, the at least one respective path has at least one respective path length, and the at least one respective off-set path communicates with the at least one respective path along the at least one respective path length of the at least one respective path, such that the at least one respective path and the least one respective off-set path together form the at least one slot (e.g. slot section 30s in FIG. 20) within the polymeric foamed material 12.

Thus, practice of the present invention provides one or more polymeric foamed material panel(s) 10 which may be processed into any suitable blocks, for example, 4 feet by 4 feet by 24 feet. These blocks of polymeric foamed material 12 have been hot wired cut into an associated desired thickness as needed by the laminator/panel manufacturer. The polymeric foamed material panel(s) 10 of the present invention preferably encapsulate metal studs or braces 14 (as well as rafters if desired) in order to eliminate the need for plywood or OSB skins and the adhesives currently required in panel production. The metal studs 14 and rafters supply the structural engineering strength requirements.

Figure 2:
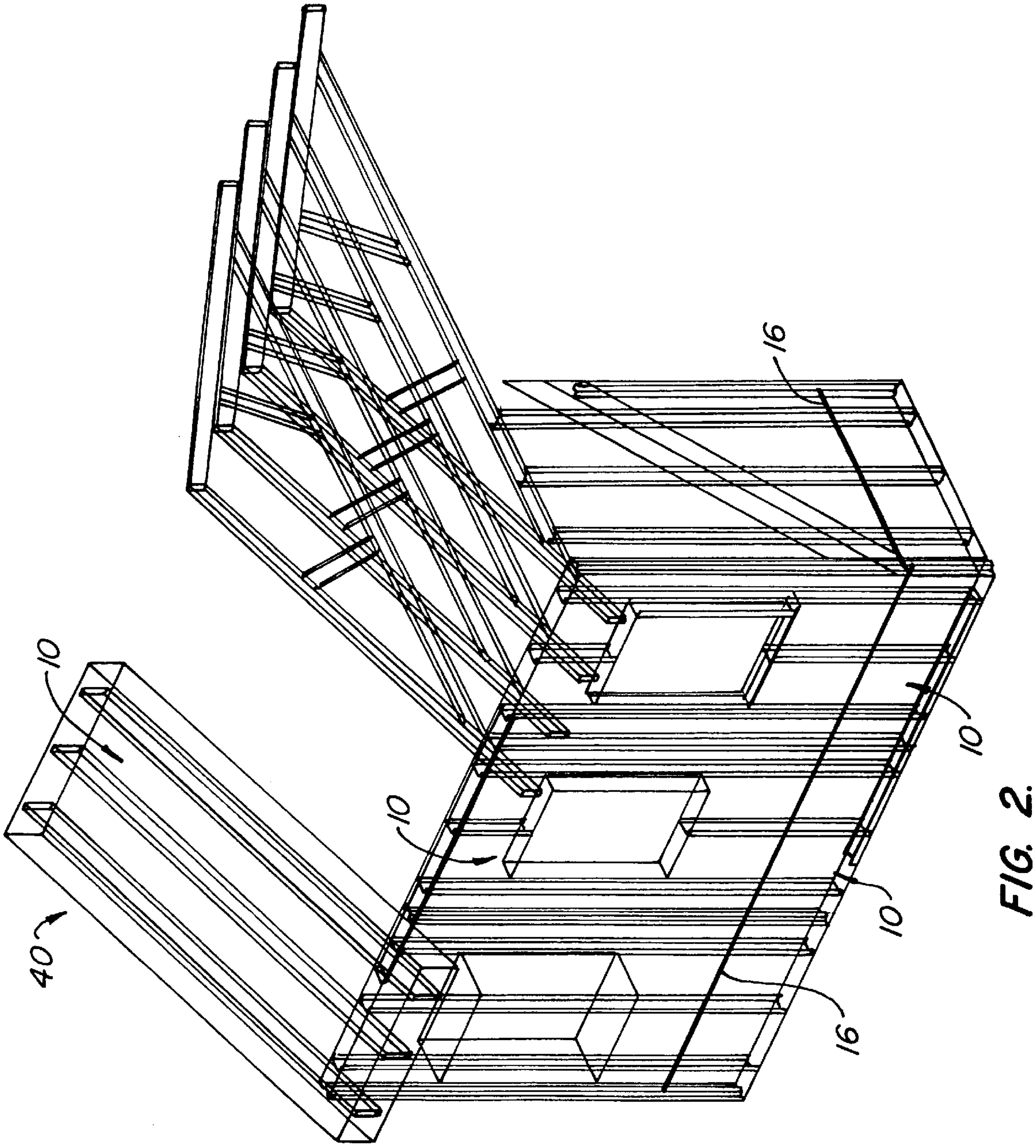
FIG. 2 is a partial perspective view of a structure consisting of standard trusses and polymeric foamed material panels forming walls and roofs.
Figure 2A:
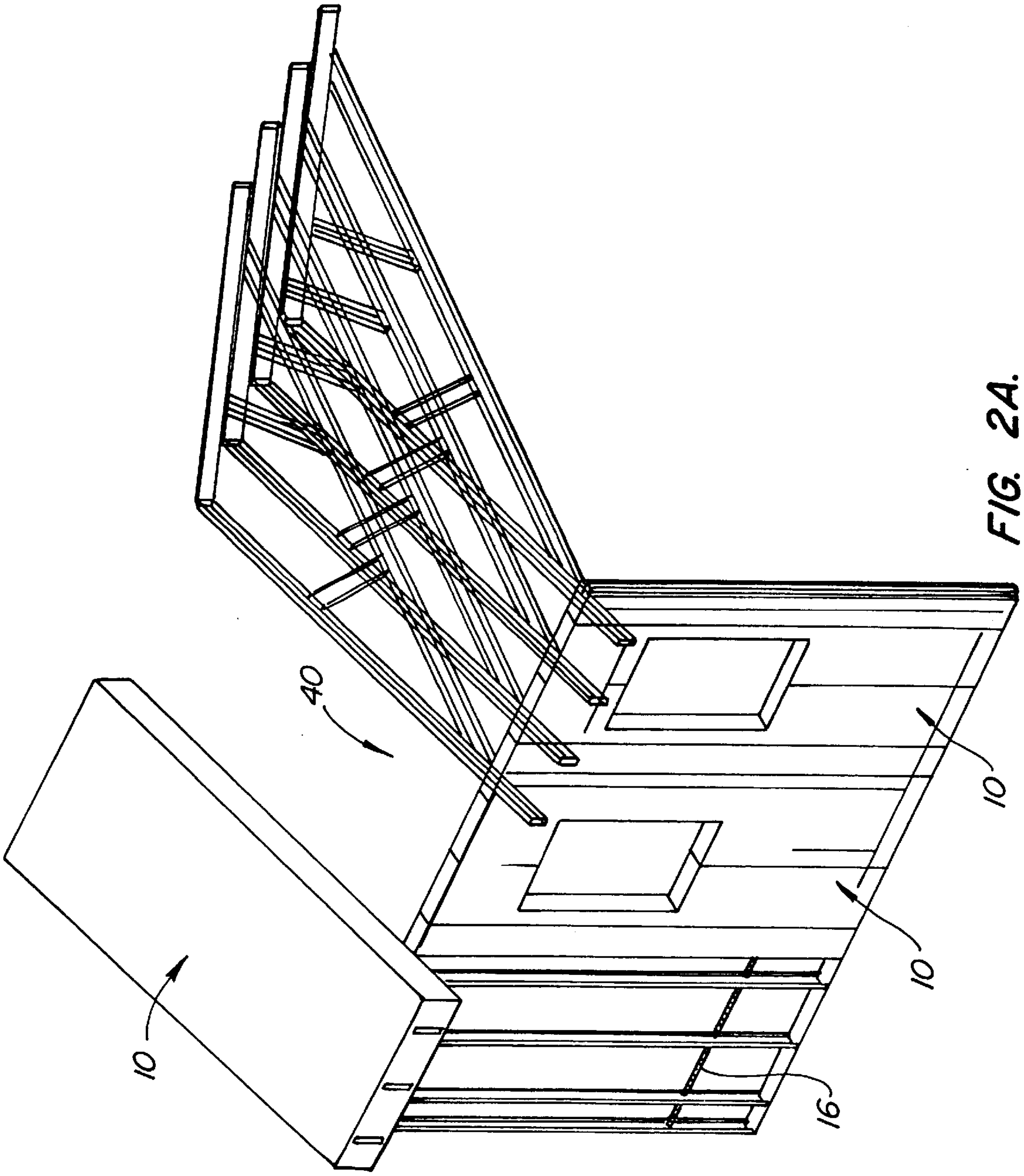
FIG. 2A is another partial perspective view of a structure similar to the partial perspective view in FIG. 2 wherein the structure includes standard trusses and polymeric foamed material panels forming walls and roofs.
Figure 3:
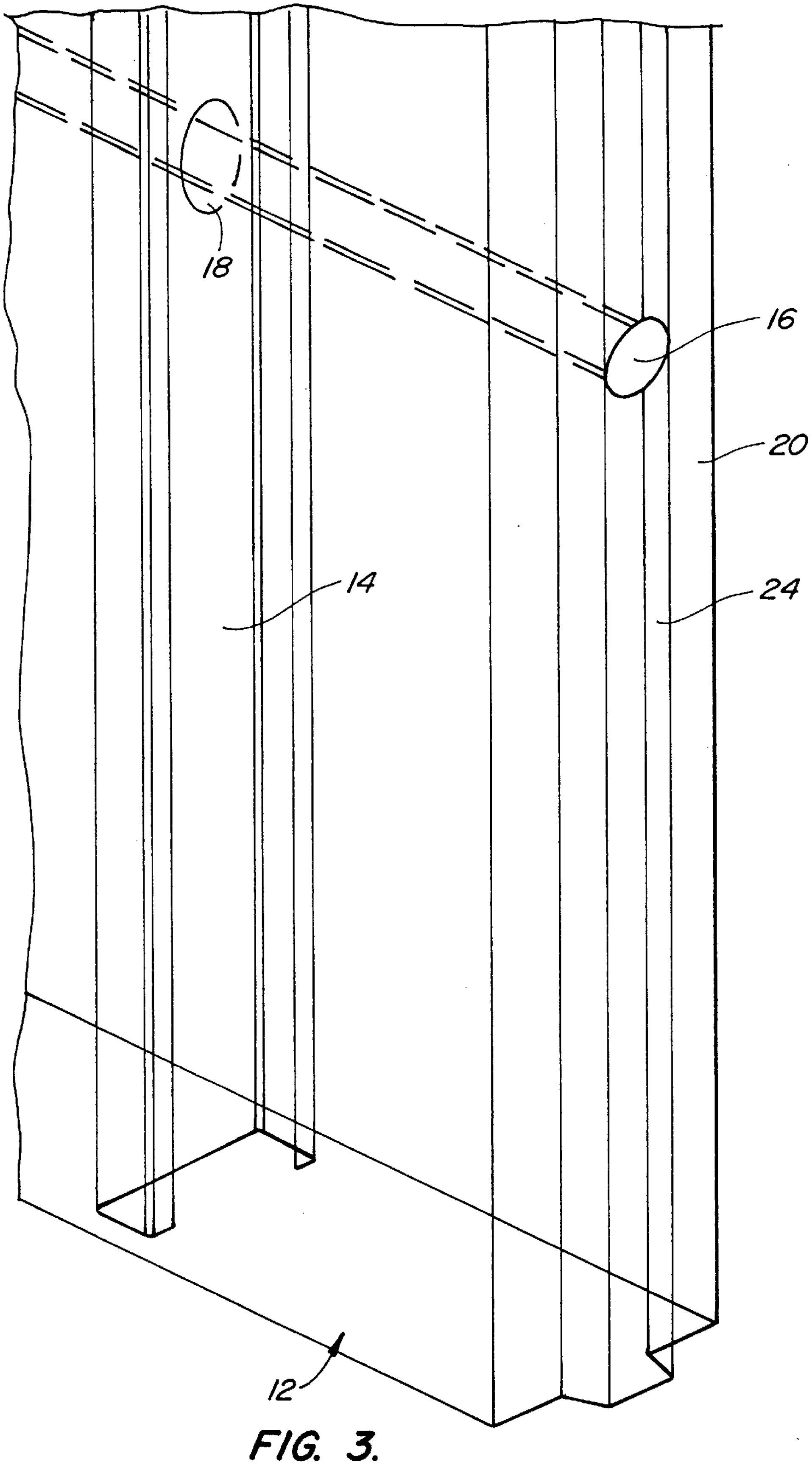
FIG. 3 is a partial perspective view of a polymeric foamed material panel including a brace member having an opening with a conduit supported by the polymeric foamed material and passing through the opening of the brace member without contacting any of the circumference or perimeter of the opening of the brace member.

The polymeric foamed material panel 10 becomes a pre-engineered "system" for building structures including, but not limited to, homes, apartments and commercial buildings or structures, as represented by structure(s) 40 in FIGS. 2 and 2A. The polymeric foamed material panel(s) 10 of the present invention is an improvement over the prior art in that they become the structure, the insulation, and the substrate for the interior and exterior finishes. The polymeric foamed material panel(s) 10 and the method of the present invention are also an improvement over the prior art in that they provide a market ready product at a significantly lower cost by eliminating secondary processing steps. The polymeric foamed material panel(s) 10 may be used in tandem with traditional Stress Skin and Structural Panels when attachment of a specific product (e.g. asphalt shingles, etc.) to the panel(s) 10 requires a solid wood substrate.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method for producing a plurality of polymeric foamed material structures having brace-receiving configurations comprising the steps of:

(a) providing a block of polymeric foamed material having a defined surface and a pair of opposed ends;

(b) cutting the polymeric foamed material of step (a) with a plurality of cutters in a generally perpendicular direction from the defined surface until each cutter reaches a respective preconfiguration cut point;

(c) cutting subsequently with each cutter from the respective preconfiguration cut point of each cutter a respective brace-receiving configuration in the polymeric foamed material such that said brace-receiving configuration terminates in said opposed ends; and (d) cutting, after said cutting step (c), the polymeric foamed material of step (c) with said plurality of cutters to produce a plurality of polymeric foamed material structures, each of said polymeric foamed material structures having a brace-receiving configuration.

2. The method of claim 1 additionally comprising cutting with each cutter, prior to said cutting step (d), a respective polymeric foamed material opening in the polymeric foamed material such that each polymeric foamed material structure has a polymeric foamed material opening to define a chase.

3. The method of claim 1 wherein said brace-receiving configuration in each of said polymeric foamed material structures is a non-linear brace-receiving configuration.

4. The method of claim 1 additionally comprising computer operating said plurality of cutters.

5. The method of claim 1 wherein said polymeric foamed material is generally stationary.

6. The method of claim 5 wherein said brace-receiving configuration in each of said polymeric foamed material structures is a non-linear brace-receiving configuration.

7. The method of claim 1 wherein said cutting in step (b), said cutting in step (c), and said cutting in step (d) is with a plurality of laser cutters.

8. The method of claim 7 wherein said polymeric foamed material is generally stationary.

9. The method of claim 7 additionally comprising cutting with each cutter, prior to said cutting step (d), a respective polymeric foamed material opening in the polymeric foamed material such that each polymeric foamed material structure has a polymeric foamed material opening to define a chase.

10. The method of claim 1 wherein said cutting in step (b), said cutting in step (c), and said cutting in step (d) is with a plurality of hot wire cutters.

11. The method of claim 10 additionally comprising cutting with each cutter, prior to said cutting step (d), a respective polymeric foamed material opening in the polymeric foamed material such that each polymeric foamed material structure has a polymeric foamed material opening to define a chase.

12. The method of claim 10 wherein said brace-receiving configuration in each of said polymeric foamed material structures is a non-linear brace-receiving configuration.

13. The method of claim 10 additionally comprising computer operating said plurality of hot wire cutters.

14. The method of claim 10 wherein said polymeric foamed material is generally stationary.

15. The method of claim 14 additionally comprising computer operating said plurality of hot wire cutters.

16. The method of claim 14 additionally comprising cutting with each cutter, prior to said cutting step (d), a respective polymeric foamed material opening in the polymeric foamed material such that each polymeric foamed material structure has a polymeric foamed material opening to define a chase.

17. The method of claim 16 wherein said polymeric foamed material comprises expanded polystyrene (EPS).

18. The method of claim 17 wherein said brace-receiving configuration in each of said polymeric foamed material structures is a non-linear brace-receiving configuration.

19. A method for producing a plurality of polymeric foamed material panels comprising the steps of:

(a) providing a block of polymeric foamed material having a defined surface and a pair of opposed ends;

(b) cutting the polymeric foamed material of step (a) with a plurality of cutters in a generally perpendicular direction from the defined surface until each cutter reaches a respective preconfiguration cut point;

(c) cutting subsequently with each cutter from the respective preconfiguration cut point of each cutter a respective brace-receiving slot in the polymeric foamed material such that said brace-receiving configuration terminates in said opposed ends;

(d) cutting, after said cutting step (c), the polymeric foamed material of step (c) with said plurality of cutters to produce a plurality of polymeric foamed material structures having a plurality of brace-receiving slots; and (e) sliding a plurality of brace members into the brace-receiving slots of the polymeric foamed material structures of step (d) to produce a plurality of polymeric foamed material panels, each of said polymeric foamed material panels having at least one of said brace members.

20. The method of claim 19 wherein a portion of said at least one of said brace members protrudes from each of said polymeric foamed material panels.

21. The method of claim 19 wherein each of said brace members includes brace sides, and said brace sides of each of said brace members are surrounded by polymeric foamed material.

22. The method of claim 19 wherein said plurality cutters are laser cutters.

23. The method of claim 19 wherein said polymeric foamed material is generally stationary.

24. The method of claim 19 wherein said brace-receiving slots in said polymeric foamed material panels are non-linear brace-receiving slots.

25. The method of claim 19 additionally comprising computer operating said plurality of cutters.

26. The method of claim 19 wherein said plurality cutters are hot wire cutters.

27. The method of claim 26 wherein said brace-receiving slots in said polymeric foamed material panels are non-linear brace-receiving slots.

28. The method of claim 26 additionally comprising computer operating said hot wire cutters.

29. The method of claim 26 wherein said polymeric foamed material is generally stationary.

30. The method of claim 29 wherein said brace-receiving slots in said polymeric foamed material panels are non-linear brace-receiving slots.

31. The method of claim 30 additionally comprising computer operating said hot wire cutters.

32. The method of claim 19 wherein each of said brace members comprises a web, a first flange integrally bound to said web, and a second flange integrally bound to said web.

33. The method of claim 32 wherein said sliding step (e) further comprises sliding said first flange and a portion of said web of respective brace members into respective brace-receiving slots of said polymeric foamed material structures to produce said plurality of polymeric foamed material panels, each of said polymeric foamed material panels having said second flange and a portion of said web of at least one of said brace members disposed outside thereof.

34. The method of claim 32 wherein each of said brace members comprises a web, a first flange integrally bound to said web, a first flange return integrally bound to said first flange, a second flange integrally bound to said web, and a second flange return integrally bound to said second flange.

35. The method of claim 34 wherein said sliding step (e) further comprises sliding said first flange and said first flange return and a portion of said web of respective brace members into respective brace-receiving slots of said polymeric foamed material structures to produce said plurality of polymeric foamed material panels, each of said polymeric foamed material panels having said second flange and said second flange return and a portion of said web of at least one of said brace members disposed outside thereof.

36. A method for producing a plurality of polymeric foamed material structures having slots for receiving stud members comprising the steps of:

(a) cutting a polymeric foamed material with a plurality of cutters in a generally perpendicular direction from a defined surface of the polymeric foamed material;

(b) cutting subsequently in at least a second direction the polymeric foamed material of step (a) with the plurality of cutters until each cutter forms a first respective slot in the polymeric foamed material, said first respective slot terminating in opposed ends of the polymeric foamed material;

(c) cutting, after said cutting step (b), in said generally perpendicular direction the polymeric foamed material of step (b) with the plurality of cutters to produce a plurality of polymeric foamed material structures having a plurality of first slots.

37. The method of claim 36 additionally comprising cutting, prior to said cutting step (c), the polymeric foamed material of step (b) with the plurality of cutters until each cutter forms a second respective slot in the polymeric foamed material.

38. The method of claim 36 wherein said cutters are laser cutters.

39. The method of claim 36 wherein said polymeric foamed material is generally stationary.

40. The method of claim 36 additionally comprising computer operating said plurality of cutters.

41. The method of claim 36 wherein said plurality of cutters are hot wire cutters.

42. The method of claim 41 additionally comprising computer operating said plurality of hot wire cutter.

43. The method of claim 36 additionally comprising cutting, prior to said cutting step (c), the polymeric foamed material of step (b) with the plurality of cutters until each cutter forms a respective recess in the polymeric foamed material; and subsequently cutting, prior to said cutting step (c), the polymeric foamed material with the plurality of cutters until each cutter forms a second respective slot in the polymeric foamed material such that after said cutting step (c), a plurality of polymeric foamed material structures are produced having a plurality of first slots and a plurality of second slots and a plurality of recesses.

44. The method of claim 43 wherein said second slots are non-linear slots.

45. The method of claim 43 additionally comprising providing a plurality of stud members wherein each of said stud members comprises a web, a first flange integrally bound to said web, a first flange return integrally bound to said first flange, a second flange integrally bound to said web, and a second flange return integrally bound to said second flange.

46. The method of claim 45 additionally comprising sliding said stud members into said first and second slots and into said recesses of said polymeric foamed material structures.

47. The method of claim 46 wherein after said sliding step, said first flange return and said first flange of each of said stud members occupies respectively one of said first slots and one of said recesses of said polymeric foamed material structures.

48. The method of claim 47 wherein said web, said second flange and said second flange return of each of said stud members occupies one of said second slots of said polymeric foamed material structures.

49. A method for producing a plurality of polymeric foamed material structures having slots for receiving stud members comprising the steps of:

(a) cutting a polymeric foamed material with a plurality of cutters in a first direction until each of said cutters has moved a respective first distance in the polymeric foamed material;

(b) cutting subsequently with the plurality of cutters in a second direction the polymeric foamed material of step (a) until each of said cutters has moved a respective second distance in the polymeric foamed material of step (a);

(c) cutting subsequently with the plurality of cutters in said first direction the polymeric foamed material of step (b) until each of said cutters has moved a respective third distance in the polymeric foamed material of step (b);

(d) cutting subsequently with the plurality of cutters in a third direction the polymeric foamed material of step (c) until each of said cutters has moved a respective fourth distance in the polymeric foamed material of step (c);

(e) cutting subsequently with the plurality of cutters in said first direction the polymeric foamed material of step (d) until each of said cutters has moved a respective fifth distance in the polymeric foamed material of step (d);

(f) cutting subsequently with the plurality of cutters in said second direction the polymeric foamed material of step (e) until each of said cutters has moved a respective sixth distance in the polymeric foamed material of step (e);

(g) cutting subsequently with the plurality of cutters in a fourth direction the polymeric foamed material of step (f) until each of said cutters has moved a respective seventh distance in the polymeric foamed material of step (f);

(h) cutting subsequently with the plurality of cutters in said third direction the polymeric foamed material of step (g) until each of said cutters has moved a respective eighth distance in the polymeric foamed material of step (g);

(i) cutting subsequently with the plurality of cutters in said fourth direction the polymeric foamed material of step (h) until each of said cutters has moved a respective ninth distance in the polymeric foamed material of step (h);

(j) cutting subsequently with the plurality of cutters in said second direction the polymeric foamed material of step (i) until each of said cutters has moved a respective tenth distance in the polymeric foamed material of step (i);

(k) cutting subsequently with the plurality of cutters in said first direction the polymeric foamed material of step (j) until each of said cutters has moved a respective eleventh distance in the polymeric foamed material of step (j);

(l) cutting subsequently with the plurality of cutters in said third direction the polymeric foamed material of step (k) until each of said cutters has moved a respective twelfth distance in the polymeric foamed material of step (k); and (m) cutting, after said cutting step (l), in said first direction the polymeric foamed material of step (l) with the plurality of cutters to produce a plurality of polymeric foamed material structures having a plurality of slots.

50. The method of claim 49 wherein said respective fifth distance and said respective seventh distance are approximately equal.

51. The method of claim 49 wherein said respective fourth distance is generally less than said respective second distance.

52. The method of claim 49 wherein said respective eighth distance is generally less than said respective tenth distance.

53. The method of claim 49 wherein said third direction is generally opposite to said second direction.

54. The method of claim 49 wherein said fourth direction is generally opposite to said first direction.

55. The method of claim 49 wherein said plurality of cutters generally move in unison.

56. The method of claim 49 wherein said respective third distance and said respective eighth distance are approximately equal.

57. The method of claim 56 wherein said plurality of cutters are hot wire cutters, each of said hot wire cutters include a wire diameter with a generally known diameter measurement which generally equals said respective third distance and said respective eighth distance.

58. The method of claim 57 additionally comprising computer operating said plurality of hot wire cutters.

59. The method of claim 58 wherein said plurality of hot wire cutters generally move in unison.

60. A method for producing a plurality of polymeric foamed material structures comprising the steps of:

(a) providing a polymeric foamed material having a defined surface and a pair of opposed ends (b) cutting with a plurality of cutters a said polymeric foamed material in a generally perpendicular direction from the defined surface until each cutter reaches a respective first cut point;

(c) cutting subsequently with each cutter from the respective first cut point a respective path in the polymeric foamed material of step (b) until each cutter reaches a respective second cut point;

(d) moving each of said plurality of cutters from said respective second cut point to a respective off-set position in the polymeric foamed material of step (c);

(e) retracing generally with each cutter said respective path of each cutter, while each cutter remains in said respective off-set position of step (d) such that a respective slot is formed by each cutter in the polymeric foamed material of step (d); and (f) cutting the polymeric foamed material of step (e) with the plurality of cutters until the cutters have cut through the polymeric foamed material of step (e), producing a plurality of polymeric foamed material structures having slots terminating in said opposed ends.

61. The method of claim 60 wherein said plurality of cutters is a plurality of laser cutters.

62. The method of claim 60 wherein said plurality of cutters is a plurality of hot wire cutters.

63. The method of claim 62 additionally comprising computer operating said hot wire cutters.

64. The method of claim 60 additionally comprising cutting with said plurality of cutters track chases in the polymeric foamed material structures of step (f) such that each of said plurality of polymeric foamed material structures additionally includes a track chase.

65. The method of claim 64 wherein said plurality of cutters is a plurality of hot wire cutters.

66. The method of claim 65 additionally comprising computer operating said hot wire cutters.

67. A method for producing a plurality of polymeric foamed material structures having brace-receiving slots comprising the steps of:

(a) providing a block of polymeric foamed material having a defined surface and a pair of opposed ends; and (b) moving from said defined surface a plurality of cutters through the block of polymeric foamed material in a generally perpendicular direction of travel, while interrupting at least one time the moving of the plurality of cutters in said generally perpendicular direction of travel to move the cutters through the block of polymeric foamed material in at least one direction of travel which differs from said generally perpendicular direction of travel, such that each cutter produces a respective brace-receiving slot in the polymeric foamed material terminating in said opposed end, until said plurality of cutters have moved completely through the block of polymeric foamed material to produce a plurality of polymeric foamed material structures with each structure having at least one brace-receiving slot.

68. A method for producing a plurality of polymeric foamed material structures having brace-receiving slots comprising the steps of:

(a) providing a block of polymeric foamed material in a generally stationary position having a defined surface and a pair of opposed ends;

(b) moving from said defined surface a plurality of cutters through the generally stationary block of polymeric foamed material of step (a) in a generally perpendicular direction of travel;

(c) interrupting the movement of the plurality of cutters from said generally perpendicular direction of travel through the generally stationary blocks of polymeric foamed material to move the cutters in at least one direction of travel which differs from said generally perpendicular direction of travel such that each cutter produces a respective brace-receiving slot in the polymeric foamed material terminating in said opposed ends; and (d) continuing said moving step (b) of said plurality of cutters in said generally perpendicular direction of travel, while intermittently interrupting the movement of the plurality of cutters from said generally perpendicular direction of travel to move the cutters in at least one direction of travel which differs from said generally perpendicular direction of travel such that each cutter produces at least one additional respective brace-receiving slot in the polymeric foamed material, until said plurality of cutters have moved completely through the generally stationary block of polymeric foamed material after which a plurality of polymeric foamed material structures are produced with each polymeric foamed material structure having a plurality of brace-receiving slots.

69. A method for producing a plurality of polymeric foamed material panels comprising the steps of:

(a) cutting a polymeric foamed material in a first direction with a plurality of cutters generally moving in unison;

(b) cutting subsequently the polymeric foamed material of step (a) in a second direction with said plurality of cutters generally moving in unison;

(c) cutting, after said cutting step (b), the polymeric foamed material of step (b) in said first direction with said plurality of cutters generally moving in unison;

(d) cutting, after said cutting step (c), the polymeric foamed material of step (c) in a third direction with said plurality of cutters generally moving in unison wherein said third direction is generally opposite to said second direction;

(e) cutting, after said cutting step (d), the polymeric foamed material of step (d) in said first direction with said plurality of cutters generally moving in unison until said cutters have cut through the polymeric foamed material of step (d) to produce a plurality of polymeric foamed material structures having brace-receiving configurations; and (f) sliding brace members into the brace-receiving configurations of said polymeric foamed material structures of step (e) to produce a plurality of polymeric foamed material panels with each polymeric foamed material panel having one of said brace members.

70. A method for producing a polymeric foamed material structure having a slot comprising the steps of:

(a) providing a polymeric foamed material having a defined surface and a pair of opposed ends (b) cutting with a cutter the polymeric foamed material in a generally perpendicular direction from the defined surface until reaching a preslot cut point;

(c) cutting subsequently a first path in the polymeric foamed material with the cutter from the preslot cut point until reaching a first cut point;

(d) moving the cutter in the polymeric foamed material of step (c) a predetermined distance from the first cut point to a second cut point; and (e) cutting subsequently from the second cut point a second path in the polymeric foamed material of step (d) with the cutter until the cutter reaches a postslot cut point to produce a polymeric foamed material structure having a slot terminating in said opposed ends.

71. The method of claim 70 wherein said slot of step (e) has a width equal to about twice said predetermined distance of step (d).

72. The method of claim 70 additionally comprising sliding a stud member into said slot of step (e).

73. The method of claim 70 wherein said cutter is a hot wire cutter having a wire diameter with a generally known diameter measurement, and said slot of step (e) has a width equal to about twice the generally known diameter measurement of the wire diameter.

74. The method of claim 73 additionally comprising computer operating said hot wire cutter.

75. The method of claim 74 additionally comprising sliding a stud member into said slot of step (e).

76. A method for producing at least one polymeric foamed material structure having at least one slot comprising the steps of:

(a) providing at least one hot wire cutter;

(b) cutting with the hot wire cutter of step (a) a polymeric foamed material until the hot wire cutter reaches at least one respective preslot cut point;

(c) cutting subsequently with the hot wire cutter from the respective preslot cut point of step (b) at least one respective path in the polymeric foamed material of step (b) until the hot wire cutter reaches at least one first cut point;

(d) forming with the hot wire cutter in the polymeric foamed material of step (c) at least one respective off-set path communicating with the respective path of step (c) to form at least one slot within the polymeric foamed material of step (c) said at least one respective path has at least one respective path length, and said at least one respective off-set path communicates with the at least one respective path along the at least one respective path length of the at least one respective path, such that the at least one respective path and the least one respective off-set path together form the at least one slot within the polymeric foamed material of step (c); and (e) cutting subsequently the polymeric foamed material of step (d) with the hot wire cutter until the hot wire cutter has cut through the polymeric foamed material of step (d), producing at least one polymeric foamed structure having at least one slot.

77. The method of claim 76 wherein said at least one cutter comprises a plurality of hot wire cutters cutting a plurality of respective paths in the polymeric foamed material of step (b) and forming a plurality of respective off-set paths in the polymeric foamed material of step (c), such that the plurality of respective paths and the plurality of respective off-set paths together form a plurality of respective slots in the polymeric foamed material of step (c), and such that, after said cutting step (e) with the plurality of hot wire cutters, a plurality of polymeric foamed structures are produced having a plurality of slots.

78. The method of claim 77 additionally comprising sliding a plurality of stud members into the plurality of slots.

79. The method of claim 78 additionally comprising computer-operating said plurality of hot wire cutters.

* * * * *